United States Patent
Harada et al.

(10) Patent No.: US 6,532,120 B1
(45) Date of Patent: Mar. 11, 2003

(54) OPTICAL FILTER

(75) Inventors: Toru Harada, Kanagawa (JP); Tsukasa Yamada, Kanagawa (JP); Ryuta Suzuki, Kanagawa (JP); Yoshiharu Yabuki, Kanagawa (JP); Junji Nishigaki, Kanagawa (JP)

(73) Assignee: Fuji Photo Film Co., Ltd., Minami-Ashigara (JP)

( * ) Notice: Subject to any disclaimer, the term of this patent is extended or adjusted under 35 U.S.C. 154(b) by 0 days.

(21) Appl. No.: 09/807,882

(22) PCT Filed: Oct. 20, 1999

(86) PCT No.: PCT/JP99/05785

§ 371 (c)(1),
(2), (4) Date: Apr. 20, 2001

(87) PCT Pub. No.: WO00/23829

PCT Pub. Date: Apr. 27, 2000

(30) Foreign Application Priority Data

| Oct. 20, 1998 | (JP) | 10-316876 |
| Feb. 19, 1999 | (JP) | 11-042080 |
| Apr. 28, 1999 | (JP) | 11-121699 |
| Apr. 28, 1999 | (JP) | 11-121700 |
| Apr. 30, 1999 | (JP) | 11-124273 |
| Aug. 20, 1999 | (JP) | 11-234243 |

(51) Int. Cl.⁷ .............................. G02B 5/22
(52) U.S. Cl. .................. 359/885; 252/582; 313/112
(58) Field of Search ............. 359/885; 252/582, 252/586; 313/112; 430/7

(56) References Cited

U.S. PATENT DOCUMENTS

| 5,210,014 A | 5/1993 | Anderson et al. |
| 5,368,781 A | * 11/1994 | Haacke .................. 359/885 |
| 5,466,822 A | 11/1995 | Fujiwara |
| 6,323,585 B1 | * 11/2001 | Crane .................. 313/112 |
| 2002/0005509 A1 | * 1/2002 | Teng .................. 252/582 |

FOREIGN PATENT DOCUMENTS

| JP | 61-175601 | * 8/1986 |
| JP | 62-294205 | 12/1987 |
| JP | 10-64454 | 3/1998 |
| JP | 10-180947 | * 7/1998 |

OTHER PUBLICATIONS

English language translation of International Preliminary Examination Report.

* cited by examiner

Primary Examiner—Cassandra Spyrou
Assistant Examiner—Leo Boutsikaris
(74) Attorney, Agent, or Firm—Burns, Doane, Swecker & Mathis, LLP

(57) ABSTRACT

An optical filter comprises a transparent support and a filter layer. The filter layer has an absorption maximum in the wavelength region of 560 to 620 nm. The absorption maximum has a half-width in the range of 5 to 50 nm. The optical filter properly absorbs undesired light component emitted from an image display apparatus (especially, a plasma display panel).

21 Claims, 2 Drawing Sheets

OPTICAL FILTER

FIELD OF INVENTION

The present invention relates to an optical filter comprising a transparent support and a filter layer. In more detail, the invention relates to an optical filter covering a display surface of a display device such as a liquid crystal display device (LCD), a plasma display panel (PDP), an electroluminescence display (ELD), a cathode-ray tube (CRT), a fluorescent indicator tube or a field emission display to improve the color reproducibility of the display.

BACKGROUND OF THE INVENTION

A display device such as a liquid crystal display device (LCD), a plasma display panel (PDP), an electroluminescence display (ELD), a cathode-ray tube (CRT), a fluorescent indicator tube or a field emission display displays a color image with a combination of the three primary colors (i.e., red, blue, green). However, it is very difficult (substantially impossible) to use the ideal three primary colors. For example, the plasma display panel (PDP) uses phosphors of the three primary colors, which emit light containing an unnecessary component (in the wavelength region of 500 to 620 nm). Therefore, an optical filter absorbing the unnecessary component has been proposed to correct the color balance of the displayed image. The optical filter for the color correction is described in Japanese Patent Provisional Publication Nos. 58(1983)-153904, 60(1985)-118748, 60(1985)-18749, 61(1986)-188501, 3(1991)-231988, 5(1993)-203804, 5(1993)-205643, 7(1995)-307133, 9(1997)-145918, 9(1997)-306366 and 10(1998)-26704.

SUMMARY OF THE INVENTION

Only a light component that impairs color purity must be selectively cut off to correct a color balance of a displayed image. The present inventors, however, have found that conventional optical filters often cut off not only the light component impairing the color purity but also a component contributing toward displaying the image.

An object of the present invention is to provide an optical filter having a function of correcting color appropriately for a displayed image.

Another object of the present invention is to provide an improved plasma display panel, which can give an image having appropriately corrected colors.

The present invention provides an optical filter which comprises a transparent support and a filter layer, wherein the filter layer has an absorption maximum in the wavelength region of 560 to 620 nm, and the absorption maximum has a half-width in the range of 5 to 50 nm.

The invention also provides a plasma display panel having a display surface covered with an optical filter which comprises a transparent support and a filter layer, wherein the filter layer has an absorption maximum in the wavelength region of 560 to 620 nm, and the absorption maximum has a half-width in the range of 5 to 50 nm.

The present inventors have studied a display device (particularly, a plasma display panel), and found that the unnecessary light component (in the wavelength region of 500 to 620 nm) contained in the three primary colors gives an emission spectrum with a very sharp peak. Accordingly, the optical filter for cutting off the unnecessary component must have an absorption spectrum with a very sharp peak corresponding to the above sharp emission peak. If the filter has a broad absorption peak, it cuts off the necessary component contributing towards displaying the image.

The optical filter of the invention has an absorption spectrum with a very sharp peak (whose half-width is in the range of 5 to 50 nm), and hence it can selectively cut off the light component impairing the color purity of image.

Therefore, the color of the displayed image can be appropriately corrected by the optical filter of the present invention.

Figure 1A:
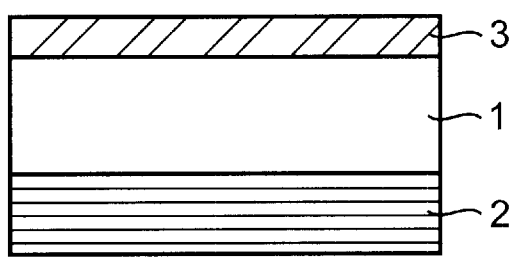
FIG. 1 shows sectional views schematically illustrating an optical filter, which comprises a filter layer, a transparent support and an anti-reflection layer in this order.

EMBODIMENTS OF THE INVENTION (Layered Structure of Optical Filter)

Typical layered structures of the optical filters are explained below by referring to the drawings.

FIG. 1 shows sectional views schematically illustrating an optical filter, which comprises a filter layer, a transparent support and an anti-reflection layer in this order.

The embodiment of FIG. 1(a) comprises a filter layer (2), a transparent support (1) and a low refractive index layer (3) in this order. The layer (3) and the support (1) satisfy the condition of $n_3 < n_1$ in which $n_3$ and $n_1$ represent the refractive indexes of the layer (3) and the support (1), respectively.

Figure 1B:
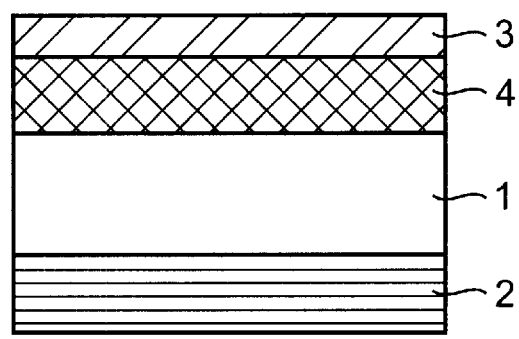

The embodiment of FIG. 1(b) comprises a filter layer (2), a transparent support (1), a hard coating layer (4) and a low refractive index layer (3) in this order.

Figure 1D:
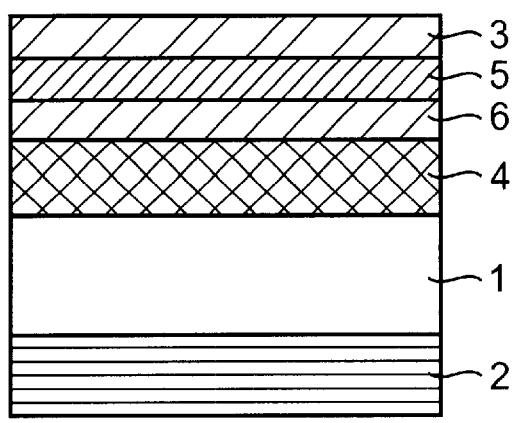
Figure 1C:
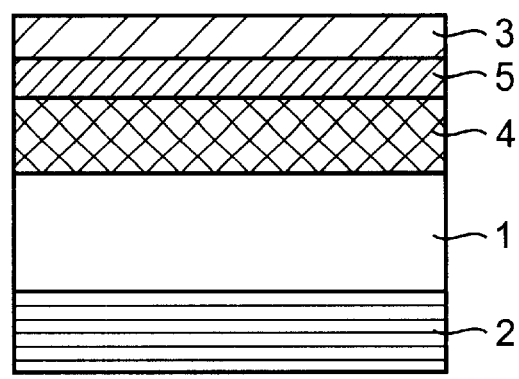

The embodiment of FIG. 1(c) comprises a filter layer (2), a transparent support (1), a hard coating layer (4), a high refractive index layer (5) and a low refractive index layer (3) in this order. The layers (3) and (5) and the support (1) satisfy the condition of $n_3 < n_1 < n_5$ in which $n_3$, $n_1$ and $n_5$ represent the refractive indexes of the layer (3), the support (1) and the layer (5), respectively.

The embodiment of FIG. 1(d) comprises a filter layer (2), a transparent support (1), a hard coating layer (4), a middle refractive index layer (6), a high refractive index layer (5) and a low refractive index layer (3) in this order. The layers (3), (5) and (6) and the support (1) satisfy the condition of $n_3 < n_1 < n_6 < n_5$ in which $n_3$, $n_1$, $n_6$ and $n_5$ represent the refractive indexes of the layer (3), the support (1), the layer (6) and the layer (5), respectively.

FIG. 2 shows sectional views schematically illustrating another optical filter, which comprises a transparent support, a filter layer and an anti-reflection layer in this order.

Figure 2A:
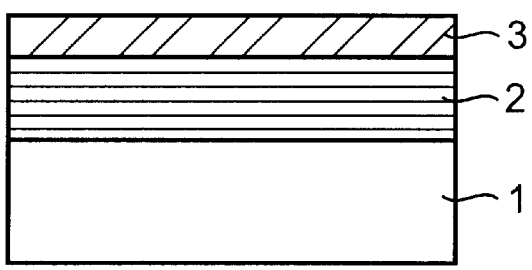
FIG. 2 shows sectional views schematically illustrating another optical filter, which comprises a transparent support, a filter layer and an anti-reflection layer in this order.

The embodiment of FIG. 2(a) comprises a transparent support (1), a filter layer (2) and a low refractive index layer (3) in this order. The layer (3) and the support (1) satisfy the conditions of the refractive indexes, as is described about FIG. 1(a).

Figure 2B:
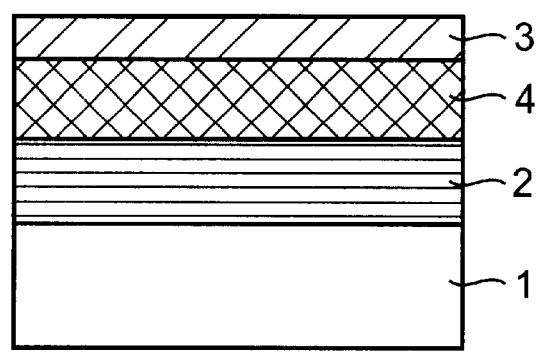

The embodiment of FIG. 2(b) comprises a transparent support (1), a filter layer (2), a hard coating layer (4) and a low refractive index layer (3) in this order.

Figure 2D:
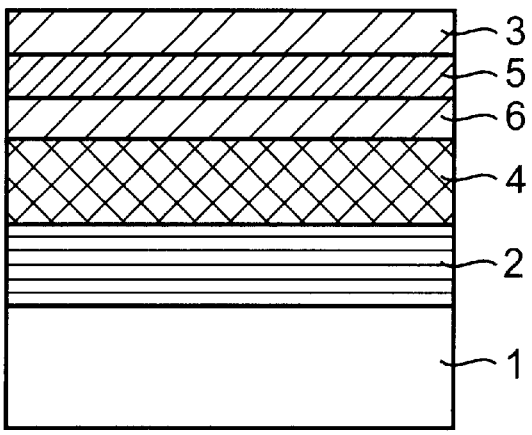
Figure 2C:
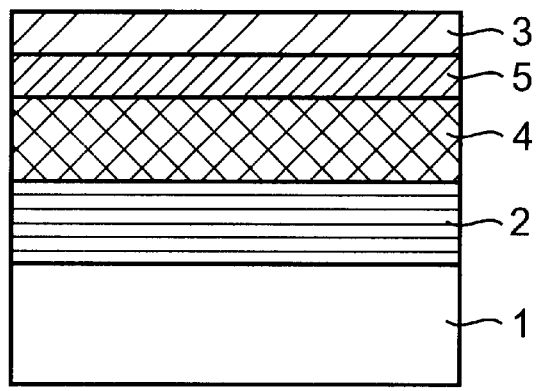

The embodiment of FIG. 2(c) comprises a transparent support (1), a filter layer (2), a hard coating layer (4), a high refractive index layer (5) and a low refractive index layer (3) in this order. The layers (3) and (5) and the support (1) satisfy the conditions of the refractive indexes, as is described about FIG. 1(c).

The embodiment of FIG. 2(d) comprises a transparent support (1), a filter layer (2), a hard coating layer (4), a middle refractive index layer (6), a high refractive index layer (5) and a low refractive index layer (3) in this order. The layers (3), (5) and (6) and the support (1) satisfy the conditions of the refractive indexes, as is described about FIG. 1(d).

(Transparent Support)

Examples of the materials for the support include cellulose esters (e.g., cellulose diacetate, cellulose triacetate, cellulose propionate, cellulose butyrate, cellulose acetate propionate, cellulose nitrate), polyamides, polycarbonates, polyesters (e.g., polyethylene terephthalate, polyethylene naphthalate, poly-1,4-cyclohexanedimethylene terephthalate, polyethylene-1,2-diphenoxyethane-4,4'-dicarboxylate, polybutylene terephthalate), polystyrenes (e.g., syndiotactic polystyrene), polyolefins (e.g., polyethylene, polypropylene, polymethylpentene), polymethyl methacrylate, syndiotactic polystyrene, polysulfone, polyethersulfone, polyetherketone, polyether imide and polyoxyethylene. Cellulose triacetate, polycarbonates and polyethylene terephthalate are preferred.

The transparent support preferably has a transmittance of more than 80%, and more preferably more than 86%. The haze of the support is preferably in the range of less than 2.0%, and more preferably less than 1.0%. The support preferably has a refractive index of 1.45 to 1.70.

The support may contain IR absorber or UV absorber. The amount of the IR or UV absorber is preferably in the range of 0.01 to 20 wt. %, and more preferably in the range of 0.05 to 10 wt. %. The support may further contain particles of an inert inorganic compound as a slipping agent. Examples of the inorganic compounds include $SiO_2$, $TiO_2$, $BaSO_4$, $CaCO_3$, talc and kaolin.

The support can be subjected to surface treatment. Examples of the surface treatments include chemical treatment, mechanical treatment, corona discharge treatment, flame treatment, UV treatment, high-frequency treatment, glow discharge treatment, active plasma treatment, laser treatment, mixed acid treatment and ozone-oxidation treatment. Preferred treatments are glow discharge treatment, UV treatment, corona discharge treatment and flame treatment. Glow discharge treatment and UV treatment are particularly preferred. An undercoating layer can be provided on the support to enhance an adhesion between the support and a layer provided on the undercoating layer.

(Undercoating Layer)

An undercoating layer is preferably provided between the transparent support and the filter layer. The undercoating layer can contain a polymer having a glass transition temperature of −60 to 60° C. or a polymer compatible with the polymer of the filter layer. Further, the undercoating layer may have a rough surface on the side facing the filter layer. On the support surface opposite to the filter layer side, another undercoating layer may be provided to enhance the adhesion between the support and the layers thereon (e.g., anti-reflection layers, hard coating layer). Further, another undercoating layer can be provided to improve the affinity between the anti-reflection layer and the adhesive agent for fixing the anti-reflection layer onto a display device.

The undercoating layer has a thickness preferably in the range of 2 nm to 20 μm, more preferably in the range of 5 nm to 5 μm, and most preferably in the range of 50 nm to 5 μm.

The undercoating layer containing a polymer having a glass transition temperature of −60 to 60° C. unites the filter layer to the transparent support with the adhesion of the polymer. The polymer having a glass transition temperature of not higher than 25° C. can be prepared by polymerization or copolymerization of vinyl chloride, vinylidene chloride, vinyl acetate, butadiene, neoprene, styrene, chloroprene, acrylic ester, methacrylic ester, acrylonitrile or methyl vinyl ether. The glass transition temperature is preferably not higher than 20° C., more preferably not higher than 15° C., further preferably not higher than 10° C., furthermore preferably not higher than 5° C., and most preferably not higher than 0° C.

The undercoating layer having a rough surface also unites the filter layer to the transparent support. On the rough surface of the undercoating layer, the filter layer is provided. The undercoating layer having a rough surface can be easily formed by applying a polymer latex. The polymer latex has a mean particle size preferably in the range of 0.02 to 3 μm, and more preferably in the range of 0.05 to 1 μm.

Examples of the polymer compatible with that of the filter layer include acrylic resins, cellulose derivatives, gelatin, casein, starch, polyvinyl alcohol, soluble nylon and polymer latex.

Two or more undercoating layers can be provided on the support.

The undercoating layer can contain other components such as a solvent for swelling the support, a matting agent, a surface active agent, an antistatic agent, a coating aid and a curing agent.

(Filter Layer)

The filter layer has a thickness preferably of 0.1 μm to 5 cm, and more preferably of 0.5 to 100 μm.

The filter layer has an absorption maximum in the wavelength region of 560 to 620 nm (between green and red).

The absorption maximum in the wavelength region of 560 to 620 nm is arranged to selectively cut off a sub-band, which degrades purity of red fluorescence. The absorption maximum in the wavelength region of 560 to 620 nm can further cut off an unnecessary light component at about 595 nm, which is emitted by excited neon gas in PDP. The optical filter of the invention has such a sharp absorption peak in the wavelength region of 560 to 620 nm that the influence on the green fluorescence is reduced. In more detail, the absorption maximum in the wavelength region of 560 to 620 nm has a half-width in the range of 5 to 50 nm, preferably in the range of 6 to 45 nm, more preferably in the range of 7 to 40 nm, further preferably in the range of 8 to 35 nm, furthermore preferably in the range of 9 to 30 nm, and most preferably in the range of 10 to 20 nm.

The transmittance at the absorption maximum in the wavelength region of 560 to 620 nm is in the range of preferably 0.01 to 80%, more preferably in the range of 0.1 to 70%, more preferably in the range of 0.2 to 65%, and most preferably in the range of 5 to 60%.

The filter layer can have an absorption maximum in the wavelength region of 500 to 550 nm (green) as well as the absorption maximum in the wavelength region of 560 to 620 nm (between green and red).

In that case, the half-width of the absorption maximum in the wavelength region of 500 to 550 nm is preferably larger than that of the absorption maximum in the wave-length range of 560 to 620 nm. Further, the transmittance at the absorption maximum in the wavelength region of 500 to 550 nm is preferably larger than that at the absorption maximum in the wavelength region of 560 to 620 nm.

The absorption maximum in the wavelength region of 500 to 550 nm is arranged to adjust the emission intensity of green fluorescence, which has a high visual sensitivity. The green fluorescence is preferably cut off moderately. The absorption maximum in the wavelength region of 500 to 550 nm has a half-width (width at half of the absorption maximum) preferably in the range of 30 to 300 nm, more preferably in the range of 40 to 250 nm, further preferably in the range of 50 to 200 nm, and most preferably in the range of 60 to 150 nm.

The transmittance at the absorption maximum in the wavelength region of 500 to 550 nm is preferably in the range of 5 to 90%, more preferably in the range of 20 to 85%, and most preferably in the range of 50 to 80%.

The above-described absorption spectrum of the filter layer can be obtained by adding a dye or pigment (preferably dye) to the filter layer.

A squarylium dye, an azomethine dye, a cyanine dye, an oxonol dye, an azo dye, an arylidene dye, a xanthene dye or a merocyanine dye can be used as a dye having an absorption maximum in the wavelength region of 500 to 550 nm. Examples of the dyes having an absorption maximum in the wavelength region of 500 to 550 nm are shown below.

(a1)
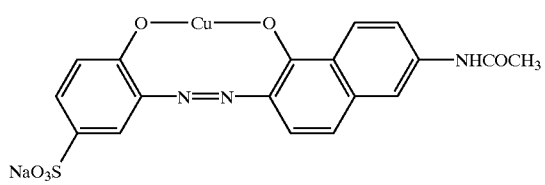

(a2)
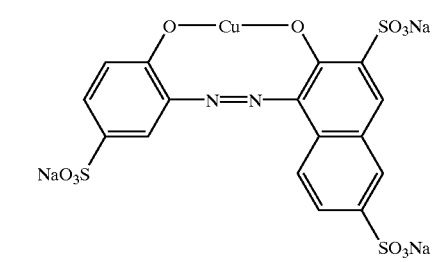

(a3)
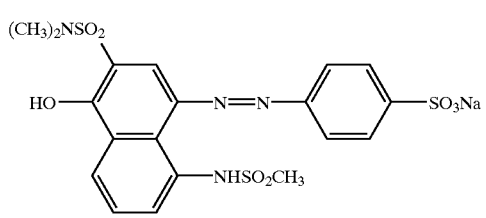

(a4)
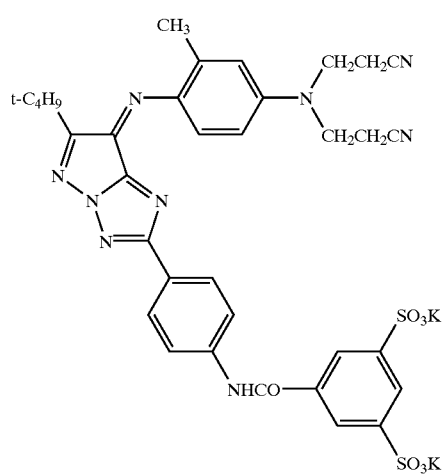

-continued (a5)
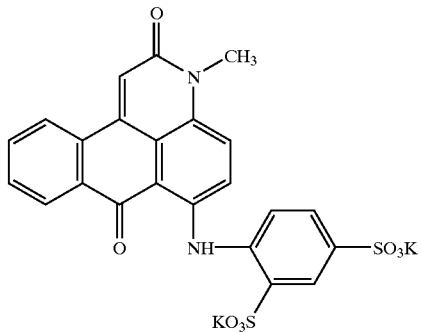

(a6)
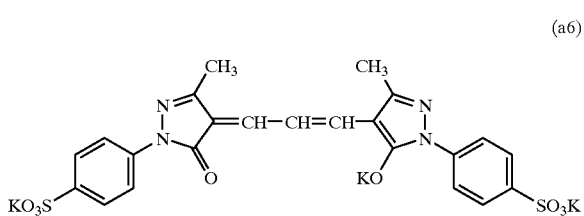

(a7)
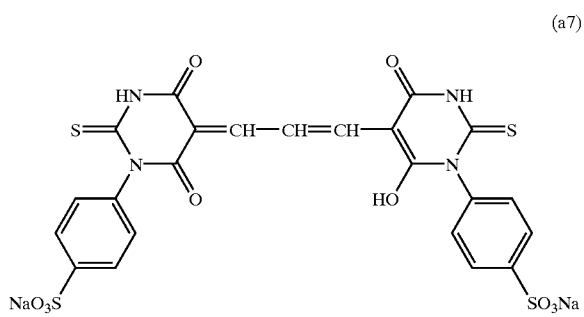

(a8)
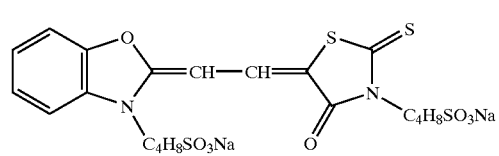

(a9)
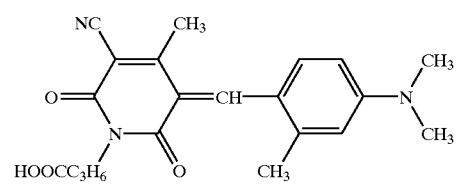

(a10)
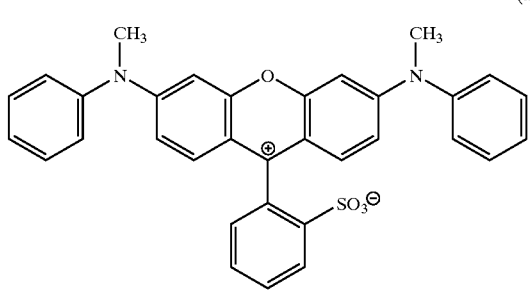

(a11)

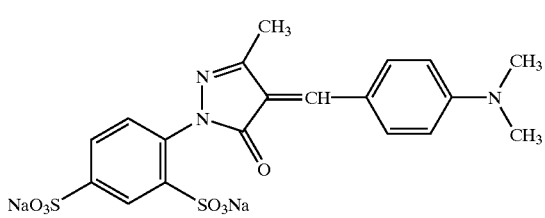

A cyanine dye or an oxonol dye can be used as a dye having an absorption maximum in the wavelength region of 560 to 620 nm. Examples of the dyes having an absorption maximum in the wavelength region of 560 to 620 nm are shown below.

(b1)

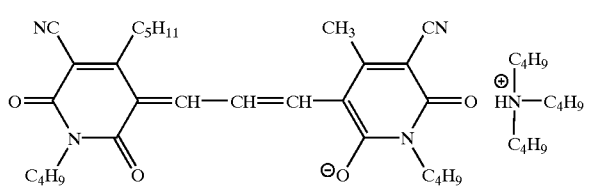

(b2)

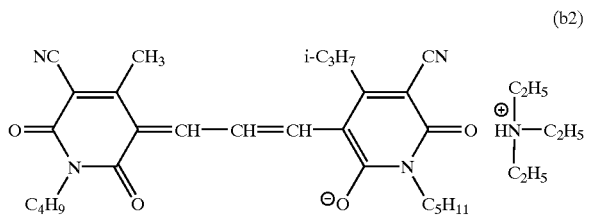

(b3)

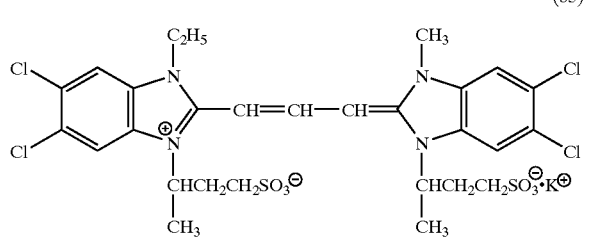

(b4)

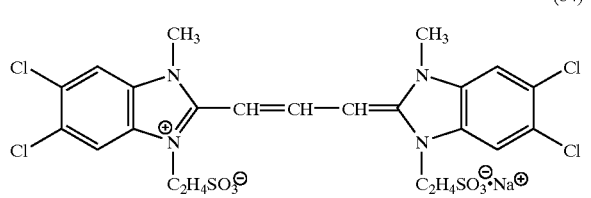

(b5)

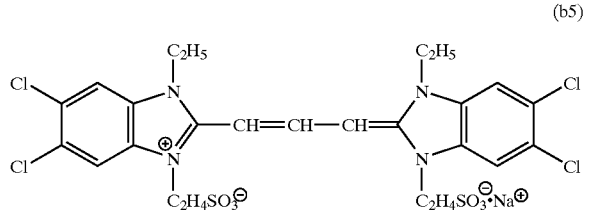

(b6)

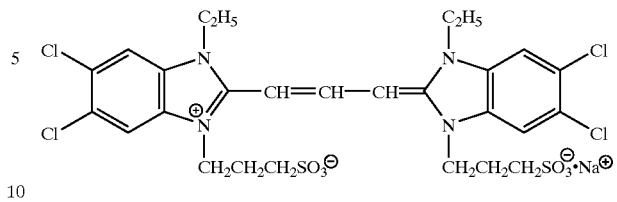

In the filter layer, the above-described two dyes can be used in combination.

Further, the filter layer can contain a dye having two absorption maximums in the wavelength region of 500 to 550 nm as well as in the wavelength region of 560 to 620 nm. For example, a dye (in a non-aggregated form) having an absorption maximum in the wavelength region of 500 to 550 nm sometimes further has an absorption maximum in the wave-length region of 560 to 620 nm (in an aggregated form). The two absorption maximums in the wavelength region of 500 to 550 nm (a non-aggregated form) as well as in the wave-length region of 560 to 620 nm (an aggregated form) can be obtained by using the above-described dye in a partially aggregated form. Examples of the dye having absorption maximums in the wavelength region of 500 to 550 nm as well as in the wavelength region of 560 to 620 nm are shown below.

(c1)

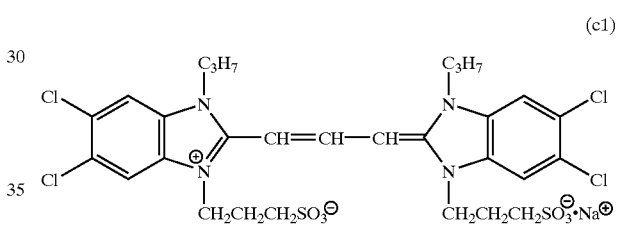

(c2)

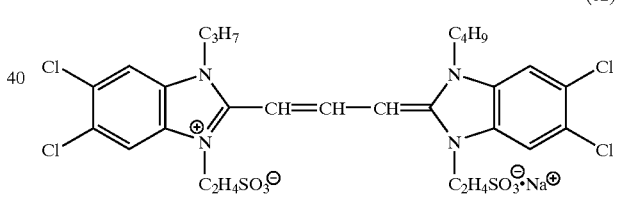

The dye having an absorption maximum in the wave-length region of 560 to 620 nm preferably is a dye in an aggregated form. A dye in an aggregated form usually has a J-band, and hence has a sharp absorption peak in its spectrum. The aggregated form of the dye and the J-band thereof are described in Photographic Science and Engineering Vol. 18, No. 323–335 (1974). The absorption maximum of the dye is shifted to a longer wavelength region by changing the non-aggregated form (in a solution) to the aggregated form. Therefore, it can be determined by measuring an absorption maximum whether a dye contained in a filter layer is in an aggregated form or not.

In the present specification, the aggregated form means that a dye exhibits the absorption maximum at a wave-length longer than the wavelength of the absorption maximum of the same dye in a solution by 30 nm or more, which is preferably larger than 40 nm, more preferably larger than 45 nm, and most preferably larger than 50 nm.

Some dyes can be in an aggregated form merely by dissolving the dyes in water. However, the aggregated form is usually obtained by adding gelatin or salt (e.g., barium chloride, ammonium chloride, sodium chloride) to an aqueous solution of a dye. The aggregated form is preferably obtained by adding gelatin to an aqueous solution of a dye.

The aggregated form can also be obtained as a solid fine particle dispersion. The fine particles can be prepared by means of known mills. Examples of the mill include a ball mill, a vibrating mill, a planetary ball mill, a sand mill, a colloid mill, a jet mill and a roller mill. A vertical or horizontal dispersing machine (described in Japanese Patent Provisional Publication No. 52(1977)-92716 and International Patent No. 88/074794) is preferred.

The dispersing process can be carried out in the presence of an appropriate medium (e.g., water, alcohol). In that case, it is preferred to use a dispersing surface active agent. As the surface active agent, an anionic surface active agent (described in Japanese Patent Provisional Publication No. 52(1977)-92716 and International Patent No. 88/074794) is preferably used. An anionic polymer, a non-ionic surface active agent or a cationic surface active agent can be used, if necessary.

The powdery fine particles of the dye can be prepared by the steps of dissolving the dye in an appropriate solvent and adding a bad solvent to precipitate the particles. In that case, the aforementioned surface active agents are also employable. The fine particles can also be precipitated by adjusting the pH value. The obtained fine particles are also in the aggregated form.

In the case that the aggregated dye is in the form of fine particles (or crystallites), the mean particle size is preferably in the range of 0.01 to 10 μm.

The dye used in an aggregated form is preferably a methine dye, more preferably a cyanine dye or an oxonol dye, and most preferably a cyanine dye.

The cyanine dye is defined by the following formula.

$$Bs=Lo-Bo$$

in which Bs is a basic nucleus; Bo is an onium form of a basic nucleus; and Lo is a methine chain consisting of an odd number of methines.

The cyanine dye represented by the formula (I) is preferably used (particularly, in an aggregated form).

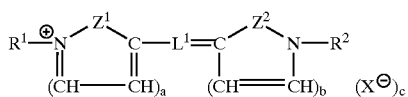
(I)

In the formula (I), each of $Z^1$ and $Z^2$ independently is a group of non-metallic atoms forming a five-membered or six-membered nitrogen-containing heterocyclic ring. The nitrogen-containing heterocyclic ring may be condensed with other heterocyclic, aromatic or alicyclic rings. Examples of the nitrogen-containing heterocyclic ring and the ring condensed therewith include oxazole ring, isoxazole ring, benzoxazole ring, naphthoxazole ring, thiazole ring, benzothiazole ring, naphthothiazole ring, indolenine ring, benzoindolenine ring, imidazole ring, benzimidazole ring, naphthoimidazole ring, quinoline ring, pyridine ring, pyrrolopyridine ring, furopyrrole ring, indolizine ring, imidazoquinoxaline ring and quinoxaline ring. A five-membered nitrogen-containing heterocyclic ring is further preferred to a six-membered ring. A five-membered nitrogen-containing heterocyclic ring is preferably condensed with benzene or naphthalene ring. A particularly preferred ring is benzimidazole ring.

The nitrogen-containing heterocyclic ring and the ring condensed therewith can have a substituent group. Examples of the substituent groups include an alkyl group (e.g., methyl, ethyl, propyl), a alkoxy group (e.g., methoxy, ethoxy), an aryloxy group (e.g., phenoxy, p-chlorophenoxy), a halogen atom (Cl, Br, F), an alkoxycarbonyl group (e.g., ethoxycarbonyl), a carbon halide group (e.g., trifluoromethyl), an alkylthio group (e.g., methylthio, ethylthio, butylthio), an arylthio group (e.g., phenylthio, o-carboxylphenylthio), cyano, nitro, amino, an alkylamino group (e.g., methylamino, ethylamino), an amido group (e.g., acetamide, propionamide), an acyloxy group (e.g., acetoxy, butyryloxy), hydroxyl, sulfo and carboxyl. Each of sulfo and carboxyl can be in the form of a salt.

In the formula (I), each of $R^1$ and $R^2$ independently is an alkyl group, an alkenyl group, an aralkyl group or an aryl group.

The alkyl group preferably has 1 to 20 carbon atoms and may have a substituent group. Examples of the substituent groups include a halogen atom (Cl, Br, F), an alkoxycarbonyl group (e.g., methoxycarbonyl, ethoxycarbonyl), hydroxyl, sulfo and carboxyl. Each of sulfo and carboxyl may be in the form of a salt.

The alkenyl group preferably has 2 to 10 carbon atoms. Examples of the alkenyl group include 2-pentenyl, vinyl, allyl, 2-butenyl and 1-propenyl. The alkenyl group may have a substituent group. Examples of the substituent groups are the same as those of the alkyl group.

The aralkyl group preferably has 7 to 12 carbon atoms. Examples of the aralkyl group include benzyl and phenethyl. The aralkyl group can have a substituent group. Examples of the substituent groups include an alkyl group (e.g., methyl, ethyl, propyl), an alkoxy group (e.g., methoxy, ethoxy), an aryloxy group (e.g., phenoxy, p-chlorophenoxy), a halogen atom (Cl, Br, F), an alkoxycarbonyl group (e.g., ethoxycarbonyl), a carbon halide group (e.g., trifluoromethyl), an alkylthio group (e.g., methylthio, ethylthio, butylthio), an arylthio group (e.g., phenylthio, o-carboxyphenylthio), cyano, nitro, amino, an aikylamino group (methylamino, ethylamino), an amido group (e.g., acetamido, propionamido), an acyloxy group (e.g., acetoxy, butyryloxy), hydroxyl, sulfo and carboxyl. Each of sulfo and carboxyl may be in the form of a salt.

Examples of the aryl group include phenyl and naphthyl. The aryl group can have a substituent group. Examples of the substituent groups are the same as those of the aralkyl group.

In the formula (I), $L^1$ is a methine chain consisting of an odd number of methines. The number is preferably 1, 3, 5 or 7.

The methine chain can have a substituent group. In that case, the substituent group is preferably placed at the centered methine (i.e., meso-position) of the chain. Examples of the substituent group include an alkyl group, an aryl group, an alkoxy group, an aryloxy group, a halogen atom, an alkoxycarbonyl group, a carbon halide group, an alkylthio group, an arylthio group, cyano, nitro, amino, an alkylamino group, an amido group, an acyloxy group, hydroxyl, sulfo and carboxyl. Examples and definitions of the alkyl group and the aryl group are the same as those described for $R^1$ and $R^2$.

In the formula (I), each of a, b and c independently is 0 or 1. Each of a and b is preferably 0. In the case where the cyanine dye has an anionic substituent group (e.g., sulfo, carboxyl) to form an inner salt, c is 0.

In the formula (I), X represents an anion. Examples of the anion include a halide ion (e.g., Cl⁻, Br⁻, I⁻), p-toluenesulfonate ion, ethylsulfate ion, $PF_6^-$, $BF_4^-$, $ClO_4^-$, and a complex ion represented by the following formula (III):

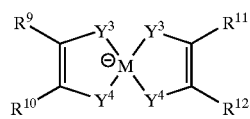

In the formula (III), each of $R^9$, $R^{10}$, $R^{11}$ and $R^{12}$ independently is hydrogen, an alkyl group, an aryl group or cyano. Otherwise, the set of $R^9$ and $R^{10}$ or the set of $R^{11}$ and $R^{12}$ may be combined to form an aromatic ring.

The alkyl group preferably has 1 to 20 carbon atoms and may have a substituent group. Examples of the substituent groups include a halogen atom (Cl, Br, F), an alkoxycarbonyl group (e.g., methoxycarbonyl, ethoxycarbonyl), hydroxyl, sulfo and carboxyl. Each of sulfo and carboxyl may be in the form of a salt.

Examples of the aryl group include phenyl and naphthyl. The aryl group can have a substituent group. Examples of the substituent group include an alkyl group (e.g., methyl, ethyl, propyl), an alkoxy group (e.g., methoxy, ethoxy), an aryloxy group (e.g., phenoxy, p-chlorophenoxy), a halogen atom (Cl, Br, F), an alkoxycarbonyl group (e.g., ethoxycarbonyl), a carbon halide group (e.g., trifluoromethyl), an alkylthio group (e.g., methylthio, ethylthio, butylthio), an arylthio group (e.g., phenylthio, o-carboxyphenylthio), cyano, nitro, amino, an alkylamino group (methylamino, ethylamino), an amido group (e.g., acetamido, propionamido), an acyloxy group (e.g., acetoxy, butyryloxy), hydroxyl, sulfo and carboxyl. Each of sulfo and carboxyl may be in the form of a salt.

Examples of the aromatic ring formed by the set of $R^9$ and $R^{10}$ or the set of $R^{11}$ and $R^{12}$ include benzene ring and naphthalene ring. The benzene ring and the naphthalene ring may have substituent groups. Examples of the substituent groups are the same as those of the aryl group.

In the formula (III), each of $Y^3$ and $Y^4$ independently is O, S or NH, and preferably is S.

In the formula (III), M is a metal atom. The metal atom preferably belongs to the groups II to IV in the periodic table, and more preferably is a transition metal atom. Examples of the transition metal atom include Cr, Mn, Fe, Co, Ni, Cu, Zn, Pd, Md and Cd. Particularly preferred are Fe, Co, Cu and Zn.

The cyanine dye represented by the following formula (Ia) is more preferably used (in an aggregated form).

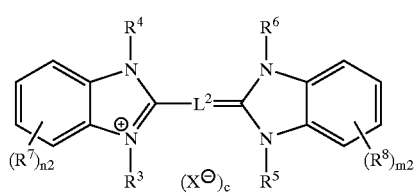

In the formula (Ia), each of $R^3$, $R^4$, $R^5$ and $R^6$ independently is an alkyl group, an alkenyl group, an aralkyl group or an aryl group. Examples and definition of each group are the same as those for $R^1$ and $R^2$ in the formula (I).

In the formula (Ia), each of $R^7$ and $R^8$ independently is an alkyl group (e.g., methyl, ethyl, propyl), an alkoxy group (e.g., methoxy, ethoxy), an aryloxy group (e.g., phenoxy, p-chlorophenoxy), a halogen atom (Cl, Br, F), an alkoxycarbonyl group (e.g., ethoxycarbonyl), a carbon halide group (e.g., trifluoromethyl), an alkylthio group (e.g., methylthio, ethylthio, butylthio), an arylthio group (e.g., phenylthio, o-carboxyphenylthio), cyano, nitro, amino, an alkylamino group (methylamino, ethylamino), an amido group (e.g., acetamido, propionamido), an acyloxy group (e.g., acetoxy, butyryloxy), hydroxyl, sulfo or carboxyl. Each of sulfo and carboxyl may be in the form of a salt.

In the formula (Ia), $L^2$ is a methine chain consisting of an odd number of methines. The number is preferably 3, 5 or 7 (more preferably 3). The methine chain can have a substituent group. The substituent group is preferably placed at the centered methine (i.e., meso-position) of the chain. Examples of the substituent group are the same as those of the substituent groups for the methine chain $L^1$ in the formula (I). However, the methine chain preferably has no substituent group.

In the formula (Ia), each of m2 and n2 independently is an integer of 0, 1, 2, 3 or 4.

In the formula (Ia), X represents an anion. Examples of the anion are the same as those of X in the formula (I).

In the formula (Ia), c is 0 or 1.

The cyanine dye represented by the formula (I) or (Ia) preferably has at least one water-soluble group, which means such a strongly hydrophilic group that the cyanine dye having the group is water-soluble. Examples of the water-soluble groups include sulfo, carboxyl, phosphono and salts thereof. Examples of the counter ions for the salts include an alkali metal ion (e.g., $Na^+$, $K^+$), ammonium ion, triethylammonium ion, tributylammonium ion, pyridinium ion, tetrabutylammonium ion and an onium ion represented by the following formula (IV):

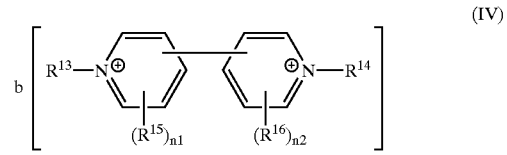

In the formula (IV), each of $R^{13}$ and $R^{14}$ independently is an alkyl group, an alkenyl group, an aralkyl group, an aryl group or a heterocyclic group. Examples and definitions of the alkyl group, the alkenyl group, the aralkyl group and the aryl group are the same as those for $R^1$ and $R^2$ in the formula (I).

Examples of the heterocyclic ring in the heterocyclic group include oxazole ring, benzoxazole ring, thiazole ring, benzothiazole ring, imidazole ring, benzimidazole ring, pyridine ring, piperidine ring, pyrrolidine ring, morpholine ring, pyrazole ring, pyrrole ring and coumarin ring. The heterocyclic group may have a substituent group. Examples of the substituent groups include an alkyl group (e.g., methyl, ethyl, propyl), an alkoxy group (e.g., methoxy, ethoxy), an aryloxy group (e.g., phenoxy, p-chlorophenoxy), a halogen atom (Cl, Br, F), an alkoxycarbonyl group (e.g., ethoxycarbonyl), a carbon halide group (e.g., trifluoromethyl), an alkylthio group (e.g., methylthio, ethylthio, butylthio), an arylthio group (e.g., phenylthio, o-carboxyphenylthio), cyano, nitro, amino, an alkylamino group (methylamino, ethylamino), an amido group (e.g., acetamido, propionamido), an acyloxy group (e.g., acetoxy, butyryloxy), hydroxyl, sulfo and carboxyl. Each of sulfo and carboxyl may be in the form of a salt.

In the formula (IV), each of $R^{15}$ and $R^{16}$ independently is hydrogen, an alkyl group, an alkoxy group, an aryloxy group, a halogen atom, an alkoxycarbonyl group, a carbon halide group, an alkylthio group, an arylthio group, cyano, nitro, amino, an alkylamino group, an amido group, an acyloxy group, hydroxyl, sulfo or carboxyl. Examples and definition of each group are the same as those for $R^1$ and $R^2$ in the formula (Ia).

Two of $R^{13}$, $R^{14}$, $R^{15}$ and $R^{16}$ may be combined to form a ring.

In the formula (IV), each of n1 and n2 independently is an integer of 1, 2, 3 or 4.

In the formula (IV), b is in the range of 0.25 to 3.0, and is determined according to the number of water-soluble groups contained in the dye. For example, if the dye has two sulfo groups, b is 0.5. If the dye has three sulfo groups, b is 1.0.

Examples of the cyanine dye represented by the formula (I) or (Ia) are shown below.

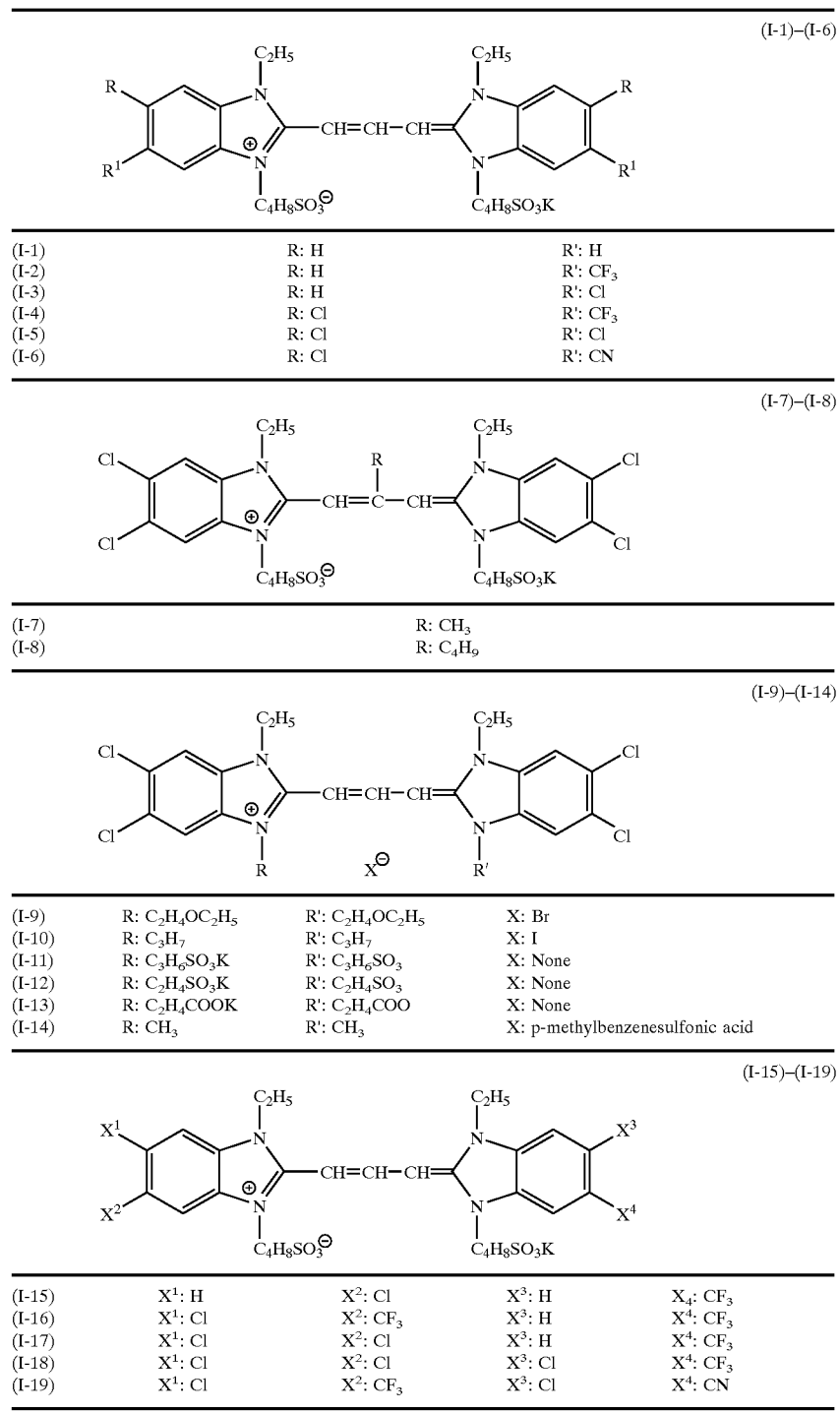

-continued
(I-20)–(I-23)
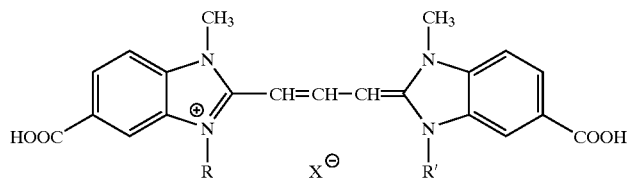
| (I-20) | R: CH$_3$ | R': CH$_3$ | X: p-methylbenzenesulfonic acid |
|---|---|---|---|
| (I-21) | R: C$_2$H$_5$ | R': C$_2$H$_5$ | X: Br |
| (I-22) | R: C$_2$H$_4$COO | R': C$_2$H$_4$COOH | X: None |
| (I-23) | R: C$_4$H$_8$SO$_3$ | R': C$_4$H$_8$SO$_3$H | X: None |
(I-24)–(I-26)
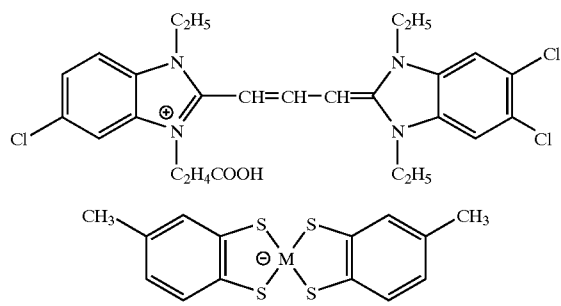
| (I-24) | M: Ni |
|---|---|
| (I-25) | M: Cu |
| (I-26) | M: Co |
(I-27)
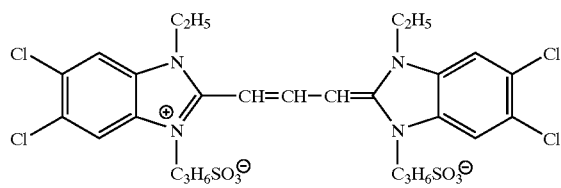
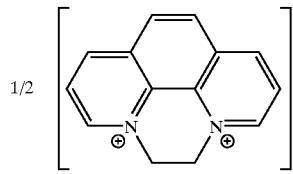
(I-28)
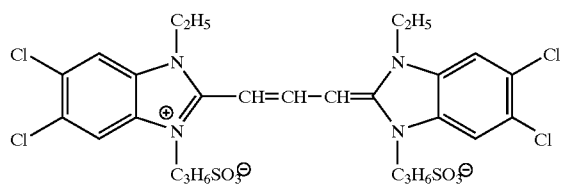
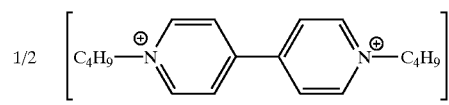

-continued
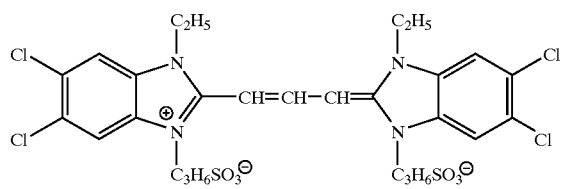
(I-29)
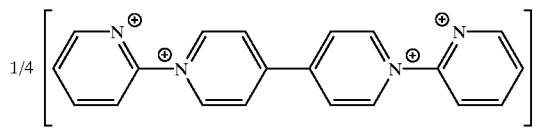
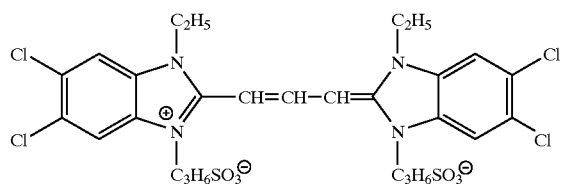
(I-30)
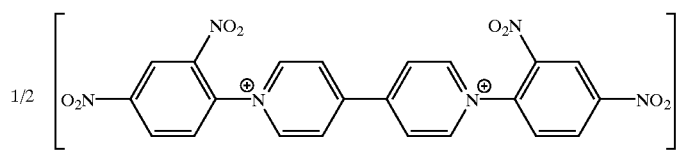
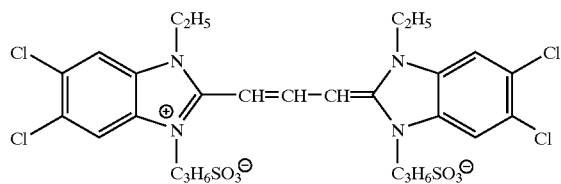
(I-31)
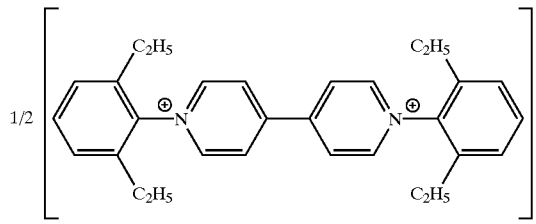
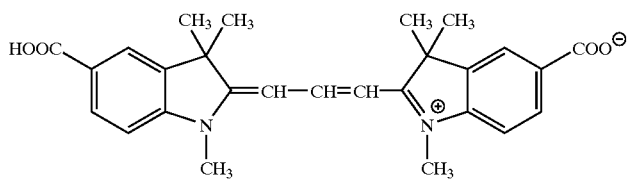
(I-32)

-continued
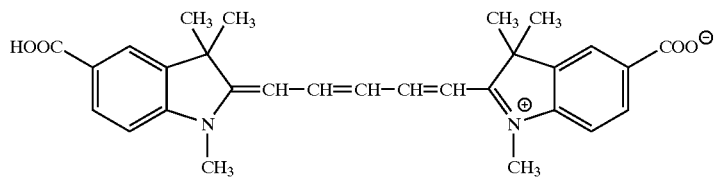
(I-33)
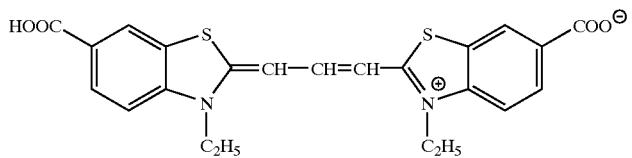
(I-34)
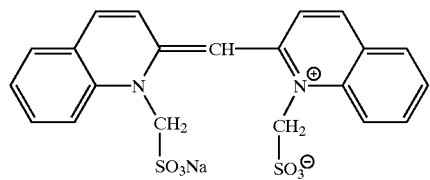
(I-35)
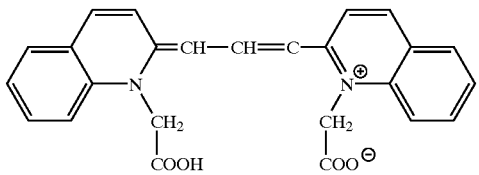
(I-36)
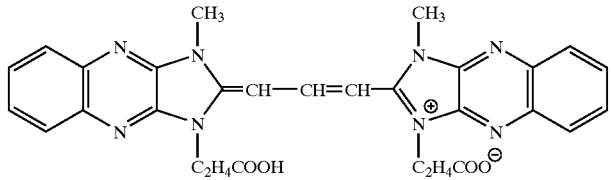
(I-37)
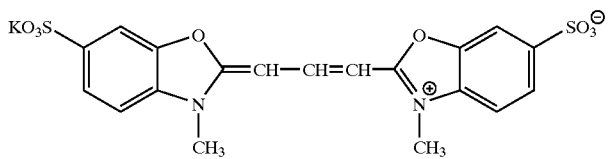
(I-38)
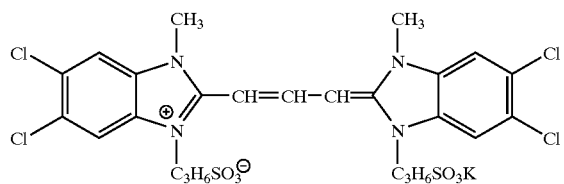
(I-39)

-continued

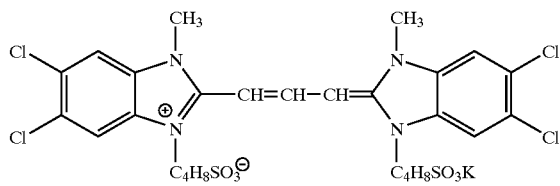
(I-40)

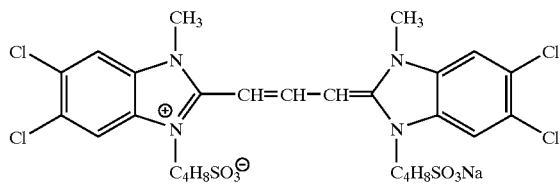
(I-41)

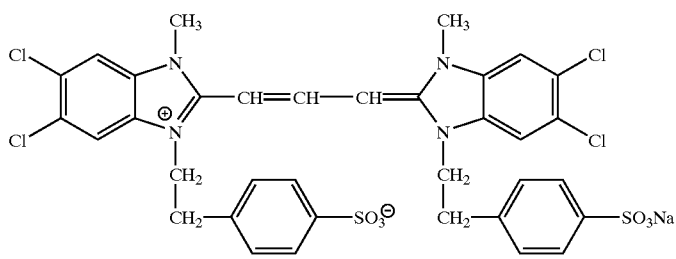
(I-42)

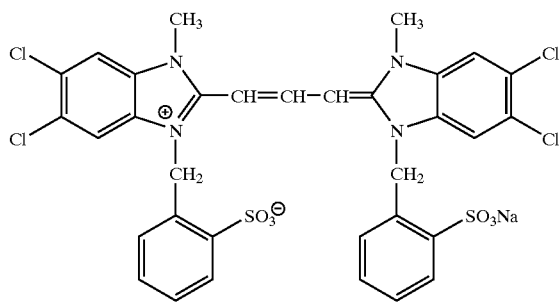
(I-43)

The cyanine dye represented by the formula (I) or (Ia) can be synthesized by referring to the descriptions of Japanese Patent Provisional Publication Nos. 5(1993)-88293 and 6(1994)-313939.

The asymmetric cyanine dye represented by the following formula (Ib) is further preferably used (in an aggregated form). The dye of the formula (Ib) in an aggregated form is excellent in stability and durability (particularly, against light).

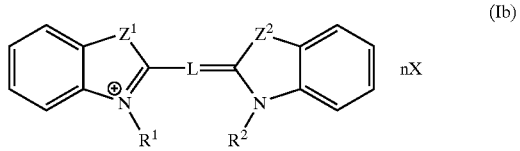
(Ib)

In the formula (Ib), L is a methine chain consisting of an odd number of methines. The number is preferably 1, 3 or 5 (more preferably 3).

The methine chain can have a substituent group. The substituent group is preferably placed at the centered methine (i.e., meso-position) of the chain. Examples of the substituent group include an alkyl group, an aryl group, an alkoxy group, an aryloxy group, a halogen atom, an alkoxycarbonyl group, a carbon halide group, an alkylthio group, an arylthio group, cyano, nitro, amino, an alkylamino group, an amido group, an acyloxy group, hydroxyl, sulfo and carboxyl. Examples and definition of each group are the same as those for the formula (I). Two substituent groups may be combined to form a five- or six-membered ring.

In the formula (Ib), each of $R^1$ and $R^2$ independently is an aliphatic group or an aromatic group. Preferably, each of $R^1$ and $R^2$ independently is an aliphatic group (more preferably, a substituted alkyl group).

The term "aliphatic group" means an alkyl group, a substituted alkyl group, an alkenyl group, a substituted alkenyl group, an alkynyl group, a substituted alkynyl group, an aralkyl group or a substituted aralkyl group.

The alkyl group may have a branched structure, and preferably has 1 to 20 carbon atoms.

The alkyl moiety of the substituted alkyl group is the same as the alkyl group described above. Examples of the substituent group of the substituted alkyl group include a halogen atom (Cl, Br, F), an alkoxycarbonyl group (e.g., methoxycarbonyl, ethoxycarbonyl), hydroxyl, sulfo and carboxyl. Each of sulfo and carboxyl can be in the form of a salt.

The alkenyl group may have a branched structure, and preferably has 2 to 10 carbon atoms. Examples of the alkenyl group include 2-pentenyl, vinyl, allyl, 2-butenyl and 1-propenyl.

The alkenyl moiety of the substituted alkenyl group is the same as the alkenyl group described above. Examples of the substituent group of the substituted alkenyl group are the same as those of the substituted alkyl group.

The alkynyl group may have a branched structure, and preferably has 2 to 10 carbon atoms. Examples of the alkynyl group include 2-pentynyl, ethynyl, 2-propynyl, 2-butynyl and 1-propynyl.

The alkynyl moiety of the substituted alkynyl group is the same as the alkynyl group described above. Examples of the substituent group of the substituted alkynyl group are the same as those of the substituted alkyl group.

The aralkyl group preferably has 7 to 12 carbon atoms. Examples of the aralkyl group include benzyl and phenethyl.

The aralkyl moiety of the substituted aralkyl group is the same as the aralkyl group described above. Examples of the substituent group of the substituted aralkyl group include an alkyl group (e.g., methyl, ethyl, propyl), an alkoxy group (e.g., methoxy, ethoxy), an aryloxy group (e.g., phenoxy, p-chlorophenoxy), a halogen atom (Cl, Br, F), an alkoxycarbonyl group (e.g., ethoxycarbonyl), a carbon halide group (e.g., trifluoromethyl), an alkylthio group (e.g., methylthio, ethylthio, butylthio), an arylthio group (e.g., phenylthio, o-carboxyphenylthio), cyano, nitro, amino, an alkylamino group (methylamino, ethylamino), an amido group (e.g., acetamido, propionamido), an acyloxy group (e.g., acetoxy, butyryloxy), hydroxyl, sulfo and carboxyl. Each of sulfo and carboxyl may be in the form of a salt.

The term "aromatic group" means an aryl group or a substituted aryl group.

Examples of the aryl group include phenyl and naphthyl.

The aryl moiety of the substituted aryl group is the same as the aryl group described above. Examples of the substituent group of the substituted aryl group are the same as those of the substituted aralkyl group.

In the formula (Ib), each of $Z^1$ and $Z^2$ independently is a divalent linking group selected from the group consisting of —$CR^3R^4$—, —$NR^5$—, —O—, —S— and —Se— provided that $Z^1$ differs from $Z^2$. Preferably, each of $Z^1$ and $Z^2$ independently is a divalent linking group selected from the group consisting of —$CR^3R^4$—, —$NR^5$—, —O— and —S— provided that $Z^1$ differs from $Z^2$. Each of $R^3$, $R^4$ and $R^5$ independently is hydrogen, an aliphatic group or an aromatic group.

In the formula (Ib), n is an integer of 0 or more. X is a counter balance ion. The number of n and the kind of X (whether X is a cation or an anion) are determined according to the number of anionic and cationic groups contained in the asymmetric cyanine dye represented by the formula (Ib). Usually, n is 0 or 1. Examples of the anion include a halide ion (e.g., Cl$^-$, Br$^-$, I$^-$), p-toluenesulfonate ion, ethylsulfate ion, $PF_6^-$, $BF_4^-$ and $ClO_4^-$. Examples of the cation include an alkali metal ion (e.g., Li$^+$, Na$^+$, K$^+$), ammonium ion, triethylammonium ion, tributylammonium ion, pyridinium ion, tetrabutylammonium ion.

In the formula (Ib), the two benzene rings may be further condensed with another benzene ring. In that case, they may be condensed at any of the three positions.

In the formula (Ib), the benzene rings or their condensed ring may have substituent groups. Examples of the substituent groups include an alkyl group, a substituted alkyl group, a cycloalkyl group, an aralkyl group, an alkoxy group, a substituted alkoxy group, an aryl group, a substituted aryl group, an aryloxy group, a substituted aryloxy group, a halogen atom (Cl, Br, F), an alkoxycarbonyl group, an alkylthio group, an arylthio group, a substituted arylthio group, an acyl group, an acyloxy group, amino, a substituted amino group, an amido group, a sulfonamido group, ureido, a substituted ureido group, carbamoyl, a substituted carbamoyl group, sulfamoyl, a substituted sulfamoyl group, an alkylsulfonyl group, an arylsulfonyl group, hydroxyl, cyano, nitro, sulfo, carboxyl and a heterocyclic group. Each of sulfo and carboxyl may be in the form of a salt.

The alkyl group may have a branched structure, and preferably has 1 to 20 carbon atoms. Examples of the alkyl group include methyl, ethyl, propyl and t-butyl.

The alkyl moiety of the substituted alkyl group is the same as the alkyl group described above. Examples of the substituent group of the substituted alkyl group include a halogen atom (Cl, Br, F), an alkoxy group (e.g., methoxy, ethoxy), hydroxyl and cyano. Examples of the substituted alkyl group include hydroxyethyl, methoxyethyl, cyanoethyl and trifluoromethyl.

Examples of the cycloalkyl group include cyclopentyl and cyclohexyl.

The aralkyl group preferably has 7 to 12 carbon atoms. Examples of the aralkyl group include benzyl and 2-phenethyl.

The alkoxy group may have a branched structure, and preferably has 1 to 12 carbon atoms. Examples of the alkoxy group include methoxy and ethoxy.

The alkoxy moiety of the substituted alkoxy group is the same as the alkoxy group described above. Examples of the substituent group of the substituted alkoxy group include an alkoxy group and hydroxyl. Examples of the subtituted alkoxy group include methoxyethoxy and hydroxyethoxy.

The aryl group is preferably phenyl.

The aryl moiety of the substituted aryl group is the same as the aryl group described above. Examples of the substituent group of the substituted aryl group include an alkyl group, an alkoxy group, a halogen atom and nitro. Examples of the substituted aryl group include p-tolyl, p-methoxyphenyl, o-chlorophenyl and m-nitrophenyl.

The aryloxy group is preferably phenoxy.

The aryloxy moiety of the substituted aryloxy group is the same as the aryloxy group described above. Examples of the substituent group of the substituted aryloxy group include an alkyl group, an alkoxy group and a halogen atom. Examples of the substituted aryloxy group include p-chlorophenoxy, p-methylphenoxy and o-methoxyphenyl.

The alkoxycarbonyl group preferably has 2 to 20 carbon atoms. Examples of the alkoxycarbonyl group include methoxycarbonyl and ethoxycarbonyl.

The alkylthio group preferably has 1 to 12 carbon atoms. Examples of the alkylthio group include methylthio, ethylthio and butylthio.

The arylthio group is preferably phenylthio.

The arylthio moiety of the substituted arylthio group is the same as the arylthio group described above. Examples of the substituent group of the substituted arylthio group include an alkyl group, an alkoxy group and carboxyl. Examples of the substituted arylthio group include p-methylphenylthio, p-methoxyphenylthio and o-carboxyphenylthio.

The acyl group preferably has 2 to 20 carbon atoms. Examples of the acyl group include acetyl and butyryl.

The acyloxy group preferably has 2 to 20 carbon atoms.
Examples of the acyloxy group include acetoxy and butyryloxy.

The substituted amino group preferably has 1 to 20 carbon atoms. Examples of the substituted amino group include methylamino, anilino and triazinylamino.

The amido group preferably has 2 to 20 carbon atoms. Examples of the amido group include acetamido, propionamido and isobutanamido.

The sulfonamido group preferably has 1 to 20 carbon atoms. Examples of the sulfonamido group include methanesulfonamido and benzenesulfonamido.

The substituted ureido group preferably has 2 to 20 carbon atoms. Examples of the substituted ureido group include 3-methylureido and 3,3-dimethylureido.

The substituted carbamoyl group preferably has 2 to 20 carbon atoms. Examples of the substituted carbamoyl group include methylcarbamoyl and dimethylcarbamoyl.

The substituted sulfamoyl group preferably has 1 to 20 carbon atoms. Examples of the substituted sulfamoyl group include dimethylsulfamoyl and diethylsulfamoyl.

The alkylsulfonyl group preferably has 1 to 20 carbon atoms. Examples of the alkylsulfonyl group include methanesulfonyl.

The arylsulfonyl group is preferably benzenesulfonyl.

Examples of the heterocyclic group include pyridyl and thienyl.

The cyanine dye represented by the formula (Ib) preferably has at least one water-soluble group, which means such a strongly hydrophilic group that the cyanine dye having the group is water-soluble. Examples of the water-soluble groups include sulfo, carboxyl, phosphono and salts thereof. Examples of the counter ions for the salts include an alkali metal ion (e.g., $Na^+$, $K^+$), ammonium ion, triethylammonium ion, tributylammonium ion, pyridinium ion, tetrabutylammonium ion and an onium ion represented by the above formula (IV).

Examples of the asymmetric cyanine dye represented by the formula (Ib) are shown below.

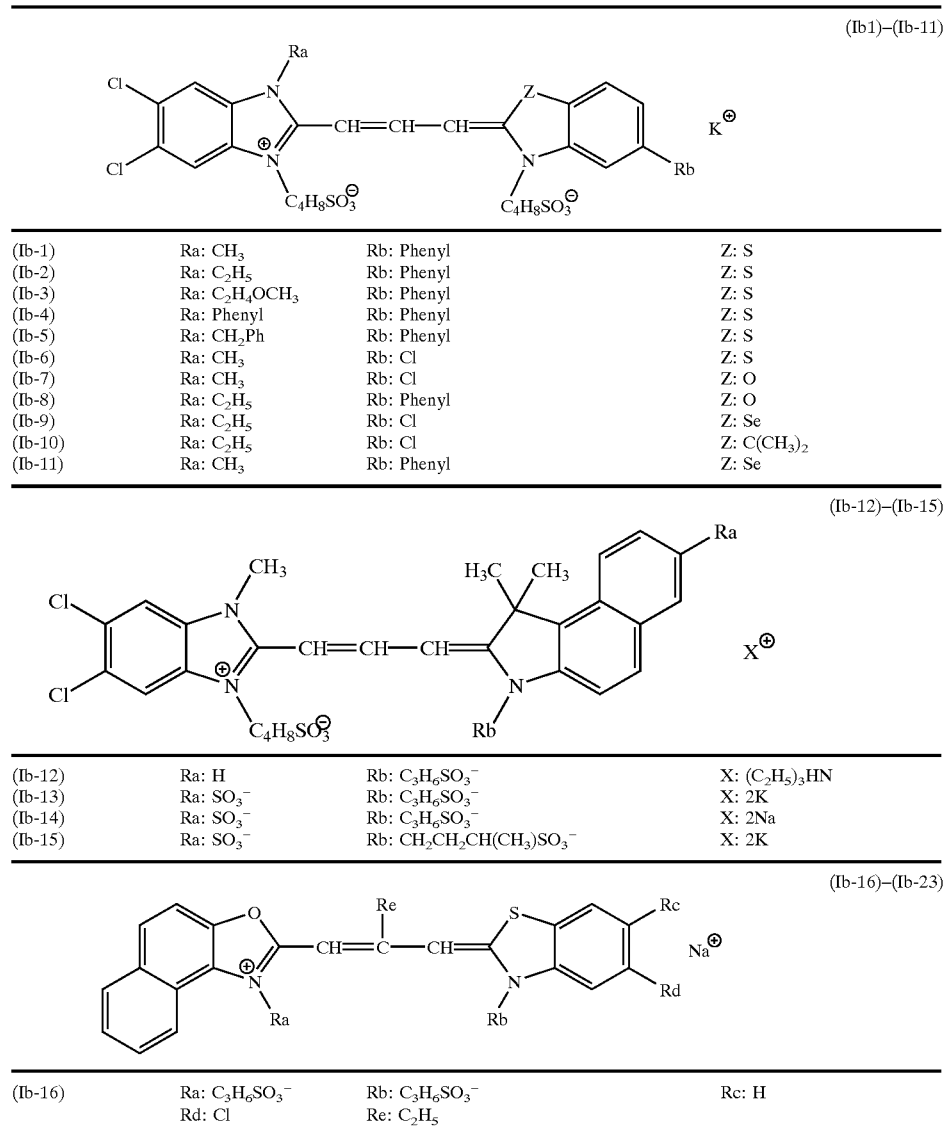

-continued

| | | | |
|---|---|---|---|
| (Ib-17) | Ra: $C_4H_8SO_3^-$<br>Rd: Cl | Rb: $C_4H_8SO_3^-$<br>Re: $C_2H_5$ | Rc: H |
| (Ib-18) | Ra: $C_2H_4SO_3^-$<br>Rd: Cl | Rb: $C_4H_8SO_3^-$<br>Re: $C_2H_5$ | Rc: Cl |
| (Ib-19) | Ra: $C_2H_4SO_3^-$<br>Rd: $CH_3$ | Rb: $C_2H_4SO_3^-$<br>Re: $C_2H_5$ | Rc: $CH_3$ |
| (Ib-20) | Ra: $C_4H_8SO_3^-$<br>Rd: $CH_3$ | Rb: $C_4H_8SO_3^-$<br>Re: $C_2H_5$ | Rc: $CH_3$ |
| (Ib-21) | Ra: $C_4H_8SO_3^-$<br>Rd: Phenyl | Rb: $C_3H_6SO_3^-$<br>Re: $C_2H_5$ | Rc: H |
| (Ib-22) | Ra: $C_4H_8SO_3^-$<br>Rd: $OCH_3$ | Rb: $C_4H_8SO_3^-$<br>Re: $CH_3$ | Rc: H |
| (Ib-23) | Ra: $C_4H_8SO_3^-$<br>Rd: $OCH_3$ | Rb: $C_4H_8SO_3^-$<br>Re: $CH_3$ | Rc: H |

(Ib-24)–(Ib-26)

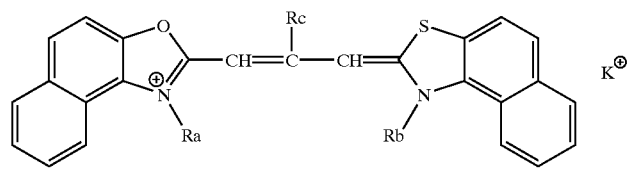

| (Ib-24) | Ra: $C_3H_6SO_3^-$ | Rb: $C_3H_6SO_3^-$ | Rc: H |
| (Ib-25) | Ra: $C_3H_6SO_3^-$ | Rb: $C_3H_6SO_3^-$ | Rc: $CH_3$ |
| (Ib-26) | Ra: $C_4H_8SO_3^-$ | Rb: $C_4H_8SO_3^-$ | Rc: $C_2H_5$ |

(Ib-27)

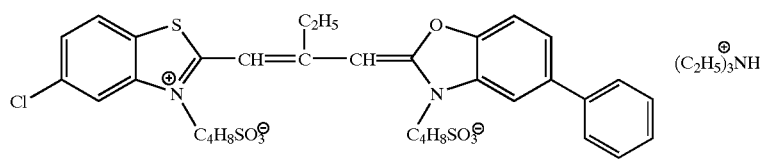

(Ib-28)

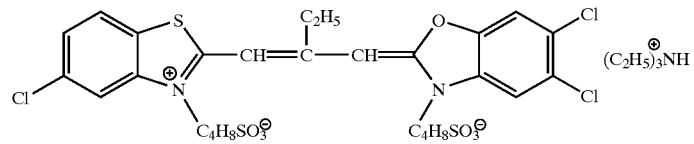

(Ib-29)

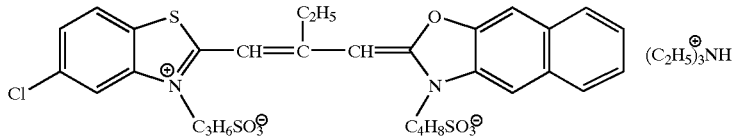

(Ib-30)

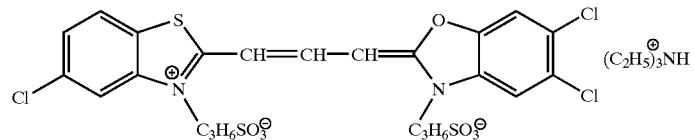

(Ib-31)

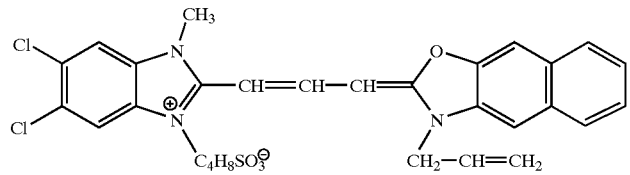

(Ib-32)

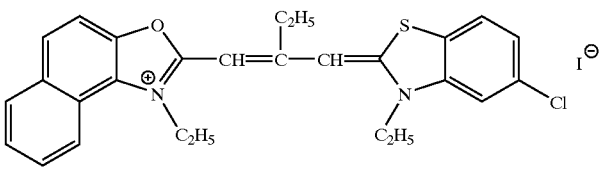

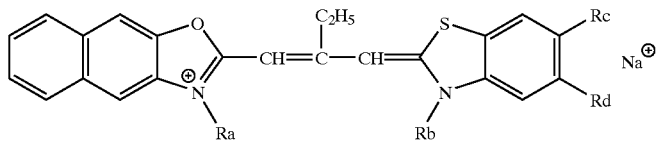

(Ib-33)–(Ib-40)

| | | | |
|---|---|---|---|
| (Ib-33) | Ra: $C_4H_8SO_3^-$<br>Rd: $OCH_3$ | Rb: $C_4H_8SO_3^-$ | Rc: H |
| (Ib-34) | Ra: $C_4H_8SO_3^-$<br>Rd: Cl | Rb: $C_4H_8SO_3^-$ | Rc: H |
| (Ib-35) | Ra: $C_4H_8SO_3^-$<br>Rd: Phenyl | Rb: $C_4H_8SO_3^-$ | Rc: H |
| (Ib-36) | Ra: $C_4H_8SO_3^-$<br>Rd: $CH_3$ | Rb: $C_4H_8SO_3^-$ | Rc: $CH_3$ |
| (Ib-37) | Ra: $C_4H_8SO_3^-$<br>Rd: Cl | Rb: $C_4H_8SO_3^-$ | Rc: Cl |
| (Ib-38) | Ra: $C_3H_6SO_3^-$<br>Rd: Cl | Rb: $C_4H_8SO_3^-$ | Rc: H |
| (Ib-39) | Ra: $C_3H_6SO_3^-$<br>Rd: Cl | Rb: $C_3H_6SO_3^-$ | Rc: H |
| (Ib-40) | Ra: $C_4H_8SO_3^-$<br>Rd: Phenyl | Rb: $C_3H_6SO_3^-$ | Rc: H |

The asymmetric cyanine dye represented by the formula (Ib) can be synthesized by referring to the descriptions of 'Heterocyclic Compounds Cyanine Dyes and Related Compounds' by F. M. Harmer [John Wiley and Sons, New York, London, 1964]; 'Heterocyclic Compounds-Special topics in heterocyclic chemistry' by D. M. Sturmer [Chapter 18, Section 14, pp. 482–515, John Wiley and Sons, New York, London, 1977]; 'Rodd's Chemistry of Carbon Compounds' [second edition, Vol. 4B, Chapter 15, pp. 369–422, Elsevier Science Publishing Company Inc., New York, 1977; Japanese Patent Provisional Publication Nos. 5(1993)-88293 and 6(1994)-313939.

The cyanine dye represented by the following formula (Ic) is also preferably used (particularly preferably used in an aggregated form). The dye of the formula (Ic) in an aggregated form is excellent in stability and durability (particularly, against light).

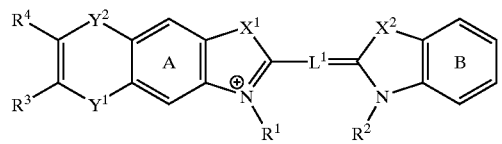

(Ic)

In the formula (Ic), each of $X^1$ and $X^2$ independently is —O—, —S—, —Se—, —$NR^5$— or —$CR^6R^7$—. Preferably, each of $X^1$ and $X^2$ independently is —O— or —S—.

In the formula (Ic), one of $Y^1$ and $Y^2$ is a single bond, —O—, —S— or —$NR^8$— (preferably, a single bond).

In the formula (Ic), the other of $Y^1$ and $Y^2$ is —O—, —S— or —$NR^9$—.

In the formula (Ic), $L^1$ is a methine chain consisting of an odd number of methines. The number is preferably 1, 3, 5 or 7 (more preferably 3). The methine chain may have a substituent group. Examples of the substituent group are the same as those of the substituted aryl group described below. Two substituent groups may be combined to form a five- or six-membered unsaturated alicyclic or aromatic ring. In the case where the chain has one substituted group, the substituent group is preferably placed at the centered methine (i.e., meso-position) of the chain.

In the formula (Ic), each of $R^1$ and $R^2$ independently is an aliphatic group or an aromatic group.

The term "an aliphatic group" means an alkyl group, a substituted alkyl group, an alkenyl group, a substituted alkenyl group, an alkynyl group, a substituted alkynyl group, an aralkyl group or a substituted aralkyl group.

The alkyl group may have a cyclic or chain structure. The chain alkyl group may have a branched structure. The alkyl group has preferably 1 to 20, more preferably 1 to 15, further preferably 1 to 12, furthermore preferably 1 to 10, and most preferably 1 to 8 carbon atoms. Examples of the alkyl group include methyl, ethyl, propyl, isopropyl, butyl, t-butyl, cyclopropyl, hexyl, cyclohexyl, 2-ethylhexyl and hexadecyl.

The alkyl moiety of the substituted alkyl group is the same as the alkyl group described above. Examples of the substituent group of the substituted alkyl group include a halogen atom, cyano, nitro, a heterocyclic group, —O—$R^{31}$, —CO—$R^{32}$, —CO—O—$R^{33}$, —O—CO—$R^{34}$, —$NR^{35}R^{36}$, —NH—CO—$R^{37}$, —CO—$NR^{38}R^{39}$, —NH—CO—$NR^{40}R^{41}$, —NH—CO—O—$R^{42}$, —S—$R^{43}$, —$SO_2$—$R^{44}$, —$SO_2$—O—$R^{45}$, —NH—$SO_2$—$R^{46}$ and —$SO_2$—$NR^{47}R^{48}$. Each of $R^{31}$, $R^{32}$, $R^{33}$, $R^{34}$, $R^{35}$, $R^{36}$, $R^{37}$, $R^{38}$, $R^{39}$, $R^{40}$, $R^{41}$, $R^{42}$, $R^{43}$, $R^{44}$, $R^{45}$, $R^{46}$, $R^{47}$ and $R^{48}$ is independently hydrogen, an aliphatic group, an aromatic group or a heterocyclic group. In the case where $R^{33}$ is hydrogen (i.e., where —CO—O—$R^{33}$ is carboxyl) or in the case where $R^{45}$ is hydrogen (i.e., where —$SO_2$—O—$R^{45}$ is sulfo), the hydrogen may be dissociated or in the form of a salt. Examples of the substituted alkyl group include 2-hydroxyethyl, 2-catboxyethyl, 2-methoxyethyl, 2-diethylaminoethyl, 3-sulfopropyl and 4-sulfobutyl.

The alkenyl group may have a cyclic or chain structure. The chain alkenyl group may have a branched structure. The alkenyl group has preferably 2 to 20, more preferably 2 to 15, further preferably 2 to 12, furthermore preferably 2 to 10, and most preferably 2 to 8 carbon atoms. Examples of the alkenyl group include vinyl, allyl, 1-propenyl, 2-butenyl, 2-pentenyl and 2-hexenyl.

The alkenyl moiety of the substituted alkenyl group is the same as the alkenyl group described above. Examples of the substituent group of the substituted alkenyl group are the same as those of the substituted alkyl group.

The alkynyl group may have a cyclic or chain structure. The chain alkynyl group may have a branched structure. The alkynyl group has preferably 2 to 20, more preferably 2 to 15, further preferably 2 to 12, furthermore preferably 2 to 10, and most preferably 2 to 8 carbon atoms.

The alkynyl moiety of the substituted alkynyl group is the same as the alkynyl group described above. Examples of the substituent group of the substituted alkynyl group are the same as those of the substituted alkyl group.

The alkyl moiety of the aralkyl group is the same as the alkyl group described above. The aryl moiety of the aralkyl group is the same as the aryl group described after. Examples of the aralkyl group include benzyl and phenethyl.

The alkyl moiety of the substituted aralkyl group is the same as the alkyl group described above. The aryl moiety of the substituted aralkyl group is the same as the aryl group described after. Examples of the substituent group of the alkyl moiety in the substituted aralkyl group are the same as those of the substituted alkyl group. Examples of the substituent group of the aryl moiety in the substituted aralkyl group are the same as those of the substituted aryl group described after.

The above "aromatic group" means an aryl group or a substituted aryl group.

The aryl group has preferably 6 to 25, more preferably 6 to 20, further preferably 6 to 15, and most preferably 6 to 10 carbon atoms. Examples of the aryl group include phenyl and naphthyl.

The aryl moiety of the substituted aryl group is the same as the aryl group described above.

Examples of the substituent group of the substituted aryl group include a halogen atom, cyano, nitro, an aliphatic group, an aromatic group, a heterocyclic group, —O—R$^{51}$, —CO—R$^{52}$, —CO—O—R$^{53}$, —O—CO—R$^{54}$, —NR$^{55}$R$^{56}$, —NH—CO—R$^{57}$, —CO—NR$^{58}$R$^{59}$, —NH—CO—NR$^{60}$R$^{61}$, —NH—CO—O—R$^{62}$, —S—R$^{63}$, —SO$_2$—R$^{64}$, —SO$_2$—O—R$^{65}$, —NH—SO$_2$—R$^{66}$ and —SO$_2$—NR$^{67}$R$^{68}$. Each of R$^{51}$, R$^{52}$, R$^{53}$, R$^{54}$, R$^{55}$, R$^{56}$, R$^{57}$, R$^{58}$, R$^{59}$, R$^{60}$, R$^{61}$, R$^{62}$, R$^{63}$, R$^{64}$, R$^{65}$, R$^{66}$, R$^{67}$ and R$^{68}$ is independently hydrogen, an aliphatic group, an aromatic group or a heterocyclic group. In the case where R$^{53}$ is hydrogen (i.e., where —CO—O—R$^{53}$ is carboxyl) or in the case where R$^{65}$ is hydrogen (i.e., where —SO$_2$—O—R$^{65}$ is sulfo), the hydrogen may be dissociated or in the form of a salt. Examples of the substituted aryl group include 4-carboxyphenyl, 4-acetoamidophenyl, 3-methanesulfonamidophenyl, 4-methoxyphenyl, 3-carboxyphenyl, 3,5-dicarboxyphenyl, 4-methanesulfonamidophenyl and 4-butanesulfonamidophenyl.

The above heterocyclic group may have a substituent group. The heterocyclic ring in the heterocyclic group preferably consists of five or six members. The heterocyclic ring may be condensed with an alicyclic ring, an aromatic ring or another heterocyclic ring. Examples of the heterocyclic (condensed) ring in the heterocyclic group include pyridine ring, piperidine ring, furan ring, furfuran ring, thiophene ring, pyrrole ring, quinolylmorpholine ring, pyrrole ring, indole ring, imidazole ring, pyrazole ring, quinoline ring, carbazole ring, phenothiazine ring, phenoxazine ring, indoline ring, thiazole ring, pyrazine ring, thiadiazine ring, benzoquinoline ring and thiadiazole ring.

Examples of the substituent group of the heterocyclic group are the same as those of the substituted aryl group described above.

In the formula (Ic), each of R$^3$ and R$^4$ independently is hydrogen or an aliphatic group, or otherwise R$^3$ and R$^4$ are combined to form an aromatic ring. The aromatic ring is preferably benzene ring or naphthalene ring, more preferably benzene ring.

In the formula (Ic), each of R$^5$, R$^6$, R$^7$, R$^8$ and R$^9$ independently is hydrogen or an aliphatic group, or otherwise R$^6$ and R$^7$ are combined to form an alicyclic ring. The alicyclic ring preferably is a saturated alicyclic ring, more preferably is a five- or six-membered alicyclic ring (i.e., cyclopentene ring or cyclohexane ring).

In the formula (Ic), the benzene ring B may be condensed with a heterocyclic ring or an aromatic ring.

In the formula (Ic), each of the benzene ring A, the benzene ring B, the ring condensed with the benzene ring B, and the aromatic ring formed by R$^3$ and R$^4$ may have substituent groups. Examples of the substituent group are the same as those of the substituted aryl group described above.

The cyanine dye represented by the following formula (Id) is further preferred.

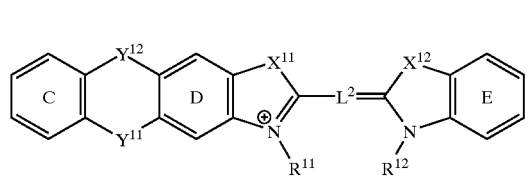

(Id)

In the formula (Id), each of X$^{11}$ and X$^{12}$ independently is —O—, —S—, —Se—, NR$^{13}$ or —CR$^{14}$R$^{15}$. Preferably, each of X$^{11}$ and X$^{12}$ independently is —O— and —S—.

In the formula (Id), one of Y$^{11}$ and Y$^{12}$ is a single bond, —O—, —S— or —NR$^{16}$— (preferably, a single bond) In the formula (Id), the other of Y$^{11}$ and Y$^{12}$ is —O—, —S— or —NR$^{17}$—.

In the formula (Id), L$^2$ is a methine chain consisting of an odd number of methines. The number is preferably 1, 3 or 5, more preferably 3. The methine chain can have a substituent group. Examples of the substituent group are the same as those of the substituted aryl group described above. Two substituent groups may be combined to form a five- or six-membered unsaturated alicyclic or aromatic ring. If the methine chain has one substituent group, the substituent group is preferably placed at the centered methine (i.e., meso-position) of the chain.

In the formula (Id), each of R$^{11}$ and R$^{12}$ independently is an aliphatic group or an aromatic group.

In the formula (Id), each of R$^{13}$, R$^{14}$, R$^{15}$, R$^{16}$ and R$^{17}$ independently is hydrogen or an aliphatic group, or otherwise R$^{14}$ and R$^{15}$ are combined to form an alicyclic ring. The alicyclic ring preferably is a saturated alicyclic ring, more preferably is a five- or six-membered alicyclic ring (i.e., cyclopentene ring or cyclohexane ring).

In the, formula (Id), the benzene ring E may be condensed with a heterocyclic ring or an aromatic ring.

In the formula (Id), each of the benzene ring C, the benzene ring D, the benzene ring E and the ring condensed with the benzene ring E may have substituent groups. Examples of the substituent group are the same as those of the substituted aryl group described above.

The cyanine dye represented by the following formula (Ie) is furthermore preferred.

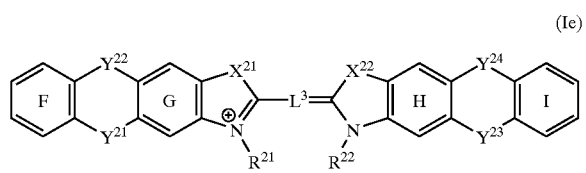

(Ie)

In the formula (Ie), each of $X^{21}$ and $X^{22}$ independently is —O—, —S—, —Se—, —NR$^{23}$— or —CR$^{24}$R$^{25}$—. Preferably, each of $X^{21}$ and $X^{22}$ independently is —O— and —S—.

In the formula (Ie), one of $Y^{21}$ and $Y^{22}$ is a single bond, —O—, —S— or —NR$^{26}$— (preferably, a single bond).

In the formula (Ie), the other of $Y^{21}$ and $Y^{22}$ is —O—, —S— or —NR$^{27}$—.

In the formula (Ie), one of $Y^{23}$ and $Y^{24}$ is a single bond, —O—, —S— or —NR$^{28}$— (preferably, a single bond).

In the formula (Ie), the other of $Y^{23}$ and $Y^{24}$ is —O—, —S— or NR$^{29}$—.

In the formula (Ie), $L^3$ is a methine chain consisting of an odd number of methines. The number is preferably 1, 3 or 5, more preferably 3.

The methine chain can have a substituent group. Examples of the substituent group are the same as those of the substituted aryl group described above. Two substituent groups may be combined to form a five- or six-membered unsaturated alicyclic or aromatic ring. If the methine chain has one substituent group, the substituent group is preferably placed at the centered methine (i.e., meso-position) of the chain.

In the formula (Ie), each of $R^{21}$ and $R^{22}$ independently is an aliphatic group or an aromatic group.

In the formula (Ie), each of $R^{23}$, $R^{24}$, $R^{25}$, $R^{26}$, $R^{27}$, $R^{28}$ and $R^{29}$ independently is hydrogen or an aliphatic group, or otherwise $R^{24}$ and $R^{25}$ are combined to form an alicyclic ring. The alicyclic ring preferably is a saturated alicyclic ring, more preferably is a five- or six-membered alicyclic ring (i.e., cyclopentene ring or cyclohexane ring).

In the formula (Ie), each of the benzene ring F, the benzene ring G, the benzene ring H and the benzene ring I may have substituent groups. Examples of the substituent group are the same as those of the substituted aryl group described above.

The cyanine dye represented by each of the formulas (Ic) to (Ie) may have an anion or a cation to keep the charge balance.

Examples of the cation include proton, metal ions and ammonium ion. As the metal ions, alkali metal ions (e.g., Na$^+$, K$^+$, Li$^+$) are preferred. Examples of the ammonium ion include organic ammonium ions (e.g., tetramethylammonium ion, triethylammonium ion).

Examples of the anion include a halide ion (e.g., Cl$^-$, Br$^-$, I$^-$), p-toluenesulfonate ion, ethylsulfate ion, PF$_6^-$, BF$_4^-$ and ClO$_4^-$.

The cyanine dye represented by each of the formulas (Ic) to (Ie) preferably has at least one water-soluble group, which means such a strongly hydrophilic group that. the cyanine dye having the group is water-soluble. Examples of the water-soluble groups include sulfo, carboxyl, phosphono and salts thereof. Examples of the counter ions for the salts include an alkali metal ion (e.g., Na$^+$, K$^+$), ammonium ion, triethylammonium ion, tributylammonium ion, pyridinium ion, tetrabutylammonium ion and an onium ion represented by the aforementioned formula (IV).

Examples of the cyanine dyes represented by the formulas (Ic) to (Ie) are shown below:

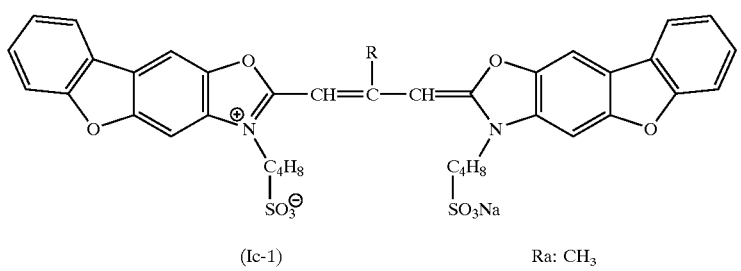

(Ic-1)–(Ic-4)

(Ic-1)   Ra: CH$_3$
(Ic-2)   Ra: C$_2$H$_5$
(Ic-3)   Ra: C$_3$H$_7$
(Ic-4)   Ra: C$_4$H$_9$

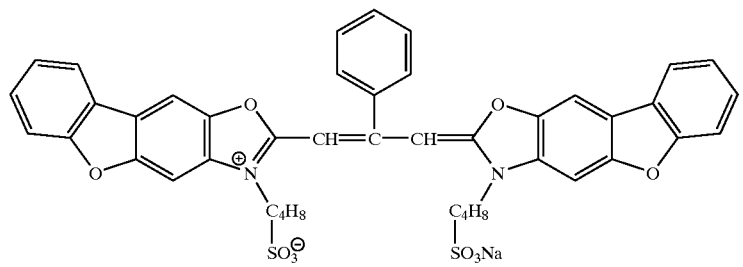

(Ic-5)

-continued
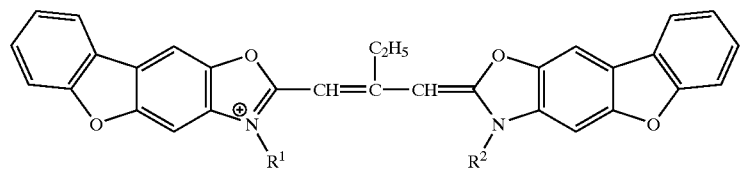
(Ic-6)–(Ic-8)
| | | |
|---|---|---|
| (Ic-6) | R$^1$: C$_3$H$_6$SO$_3^-$ | R$^2$: C$_3$H$_6$SO$_3$K |
| (Ic-7) | R$^1$: C$_2$H$_4$SO$_3^-$ | R$^2$: C$_2$H$_4$SO$_3$·(C$_2$H$_5$)$_3$N$^+$H |
| (Ic-8) | R$^1$: C$_2$H$_4$CO$_2^-$ | R$^2$: C$_2$H$_4$CO$_2$K |
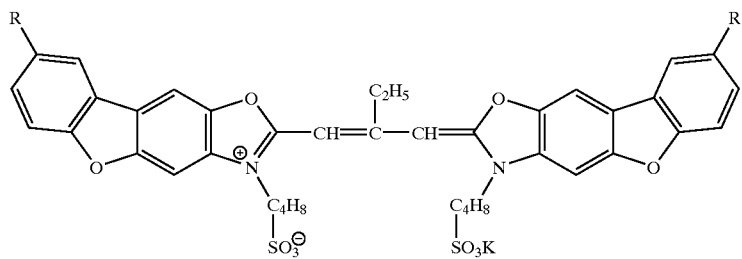
(Ic-9)–(Ic-12)
| | |
|---|---|
| (Ic-9) | Ra: Cl |
| (Ic-10) | Ra: SO$_3$K |
| (Ic-11) | Ra: CO$_2$K |
| (Ic-12) | Ra: OH |
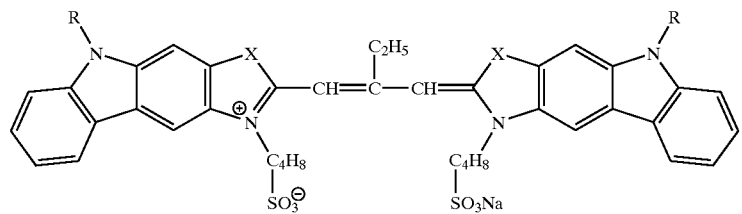
(Ic-13)–(Ic-18)
| | | |
|---|---|---|
| (Ic-13) | X: O | R: H |
| (Ic-14) | X: O | R: CH$_3$ |
| (Ic-15) | X: O | R: C$_2$H$_5$ |
| (Ic-16) | X: O | R: C$_4$H$_8$SO$_3^-$ |
| (Ic-17) | X: S | R: CH$_3$ |
| (Ic-18) | X: Se | R: CH$_3$ |
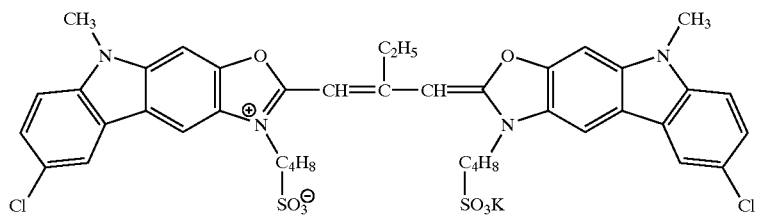
(Ic-19)
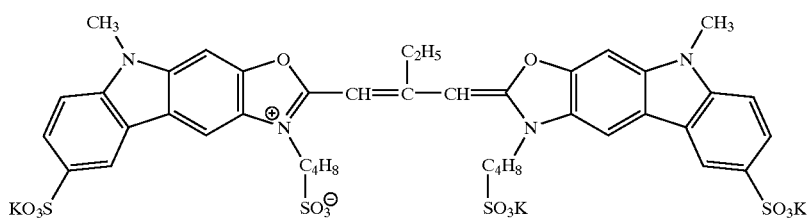
(Ic-20)

-continued
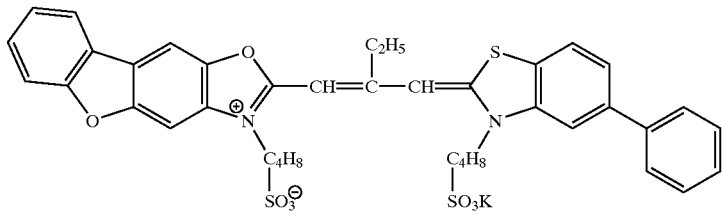
(Ic-21)
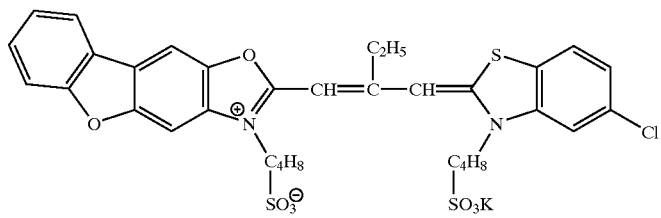
(Ic-22)
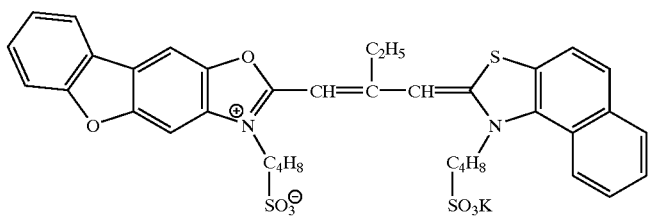
(Ic-23)
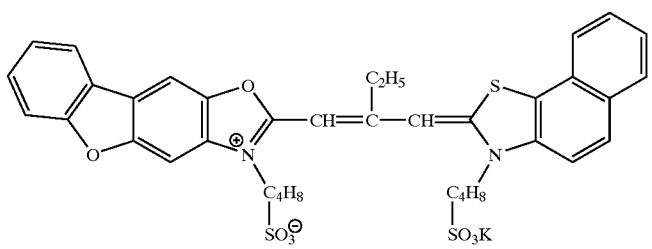
(Ic-24)
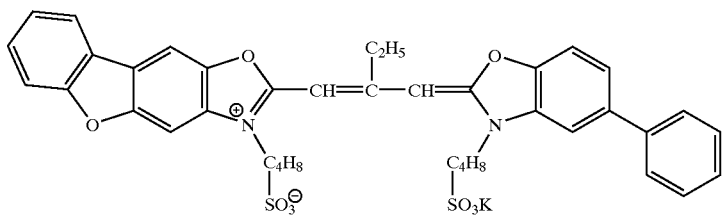
(Ic-25)
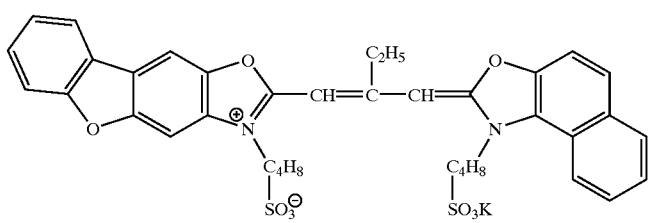
(Ic-26)

-continued
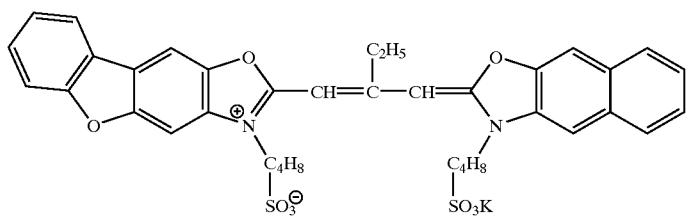
(Ic-27)
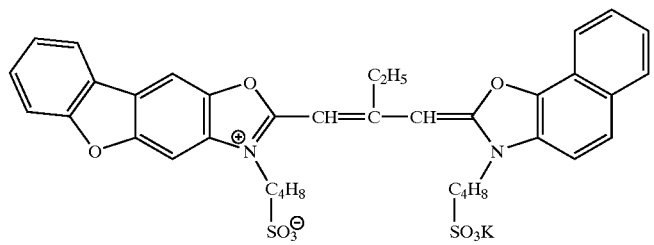
(Ic-28)
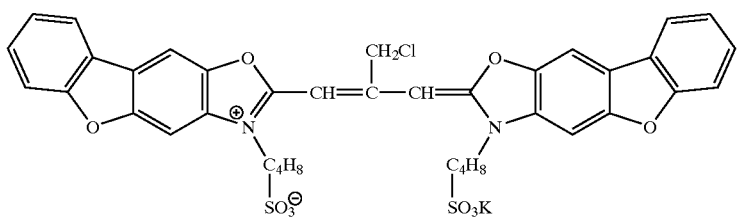
(Ic-29)
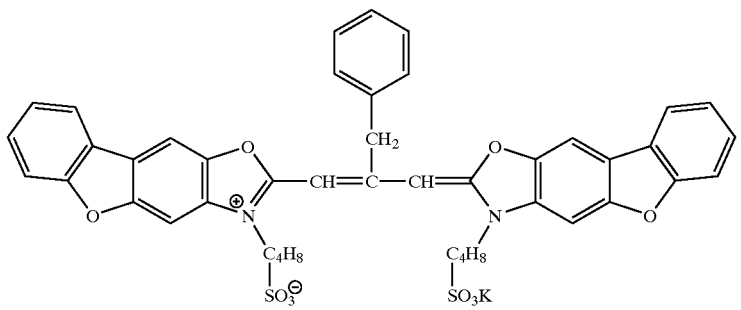
(Ic-30)
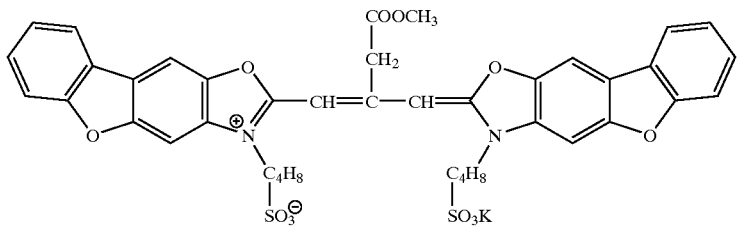
(Ic-31)
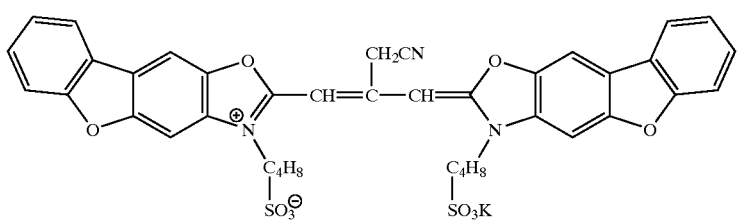
(Ic-32)

-continued
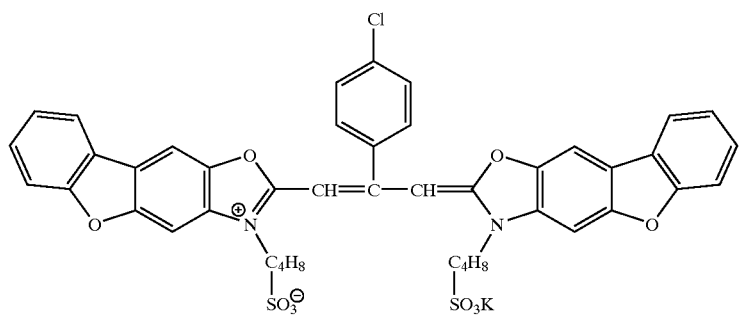
(Ic-33)
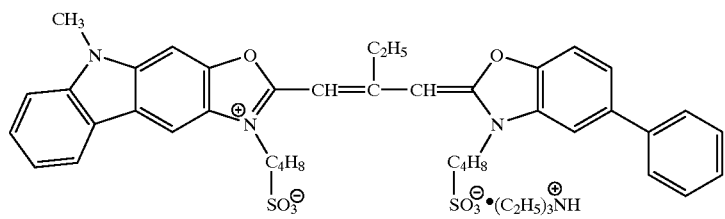
(Ic-34)
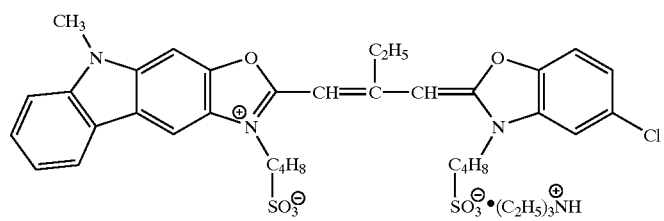
(Ic-35)
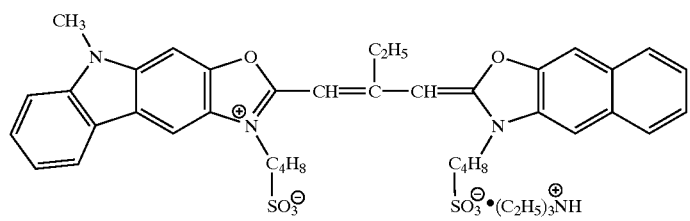
(Ic-36)
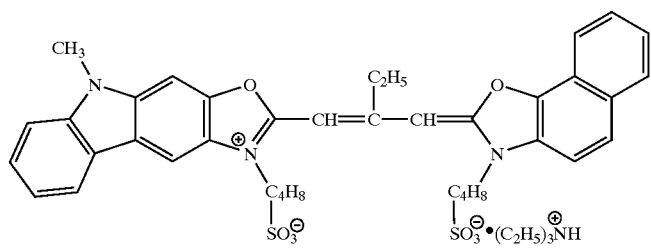
(Ic-37)
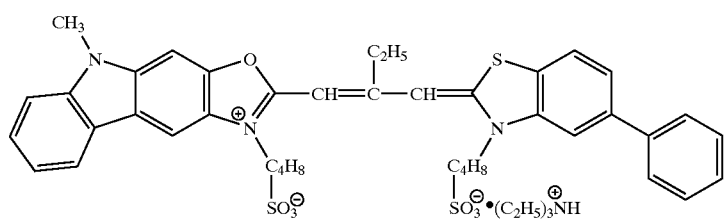
(Ic-38)

-continued
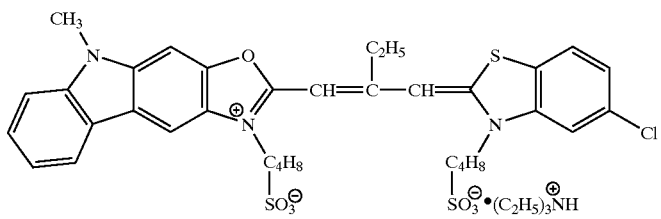
(Ic-39)
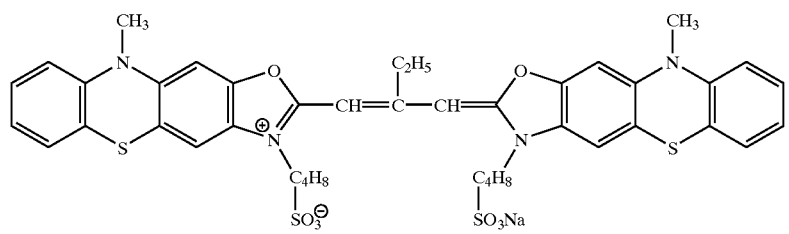
(Ic-40)
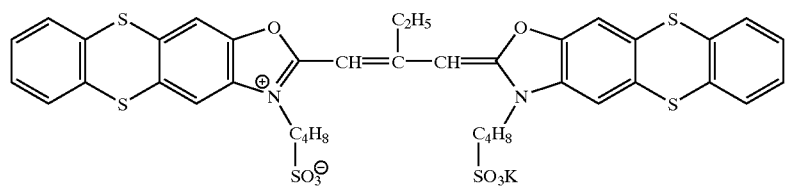
(Ic-41)
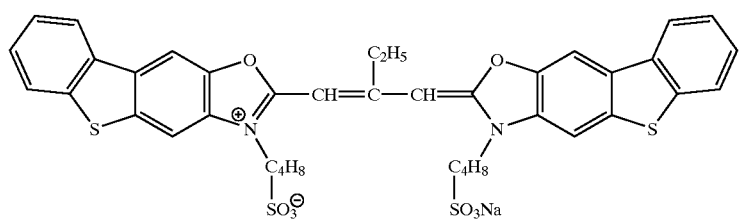
(Ic-42)
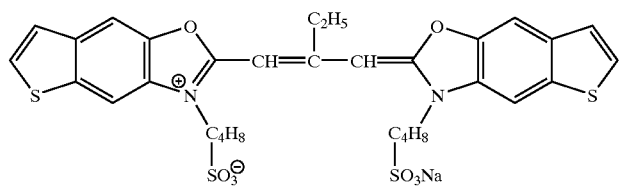
(Ic-43)
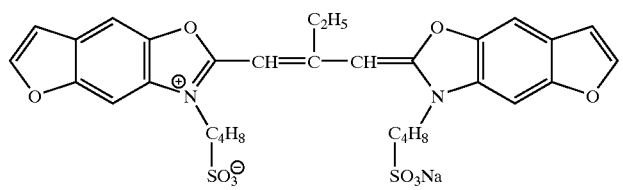
(Ic-44)

-continued
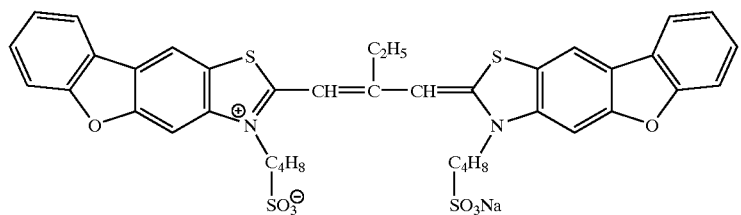
(Ic-45)
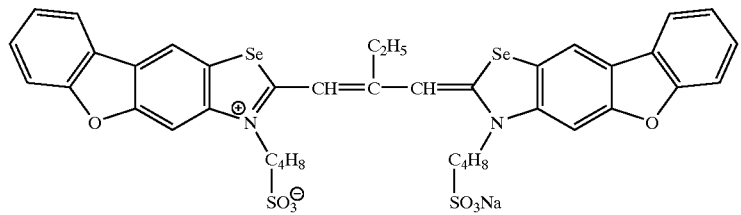
(Ic-46)
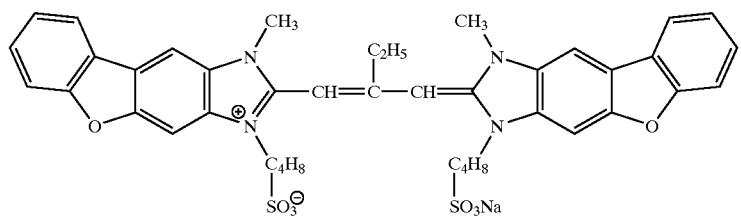
(Ic-47)
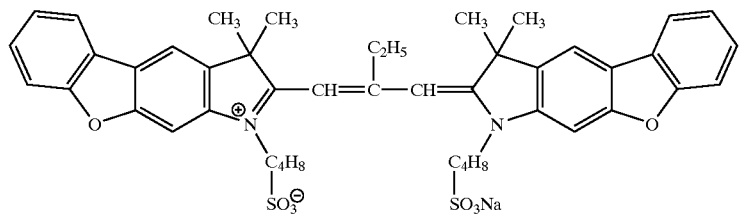
(Ic-48)
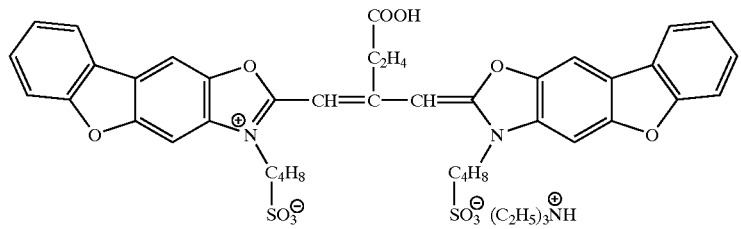
(Ic-49)
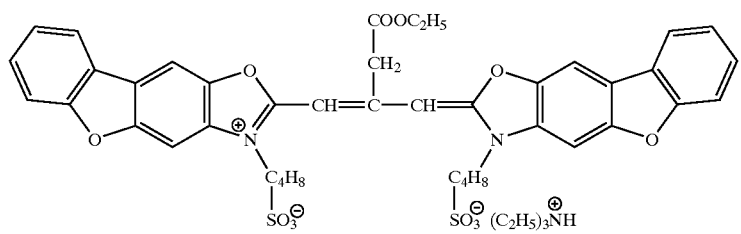
(Ic-50)

-continued (Ic-51)
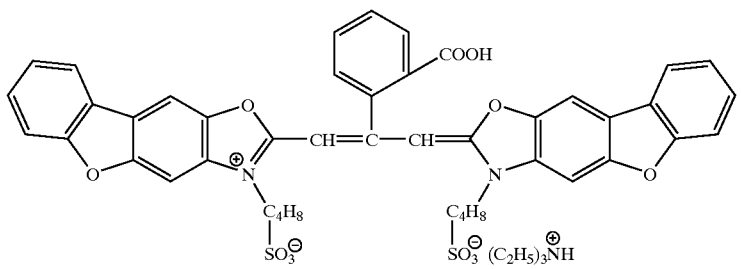

(Ic-52)
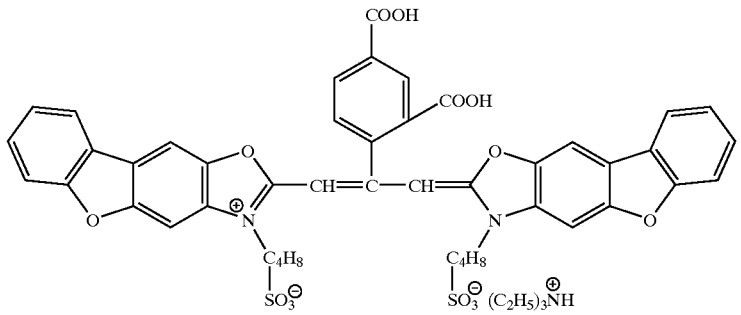

(Ic-53)
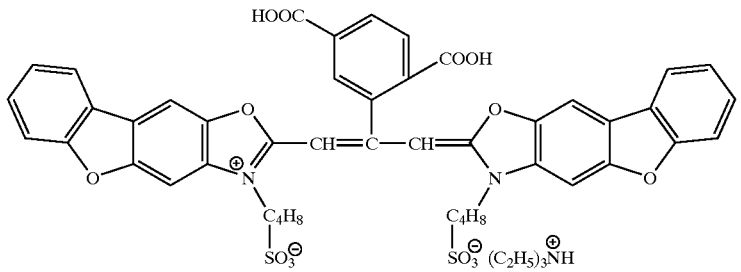

The cyanine dyes represented by the formulas (Ic) to (Ie) can be synthesized by referring to the descriptions of 'Heterocyclic Compounds Cyanine Dyes and Related Compounds' by F. M. Harmer [John Wiley and Sons, New York, London, 1964]; 'Heterocyclic Compounds-Special topics in heterocyclic chemistry' by D. M. Sturmer [Chapter 18, Section 14, pp. 482–515, John Wiley and Sons, New York, London, 1977]; 'Rodd's Chemistry of Carbon Compounds' [second edition, Vol. 4B, Chapter 15, pp. 369–422, Elsevier Science Publishing Company Inc., New York, 1977; Japanese Patent Provisional Publication Nos. 5(1993)-88293 and 6(1994)-313939.

The oxonol dye is defined by the following formula.

in which Ak is an acidic nucleus of a keto type; Ae is an acidic nucleus of an enol type; and Lo is a methine chain consisting of an odd number of methines.

The oxonol dye represented by the following formula (II) is preferably used (particularly, in an aggregated form).

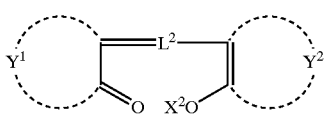

In the formula (II), each of $Y^1$ and $Y^2$ independently is a group of non-metallic atoms forming an alicyclic ring or a heterocyclic ring. The heterocyclic ring is preferred to the alicyclic ring. Examples of the alicyclic ring include indanedione ring. Examples of the heterocyclic ring include 5-pyrazolone ring, oxazolone ring, barbituric acid ring, pyridone ring, rhodanine ring, pyrazolidinedione ring, pyrazolopyridone ring and merdramic acid ring. The alicyclic ring or the heterocyclic ring can have a substituent group. Examples of the substituent group include an alkyl group (e.g., methyl, ethyl, propyl), a alkoxy group (e.g., methoxy, ethoxy), an aryloxy group (e.g., phenoxy, p-chlorophenoxy), a halogen atom (Cl, Br, F), an alkoxycarbonyl group (e.g., ethoxycarbonyl), a carbon halide group (e.g., trifluoromethyl), an alkylthio group (e.g., methylthio, ethylthio, butylthio), an arylthio group (e.g., phenylthio, o-carboxylphenylthio), cyano, nitro, amino, an alkylamino group (e.g., methylamino, ethylamino), an amido group (e.g., acetamide, propionamide), an acyloxy group (e.g., acetoxy, butyryloxy), hydroxyl, sulfo and carboxyl. Each of sulfo and carboxyl can be in the form of a salt.

In the formula (II), $L^2$ is a methine chain consisting of an odd number of methines. The number is preferably 3, 5 or 7.

The methine chain can have a substituent group. In that case, the substituent group is preferably placed at the centered methine (i.e., meso-position) of the chain. Examples of the substituent group include an alkyl group, an aryl group, an alkoxy group, an aryloxy group, a halogen atom, an alkoxycarbonyl group, a carbon halide group, an alkylthio group, an arylthio group, cyano, nitro, amino, an alkylamino group, an amido group, an acyloxy group, hydroxyl, sulfo and carboxyl. However, the methine chain preferably has no substituent group.

In the formula (II), $X^2$ is hydrogen or a cation. Examples of the cation include an alkali metal ion (e.g., $Na^+$, $K^+$), ammonium ion, triethylammonium ion, tributylammonium ion, pyridinium ion and tetrabutylammonium ion.

Examples of the oxonol dye represented by the formula (II) are shown below:

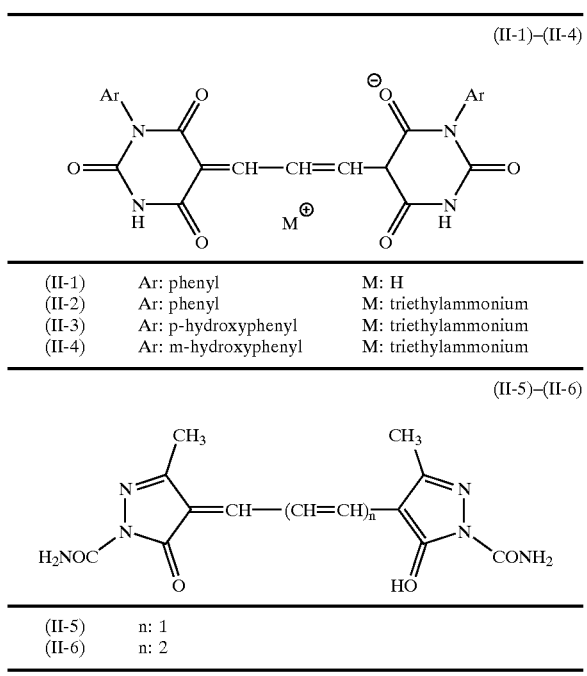

| | | |
|---|---|---|
| (II-1) | Ar: phenyl | M: H |
| (II-2) | Ar: phenyl | M: triethylammonium |
| (II-3) | Ar: p-hydroxyphenyl | M: triethylammonium |
| (II-4) | Ar: m-hydroxyphenyl | M: triethylammonium |

| | |
|---|---|
| (II-5) | n: 1 |
| (II-6) | n: 2 |

The oxonol dye represented by the formula (II) can be synthesized by referring to the descriptions of Japanese Patent Provisional Publication No. 7(1995)-230671, European Pat. No. 0,778,493 and U.S. Pat. No. 5,459,265.

As the aggregated dye, a compound in which 2 to 100 methine dye molecules are chemically combined can be also preferably used.

In an aggregation of that methine dye, many methine dye molecules are two-dimensionally combined to form planes, which are further three-dimensionally aggregated. The compound comprising chemically combined plural methine dye molecules has characteristics similar to those of two-dimensionally aggregated methine dye molecules, and accordingly the compound easily forms aggregations. Further, the aggregations have excellent stability since the chemical bonds partially contribute toward forming them.

The methine dye is categorized into cyanine dye, mero-, cyanine dye, arylidene dye, styryl dye and oxonol dye. The cyanine dye and the oxonol dye are defined by the aforementioned formulas. The merocyanine dye, the arylidene dye and the styryl dye are defined by the following formulas:

Merocyanine dye: Bs=Le–Ak

Arylidene dye: Ak=Lo–Ar

Styryl dye: Bo–Le–Ar in which Bs is a basic nucleus; Bo is an onium form of a basic nucleus; Ak is an acidic nucleus of a keto type; Ar is an aromatic nucleus; Lo is a methine chain consisting of an odd number of methines; and Le is a methine chain consisting of an even number of methines.

Aggregations of a compound in which 2 to 100 cyanine dye molecules are chemically combined are particularly preferred. The cyanine dye molecules chemically combined are preferably compounds represented by the aforementioned formula (I).

The number of the above-described chemically combined methine (preferably cyanine) dye molecules are 2 to 100, preferably 2 to 50, more preferably 2 to 20, further preferably 2 to 10, furthermore preferably 2 to 5, and most preferably 2 or 3.

Plural methine dye molecules may be different from each other. The position where the molecules are chemically combined may be the two nuclei (basic nucleus and onium form of basic nucleus in cyanine dye) or the methine chain. Preferably, the molecules are combined through a single bond or a divalent linking group.

Examples of the divalent linking group include an alkylene group (e.g., methylene, ethylene, propylene, butylene, pentylene), an alkenylene group (e.g., vinylene, propenylene), an alkynylene group (e.g., ethynylene, propynylene), an arylene group (e.g., phenylene, naphthylene), a divalent heterocyclic group (6-chloro-1,3,5-triazine-2,4-diyl, pyrimidine-2,4-diyl, quinoxaline-2,3-diyl), —O—, —CO—, —NR— (where R is hydrogen, an alkyl group or an aryl group), —S—, —$SO_2$—, —SO— and combinations thereof.

Each of the alkylene group, the alkenylene group, the arylene group, the divalent heterocyclic group, the alkyl group as R and the aryl group as R may have a substituent group. Preferred examples of the substituent group include an alkyl group, a cycloalkyl group, an aralkyl group, an alkoxy group, an aryl group, an aryloxy group, a halogen atom (Cl, Br, F), an alkoxycarbonyl group, an alkylthio group, an arylthio group, an acyl group, an acyloxy group, amino, a substituted amino group, an amido group, a sulfonamido group, ureido, a substituted ureido group, carbamoyl, a substituted carbamoyl group, sulfamoyl, a substituted sulfamoyl group, an alkylsulfonyl group, an arylsulfonyl group, hydroxyl, cyano, nitro, sulfo, carboxyl and a heterocyclic group. Each of sulfo and carboxyl may be in the form of a salt. Examples and definition of each group are the same as those of the substituent group of the nitrogen-containing heterocyclic ring and the condensed ring in the formula (I).

More preferred examples of the divalent linking group include an alkylene group having 1 to 10 carbon atoms, an alkenylene group having 2 to 10 carbon atoms (e.g., vinylene, propenylene), an alkynylene group having 2 to 10 carbon atoms, an arylene group having 6 to 10 carbon atoms, —O—, —CO—, —NH—, —$SO_2$— and combinations thereof.

The total number of carbon atoms in the divalent linking group is preferably 0 to 100, more preferably 1 to 50, further preferably 1 to 20, and most preferably 1 to 10.

The compound comprising combined methine dye molecules is preferably water-soluble. The term "water soluble" means a solubility of 0.01 wt. % or more in water at 25° C. The solubility is preferably 0.02 wt. % or more.

The compound preferably has at least one water-soluble group, which means such a strongly hydrophilic group that the compound having the group is water-soluble. Examples of the water-soluble groups include sulfo, carboxyl, phosphono and salts thereof. Examples of the counter ions for the salts include an alkali metal ion (e.g., $Na^+$, $K^+$), ammonium ion, triethylammonium ion, tributylammonium ion, pyridinium ion, tetrabutylammonium ion and an onium ion, which is represented by the above-described formula (IV).

Further, the compound preferably has an electric charge of −1 or −2.

Examples of the compound comprising 2 to 100 chemically combined methine dye molecules are shown below:

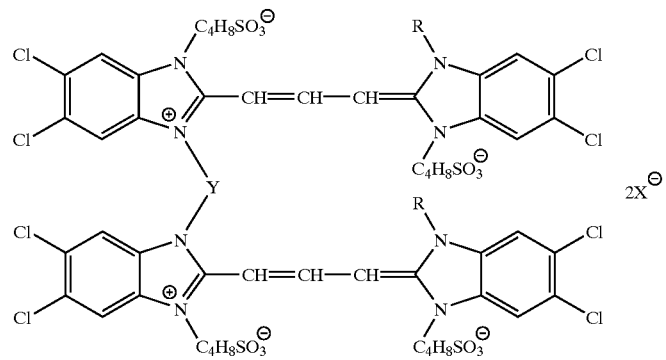

(V-1)–(V-13)

| | | | |
|---|---|---|---|
| (V-1) | R: $CH_3$ | Y: $-(CH_2)_2-$ | X: Na |
| (V-2) | R: $CH_3$ | Y: $-(CH_2)_3-$ | X: Na |
| (V-3) | R: $C_2H_5$ | Y: $-(CH_2)_4-$ | X: K |
| (V-4) | R: $C_2H_5$ | Y: $-(CH_2)_5-$ | X: Na |
| (V-5) | R: $C_2H_5$ | Y: $-(CH_2)_6-$ | X: Na |
| (V-6) | R: $C_2H_5$ | Y: $-(CH_2)_8-$ | X: Na |
| (V-7) | R: $C_2H_5$ | Y: $-CH_2-CH=CH-CH_2-$ | X: Na |
| (V-8) | R: $C_2H_5$ | Y: $-C_2H_4-CO-O-C_2H_4-O-CO-C_2H_4-$ | X: Na |
| (V-9) | R: $C_2H_5$ | Y: $-C_2H_4-CO-NH-C_2H_4-$ | X: $(C_2H_5)_3NH$ |
| (V-10) | R: $CH_3$ | Y: $-C_2H_4-O-CO-C_4H_8$ | X: $(C_2H_5)_3NH$ |
| (V-11) | R: $CH_3$ | Y: $-CH_2-C\equiv C-CH_2-$ | X: $(C_2H_5)_3NH$ |
| (V-12) | R: $CH_3$ | Y: $-C_2H_4-CO-O-C_4H_8-O-CO-C_2H_4-$ | X: $(C_2H_5)_3NH$ |
| (V-13) | R: $CH_3$ | Y: $-CH_2-$p-phenylene$-CH_2-$ | X: $(C_2H_5)_3NH$ |

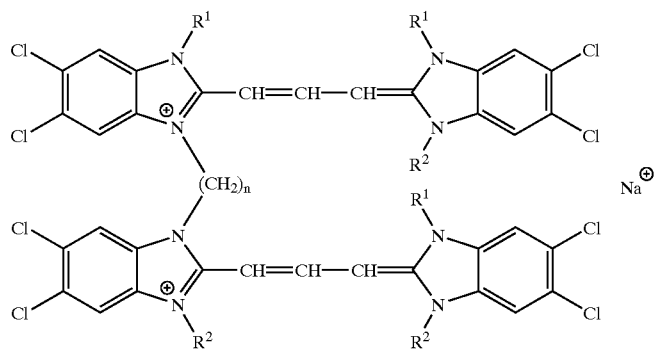

(V-14)–(V-20)

| | | | |
|---|---|---|---|
| (V-14) | $R^1$: $C_2H_5$ | $R^2$: $C_2H_4SO_3^-$ | n: 2 |
| (V-15) | $R^1$: $C_2H_5$ | $R^2$: $C_3H_6SO_3^-$ | n: 3 |
| (V-16) | $R^1$: $C_2H_5$ | $R^2$: $C_4H_8SO_3^-$ | n: 4 |
| (V-17) | $R^1$: $C_2H_5$ | $R^2$: $CH_2COO^-$ | n: 6 |
| (V-18) | $R^1$: $C_2H_5$ | $R^2$: $C_2H_4COO^-$ | n: 6 |
| (V-19) | $R^1$: $CH_3$ | $R^2$: $C_4H_8SO_3^-$ | n: 8 |
| (V-19) | $R^1$: $CH_2COOO^-$ | $R^2$: $C_4H_8SO_3^-$ | n: 3 |

-continued
(V-21)–(V-25)
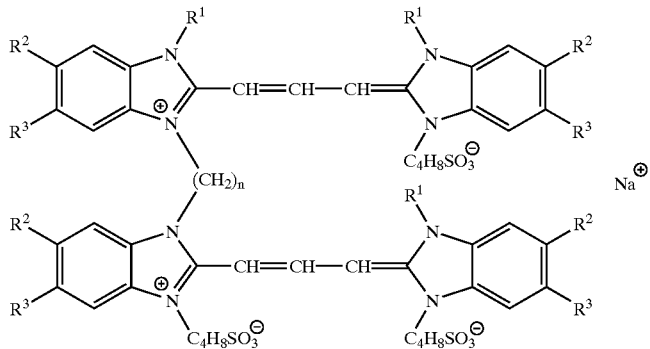
| | | | | |
|---|---|---|---|---|
| (V-21) | R¹: $C_2H_5$ | R²: H | R³: Cl | n: 3 |
| (V-22) | R¹: $C_2H_5$ | R²: H | R³: $CF_3$ | n: 3 |
| (V-23) | R¹: $C_2H_5$ | R²: Cl | R³: $CF_3$ | n: 3 |
| (V-24) | R¹: $C_2H_5$ | R²: H | R³: $CONH_2$ | n: 3 |
| (V-25) | R¹: $C_2H_4OCH_3$ | R²: Cl | R³: Cl | n: 3 |
(V-26)–(V-29)
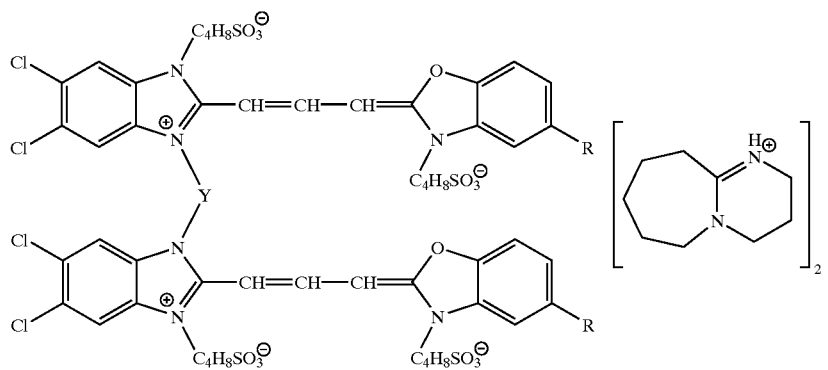
| | | |
|---|---|---|
| (V-26) | R: Cl | Y: —$(CH_2)_3$— |
| (V-27) | R: Phenyl | Y: —$(CH_2)_5$— |
| (V-28) | R: Phenyl | Y: —$C_2H_4$—CO—NH—$C_2H_4$— |
| (V-29) | R: Phenyl | Y: —$CH_2$—p-phenylene—$CH_2$— |
(V-30)–(V-32)
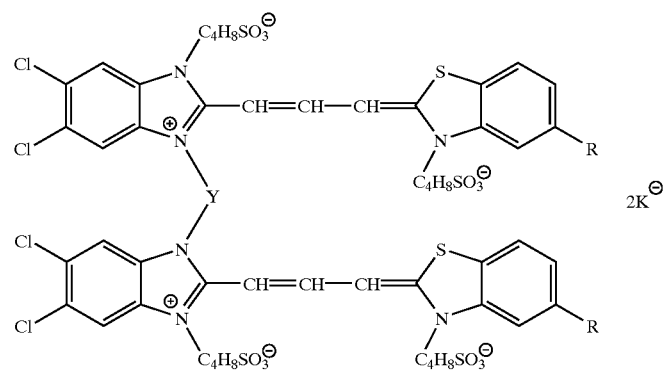
| | | |
|---|---|---|
| (V-30) | R: Cl | Y: —$(CH_2)_3$— |
| (V-31) | R: Phenyl | Y: —$(CH_2)_5$— |
| (V-32) | R: Cl | Y: —$CH_2$—p-phenylene—$CH_2$— |

-continued (V-33)–(V-38)

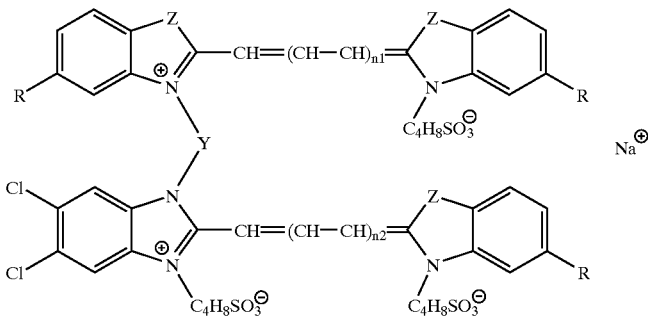

| | | | | | |
|---|---|---|---|---|---|
| (V-33) | R: Cl | Z: —S— | Y: —(CH$_2$)$_3$— | n1: 0 | n2: 1 |
| (V-34) | R: Phenyl | Z: —O— | Y: —(CH$_2$)$_3$— | n1: 0 | n2: 1 |
| (V-35) | R: Cl | Z: —S— | Y: —(CH$_2$)$_4$— | n1: 1 | n2: 2 |
| (V-36) | R: Phenyl | Z: —O— | Y: —(CH$_2$)$_4$— | n1: 2 | n2: 1 |
| (V-37) | R: Phenyl | Z: —O— | Y: —(CH$_2$)$_4$— | n1: 2 | n2: 2 |
| (V-38) | R: Cl | Z: —S— | Y: —(CH$_2$)$_4$— | n1: 0 | n2: 0 |

(V-39)–(V-43)

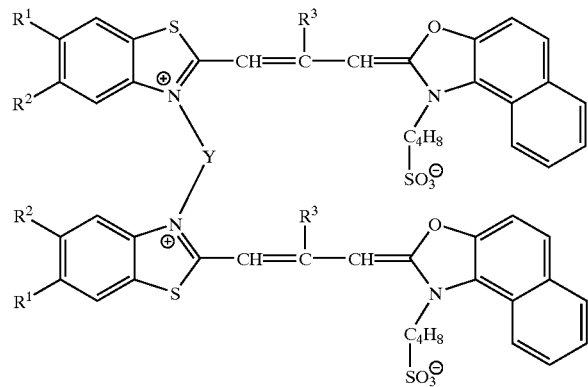

| | | | | |
|---|---|---|---|---|
| (V-39) | R$^1$: H | R$^2$: Cl | R$^3$: CH$_3$ | Y: —(CH$_2$)$_3$— |
| (V-40) | R$^1$: H | R$^2$: Cl | R$^3$: C$_2$H$_5$ | Y: —(CH$_2$)$_3$— |
| (V-41) | R$^1$: CH$_3$ | R$^2$: CH$_3$ | R$^3$: H | Y: —(CH$_2$)$_3$— |
| (V-42) | R$^1$: CH$_3$ | R$^2$: CH$_3$ | R$^3$: C$_2$H$_5$ | Y: —(CH$_2$)$_3$— |
| (V-43) | R$^1$: H | R$^2$: Cl | R$^3$: C$_2$H$_5$ | Y: —(CH$_2$)$_5$— |

(V-44)–(V-47)

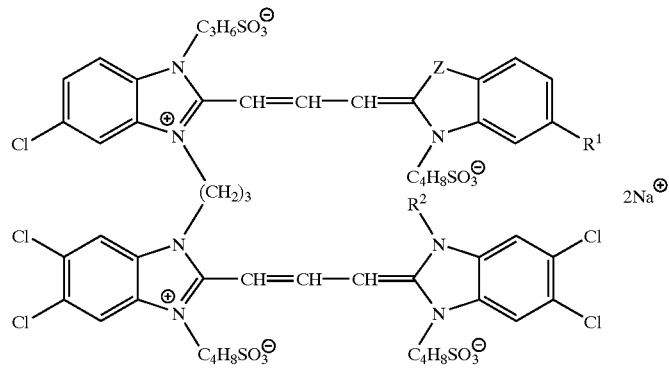

| | | | |
|---|---|---|---|
| (V-44) | R$^1$: Cl | R$^2$: CH$_3$ | Z: —S— |
| (V-45) | R$^1$: Phenyl | R$^2$: C$_2$H$_5$ | Z: —S— |
| (V-46) | R$^1$: Cl | R$^2$: C$_3$H$_7$ | Z: —O— |
| (V-47) | R$^1$: Cl | R$^2$: CH$_3$ | Z: —O— |

(V-48)–(V-53)
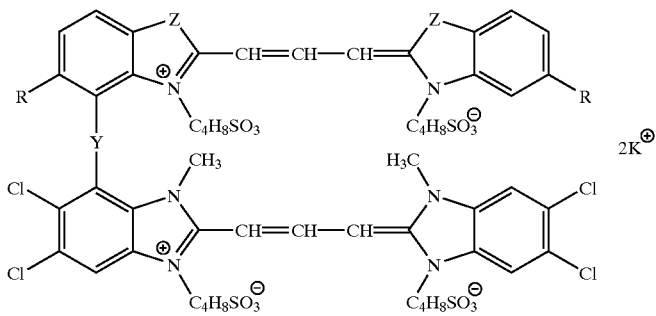
| (V-48) | R: Cl | Z: —S— | Y: —(CH$_2$)$_4$— |
|---|---|---|---|
| (V-49) | R: Phenyl | Z: —S— | Y: —(CH$_2$)$_4$— |
| (V-50) | R: Phenyl | Z: —O— | Y: —(CH$_2$)$_4$— |
| (V-51) | R: COOH | Z: —S— | Y: —(CH$_2$)$_2$— |
| (V-52) | R: Phenyl | Z: —S— | Y: —O—CO—(CH$_2$)$_4$—CO—O— |
| (V-53) | R: Phenyl | Z: —S— | Y: —NH—CO—(CH$_2$)$_3$—CO—NH— |
(V-54)–(V-56)
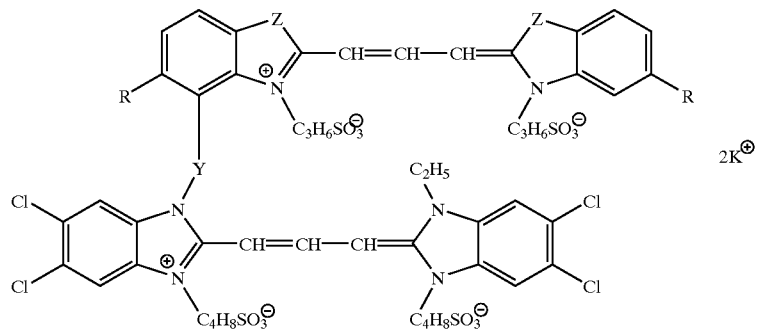
| (V-54) | R: Cl | Z: —S— | Y: —CO—O—(CH$_2$)$_2$—O—CO—CH$_2$— |
|---|---|---|---|
| (V-55) | R: Cl | Z: —O— | Y: —CO—NH—(CH$_2$)$_3$—NH—CO—C$_2$H$_4$— |
| (V-56) | R: Phenyl | Z: —S— | Y: —CO—NH—(CH$_2$)$_3$—NH—CO—C$_2$H$_4$— |

-continued
(V-57)
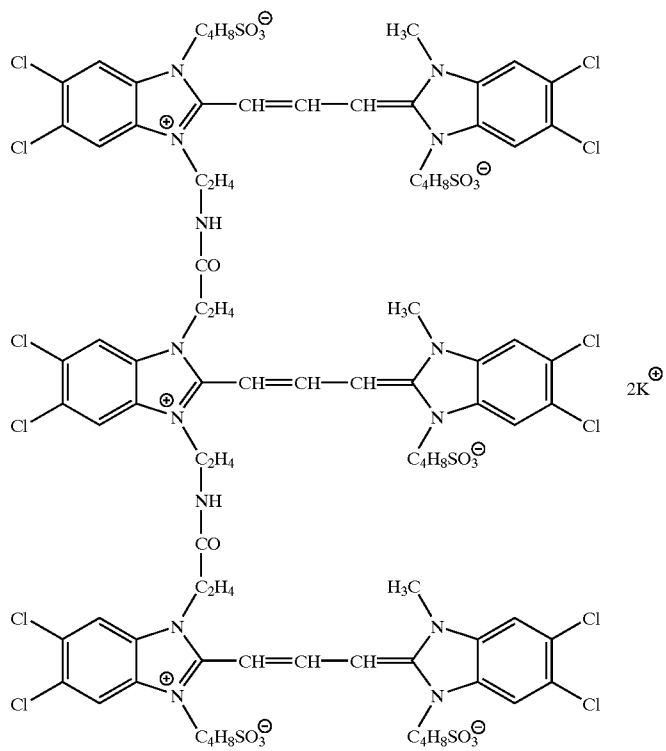
(V-58)–(V-60)
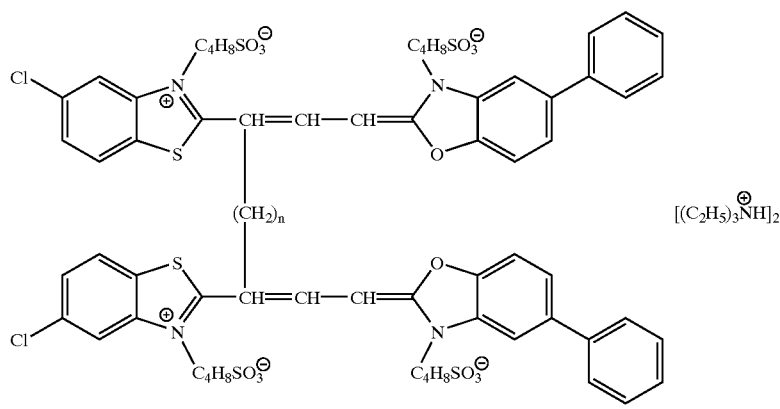
| | |
|---|---|
| (V-58) | n: 2 |
| (V-59) | n: 3 |
| (V-60) | n: 4 |

-continued
(V-61)–(V-67)
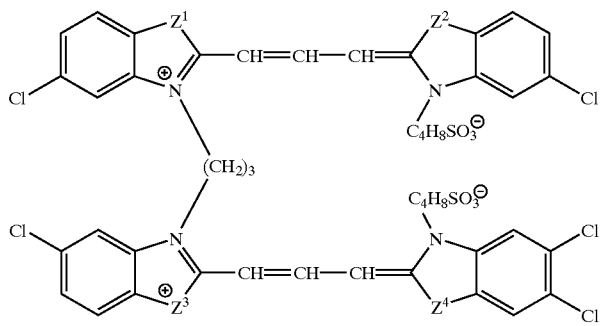
| | | | | |
|---|---|---|---|---|
| (V-61) | Z¹: —S— | Z²: —S— | Z³: —S— | Z⁴: —S— |
| (V-62) | Z¹: —O— | Z²: —O— | Z³: —O— | Z⁴: —S— |
| (V-63) | Z¹: —S— | Z²: —S— | Z³: —O— | Z⁴: —O— |
| (V-64) | Z¹: —S— | Z²: —N($C_2H_5$)— | Z³: —S— | Z⁴: —N($C_2H_5$)— |
| (V-65) | Z¹: —S— | Z²: —S— | Z³: —S— | Z⁴: —N($C_2H_5$)— |
| (V-66) | Z¹: —S— | Z²: —S— | Z³: —S— | Z⁴: —O— |
| (V-67) | Z¹: —O— | Z²: —O— | Z³: —O— | Z⁴: —O— |
(V-68)–(V-70)
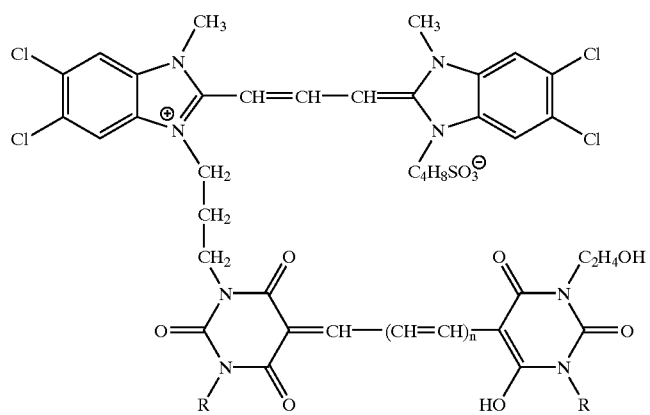
| | | |
|---|---|---|
| (V-68) | R: $C_2H_4SO_3^-$ | n: 1 |
| (V-69) | R: $C_2H_4SO_3^-$ | n: 0 |
| (V-70) | R: -p-phenylene—$SO_3^-$ | n: 1 |
(V-71)–(V-74)
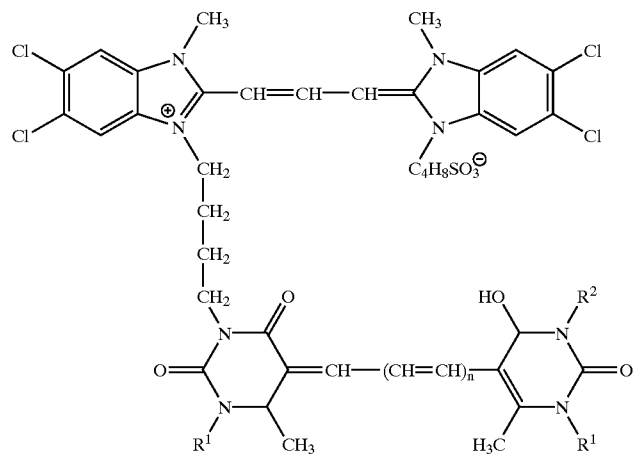
| | | | |
|---|---|---|---|
| (V-71) | R¹: $CONH_2$ | R²: $C_2H_4SO_3^-$ | n: 1 |
| (V-72) | R¹: $CONH_2$ | R²: -p-phenylene—$SO_3^-$ | n: 1 |

-continued

| | | | |
|---|---|---|---|
| (V-73) | $R^1$: CN | $R^2$: -p-phenylene—$SO_3^-$ | n: 0 |
| (V-74) | $R^1$: CN | $R^2$: $C_2H_4SO_3^-$ | n: 1 |

The compound comprising 2 to 100 chemically combined methine dye molecules can be synthesized by referring to the descriptions of 'Heterocyclic Compounds Cyanine Dyes and Related Compounds' by F. M. Harmer [John Wiley and Sons, New York, London, 1964]; 'Heterocyclic Compounds-Special topics in heterocyclic chemistry' by D. M. Sturmer [Chapter 18, Section 14, pp. 482–515, John Wiley and Sons, New York, London, 1977]; 'Rodd's Chemistry of Carbon Compounds' [second edition, Vol. 4B, Chapter 15, pp. 369–422, Elsevier Science Publishing Company Inc., New York, 1977; U.S. Pat. Nos. 2,393,351, 2,425,772, 2,518,732, 2,521,944 and 2,522,196; European Patent No. 565,083; Japanese Patent Provisional Publication Nos. 5(1993)-88293 and 6(1994)-313939.

As the aggregated dye, a mixture of at least two kinds of methine dyes is also preferably used. If each of the two or more kinds of methine dyes is in an aggregated form, the stability and the durability (particularly, against light) are remarkably improved. Further, the wavelength of the absorption maximum can be easily controlled by using the mixture comprising two kinds of methine dyes.

As described above, the methine dye is categorized into cyanine dye, merocyanine dye, arylidene dye, styryl dye and oxonol dye. The mixture preferably comprises at least one cyanine dye. A combination of a cyanine dye and another cyanine dye or a combination of a cyanine dye and an oxonol dye is particularly preferred.

The cyanine dye and the oxonol dye are preferably represented by the above formulas (I) and (II), respectively.

Examples of the methine dye preferably used for the aggregated dye mixture are shown below:

(VI-1)–(VI-10)

| | | | | |
|---|---|---|---|---|
| (VI-1) | Ra: $CH_3$ | Rb: Cl | Rc: Cl | X: Na |
| (VI-2) | Ra: $CH_3$ | Rb: Cl | Rc: $CF_3$ | X: K |
| (VI-3) | Ra: $CH_3$ | Rb: H | Rc: Cl | X: K |
| (VI-4) | Ra: $CH_3$ | Rb: H | Rc: $CONH_2$ | X: Na |
| (VI-5) | Ra: $C_2H_5$ | Rb: Cl | Rc: Cl | X: Na |
| (VI-6) | Ra: n-$C_3H_7$ | Rb: Cl | Rc: Cl | X: Na |
| (VI-7) | Ra: $C_2H_4OC_2H_5$ | Rb: Cl | Rc: Cl | X: Na |
| (VI-8) | Ra: $C_2H_4OH$ | Rb: Cl | Rc: Cl | X: Na |
| (VI-9) | Ra: $CH_2$-phenyl | Rb: Cl | Rc: Cl | X: K |
| (VI-10) | Ra: Phenyl | Rb: Cl | Rc: Cl | X: K |

(VI-11)–(VI-15)

| | | | | |
|---|---|---|---|---|
| (VI-11) | Ra: $C_2H_4SO_3^-$ | Rb: Cl | Rc: Cl | X: K |
| (VI-12) | Ra: $C_3H_6SO_3^-$ | Rb: Cl | Rc: $CF_3$ | X: Na |
| (VI-13) | Ra: $CH_2CH_2CH(CH_3)SO_3^-$ | Rb: H | Rc: CN | X: Na |
| (VI-14) | Ra: $C_2H_4SO_3^-$ | Rb: H | Rc: CN | X: $(C_2H_5)_3HN$ |
| (VI-15) | Ra: $C_4H_8SO_3^-$ | Rb: H | Rc: CN | X: K |

(VI-16)

-continued
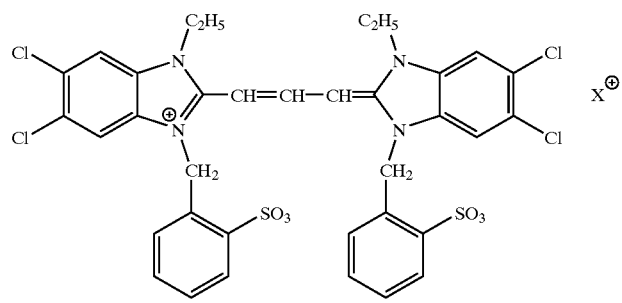
(VI-17)
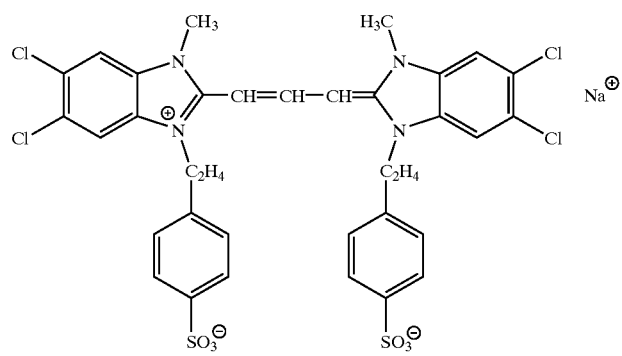
(VI-18)
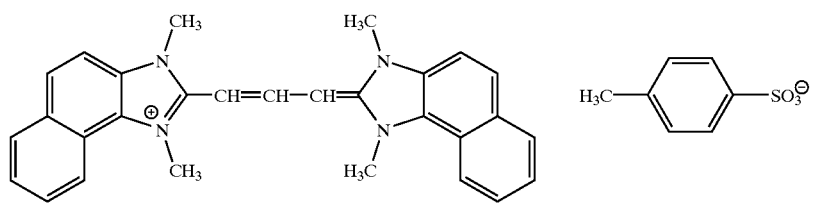
(VI-19)
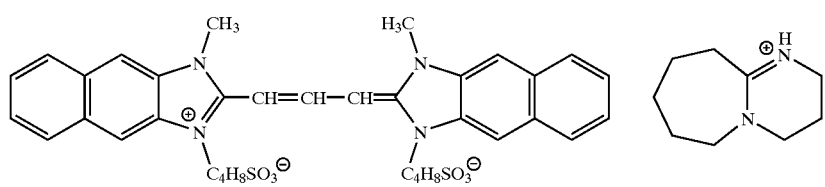
(VI-20)
(VI-21)–(VI-23)
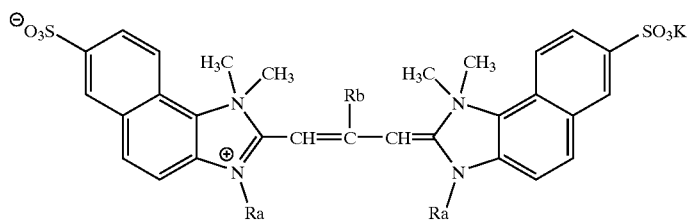
| (VI-21) | Ra: $CH_4H_8SO_3^-$ | Rb: H |
| (VI-22) | Ra: $CH_4H_8SO_3^-$ | Rb: $CH_3$ |
| (VI-23) | Ra: $C_3H_6SO_3^-$ | Rb: H |

-continued
(VI-24)–(VI-26)
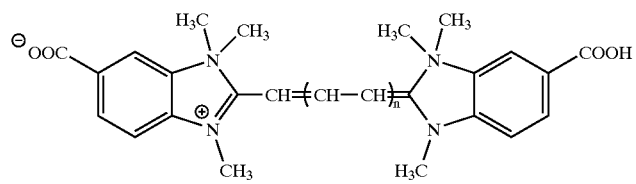
| | |
|---|---|
| (VI-24) | n: 1 |
| (VI-25) | n: 2 |
| (VI-26) | n: 3 |
(VI-27)
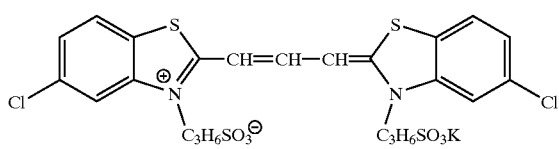
(VI-28)
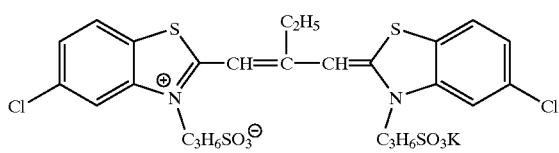
(VI-29)
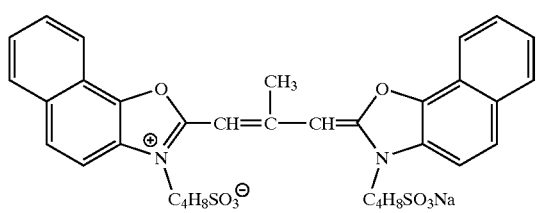
(VI-30)
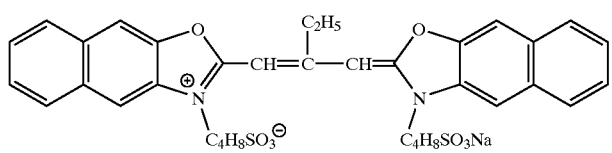
(VI-31)
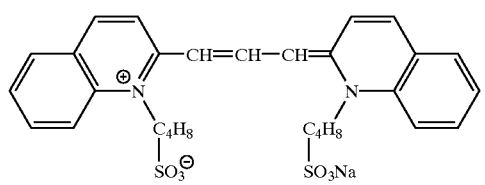
(VI-32)
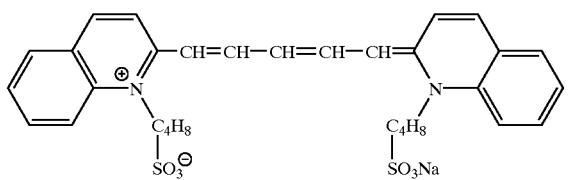

-continued
(VI-33)
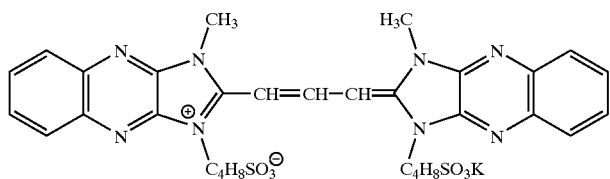
(VI-34)–(VI-37)
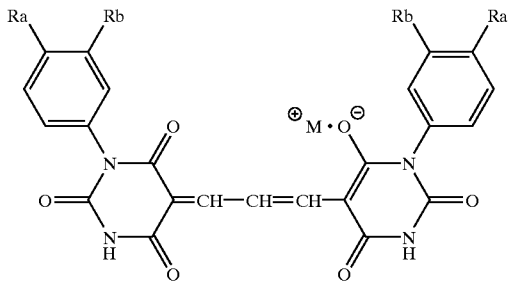
| | | | |
|---|---|---|---|
| (VI-34) | Ra: H | Rb: H | M: H |
| (VI-35) | Ra: H | Rb: H | M: (C₂H₅)₃HN |
| (VI-36) | Ra: OH | Rb: H | M: (C₂H₅)₃HN |
| (VI-37) | Ra: H | Rb: OH | M: (C₂H₅)₃HN |
(VI-38)
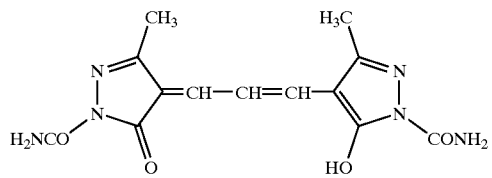
(VI-39)
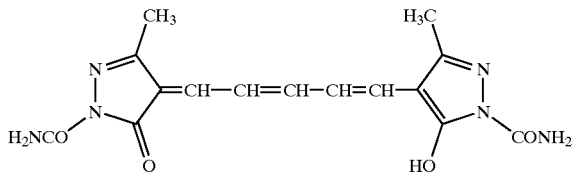
(VI-40)–(VI-50)
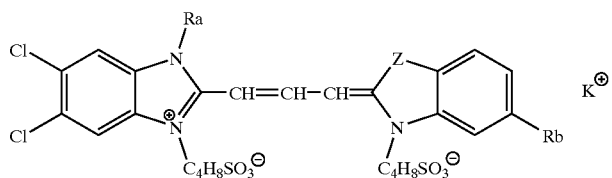
| | | | |
|---|---|---|---|
| (VI-40) | Ra: CH₃ | Rb: Phenyl | Z: —S— |
| (VI-41) | Ra: C₂H₅ | Rb: Phenyl | Z: —S— |
| (VI-42) | Ra: C₂H₄OCH₃ | Rb: Phenyl | Z: —S— |
| (VI-43) | Ra: Phenyl | Rb: Phenyl | Z: —S— |
| (VI-44) | Ra: CH₂-phenyl | Rb: Phenyl | Z: —S— |
| (VI-45) | Ra: CH₃ | Rb: Cl | Z: —S— |
| (VI-46) | Ra: CH₃ | Rb: Cl | Z: —O— |
| (VI-47) | Ra: C₂H₅ | Rb: Phenyl | Z: —O— |
| (VI-48) | Ra: C₂H₅ | Rb: Cl | Z: —Se— |
| (VI-49) | Ra: C₂H₅ | Rb: Cl | Z: —C(CH₃)₂— |
| (VI-50) | Ra: CH₃ | Rb: Phenyl | Z: —Se— |

-continued (VI-51)–(VI-54)

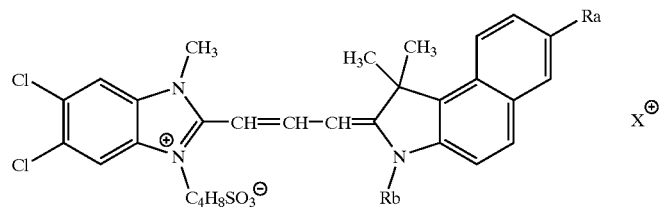

| | | | |
|---|---|---|---|
| (VI-51) | Ra: H | Rb: $C_3H_6SO_3^-$ | X: $(C_2H_5)_3HN$ |
| (VI-52) | Ra: $SO_3^-$ | Rb: $C_3H_6SO_3^-$ | X: 2K |
| (VI-53) | Ra: $SO_3^-$ | Rb: $C_3H_6SO_3^-$ | X: 2Na |
| (VI-54) | Ra: $SO_3^-$ | Rb: $CH_2CH_2CH(CH_3)SO_3^-$ | X: 2K |

(VI-55)–(VI-62)

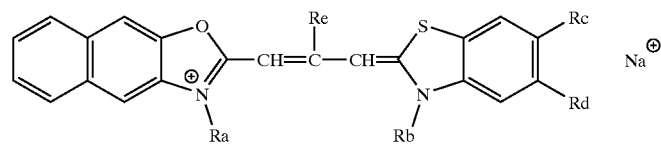

| | | | | | |
|---|---|---|---|---|---|
| (VI-55) | Ra: $C_3H_6SO_3^-$ | Rb: $C_3H_6SO_3^-$ | Rc: H | Rd: Cl | Re: $C_2H_5$ |
| (VI-56) | Ra: $C_4H_8SO_3^-$ | Rb: $C_4H_8SO_3^-$ | Rc: H | Rd: Cl | Re: $C_2H_5$ |
| (VI-57) | Ra: $C_2H_4SO_3^-$ | Rb: $C_4H_8SO_3^-$ | Rc: Cl | Rd: Cl | Re: $C_2H_5$ |
| (VI-58) | Ra: $C_2H_4SO_3^-$ | Rb: $C_2H_4SO_3^-$ | Rc: $CH_3$ | Rd: $CH_3$ | Re: $C_2H_5$ |
| (VI-59) | Ra: $C_4H_8SO_3^-$ | Rb: $C_4H_8SO_3^-$ | Rc: $CH_3$ | Rd: $CH_3$ | Re: $C_2H_5$ |
| (VI-60) | Ra: $C_4H_8SO_3^-$ | Rb: $C_3H_6SO_3^-$ | Rc: H | Rd: Phenyl | Re: $C_2H_5$ |
| (VI-61) | Ra: $C_4H_8SO_3^-$ | Rb: $C_4H_8SO_3^-$ | Rc: H | Rd: $OCH_3$ | Re: $CH_3$ |
| (VI-62) | Ra: $C_4H_8SO_3^-$ | Rb: $C_4H_8SO_3^-$ | Rc: H | Rd: $OCH_3$ | Re: $CH_3$ |

(VI-63)–(VI-65)

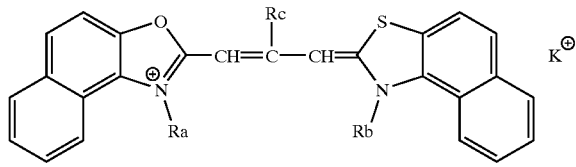

| | | | |
|---|---|---|---|
| (VI-63) | Ra: $C_3H_6SO_3^-$ | Rb: $C_3H_6SO_3^-$ | Rc: $C_2H_5$ |
| (VI-64) | Ra: $C_3H_6SO_3^-$ | Rb: $C_3H_6SO_3^-$ | Rc: $CH_3$ |
| (VI-65) | Ra: $C_4H_8SO_3^-$ | Rb: $C_4H_8SO_3^-$ | Rc: $C_2H_5$ |

(VI-66)

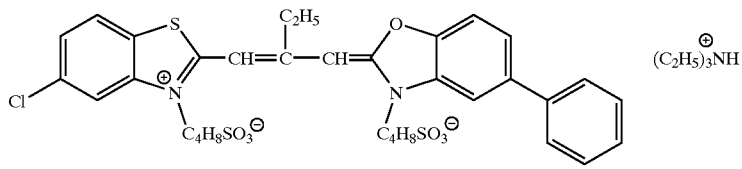

(VI-67)

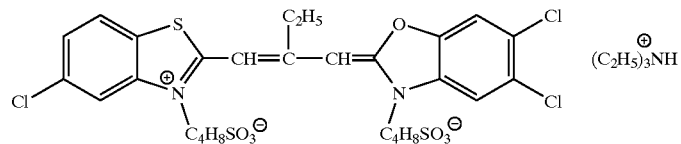

(VI-68)

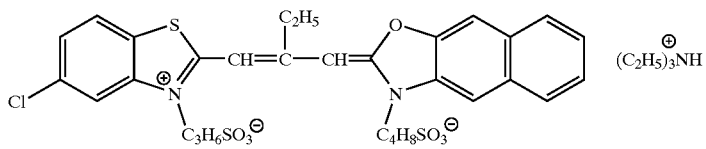

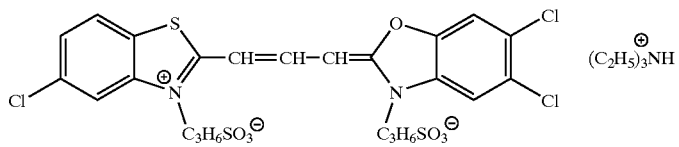

(VI-69)

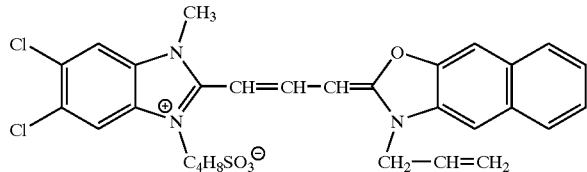

(VI-70)

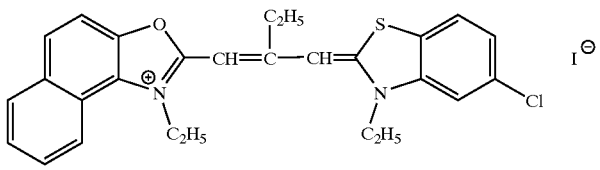

(VI-71)

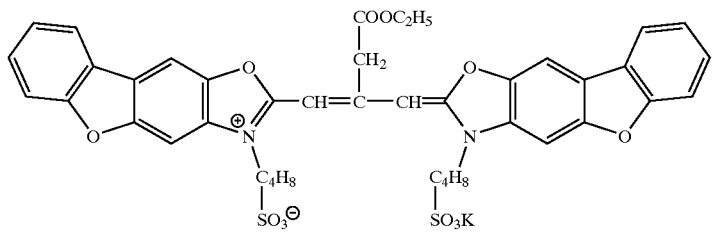

(VI-72)

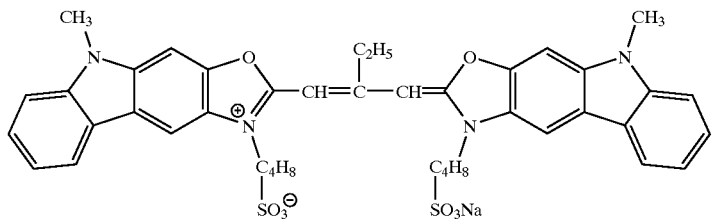

(VI-73)

The above methine dyes can be synthesized by referring to the descriptions of 'Heterocyclic Compounds Cyanine Dyes and Related Compounds' by F. M. Harmer [John Wiley and Sons, New York, London, 1964]; 'Heterocyclic Compounds-Special topics in heterocyclic chemistry' by D. M. Sturmer [Chapter 18, Section 14, pp. 482–515, John Wiley and Sons, New York, London, 1977]; 'Rodd's Chemistry of Carbon Compounds' [second edition, Vol. 4B, Chapter 15, pp. 369–422, Elsevier Science Publishing Company Inc., New York, 1977; Japanese Patent Provisional Publication Nos. 5(1993)-88293 and 6(1994)-313939; European Patent No. 0778493; and U.S. Pat. No. 5,459,265.

A dye having an absorption maximum in the wavelength region other than the above-described regions (500 to 550 nm and 560 to 620 nm) such as a near-IR absorbing dye can be used in combination with the aforementioned dyes. Examples of the near-IR absorbing dyes include cyanine dyes (described in Japanese Patent Provisional Publication No. 9(1997)-96891), metal chelate dyes, aminium dyes, diimmonium dyes, quinone dyes, squarylium dyes (described in Japanese Patent Provisional publication Nos. 9(1997)-90547, 10(1998)-204310) and various methine dyes. The near-IR absorbing dyes are also described in "Shikizai (Coloring material)", 61[4] 215–226 (1988), and "Kagaku-Kogyo (Chemical Industry)", May (1986), 43–53. Further, the filter layer can contain another visible light absorbing dye, such as triphenylmethane dye (described in U.S Pat. No. 2,150,695 and Japanese Patent Provisional Publication No. 5(1993)-117536) and fluorescein dye (e.g., fluorescein, dibromofluorescein, eosin, Rhodamine).

The filter layer preferably further contains a binder polymer. Examples of the polymer include natural polymers (e.g., gelatin, cellulose derivatives, alginic acid) and synthesized polymers (e.g., polymethyl methacrylate, polyvinyl butyral, polyvinyl pyrrolidone, polyvinyl alcohol, polyvinyl chloride styrene-butadiene copolymer, polystyrene, polycarbonate, water-soluble polyimide). Preferred polymers are hydrophilic ones (e.g., the aforementioned natural polymers, polyvinyl butyral, polyvinyl pyrrolidone, polyvinyl alcohol, water-soluble polyimide), and particularly preferred is gelatin. The binder polymer has a number average molecular weight of preferably 5,000 to 100,000, more preferably 10,000 to 100,000.

The filter layer can contain an anti-fading agent and a UV absorber. Examples of the anti-fading agent, which stabilizes the dye, include hydroquinone derivatives (described in U.S. Pat. Nos. 3,935,016 and 3,982,944), hydroquinone diether derivatives (described in U.S. Pat. No. 4,254,216 and Japanese Patent Provisional Publication No. 55(1980)-21004), phenol derivatives (described in Japanese Patent Provisional Publication No. 54(1979)-145530), spiroindane or methylenedioxybenzene derivatives (described in British Patent Publication Nos. 2,077,455, 2,062,888 and Japanese Patent Provisional Publication No. 61(1986)-90155), chroman, spirochroman or coumaran derivatives (described in U.S. Pat. Nos. 3,432,300, 3,573,050, 23,574,627, 3,764,337 and Japanese Patent Provisional Publication Nos. 52(1977)-152225, 53(1978)-20327, 53(1978)-17729 and 61(1986)-90156), hydroquinone monoether or p-aminophenol derivatives (described in British Patent Publication Nos. 1,347,556, 2,066,975, Japanese Patent Publication No. 54(1979)-12337, and Japanese Patent Provisional Publication No. 55(1980)-6321), and bisphenol derivatives (described in U.S. Pat. No. 3,700,455 and Japanese Patent Publication No. 48(1973)-31625).

As the anti-fading agent, metal complexes (described in U.S. Pat. No. 4,245,018 and Japanese Patent Provisional Publication No. 60(1985)-97353) can be used to improve the stability of dye against light or heat.

Further, a singlet oxygen quencher is also usable as the anti-fading agent for improving the light resistance of dye. Examples of the singlet oxygen quencher include nitroso compounds (described in Japanese Patent Provisional Publication No. 2(1990)-300288), diimmonium compounds (described in U.S. Pat. No. 465,612), nickel complexes (described in Japanese Patent Provisional Publication No. 4(1992)-146189), and anti-oxidizing agents (described in European Patent Publication No. 820057A1).

(Anti-reflection Layers)

The optical filter can have an anti-reflection layer. The optical filter having the anti-reflection layer serves as an anti-reflection film.

The anti-reflection layer has a reflectance of preferably 3% or less, more preferably 1.8% or less.

As the anti-reflection layer, a low refractive index layer is essential. The refractive index of the low refractive index layer is lower than that of the support, preferably in the range of 1.20 to 1.55, and more preferably in the range of 1.30 to 1.55.

The low refractive index layer has a thickness of preferably 50 to 400 nm, more preferably of 50 to 200 nm.

Various kinds of low refractive index layer have been proposed, and are employable for the invention. Examples of them include a layer comprising fluorine-contained polymer of low refractive index (disclosed in Japanese Patent Provisional Publication Nos. 57(1982)-34526, 3(1991)-130103, 6(1994)-115023, 8(1996)-313702, and 7(1995)-168004), a layer formed by sol-gel method (disclosed in Japanese Patent Provisional Publication Nos. 5(1993)-208811, 6(1994)-299091 and 7(1995)-168003) and a layer containing fine particles (disclosed in Japanese Patent Publication No. 60(1985)-59250 and Japanese Patent Provisional Publication Nos. 5(1993)-13021, 6(1994)-56478, 7(1995)-92306 and 9(1997)-288201). The low refractive index layer containing fine particles may further contain micro voids among the particles. The void ratio in the low refractive index layer is in the range of preferably 3 to 50 vol. %, more preferably 5 to 35 vol. %.

In addition to the low refractive index layer, layers having higher refractive indexes (i.e., middle and high refractive index layers) are preferably provided to reduce the reflection in a wide wavelength region.

The high refractive index layer has a refractive index of preferably 1.65 to 2.40, more preferably 1.70 to 2.20. The middle refractive index layer has a refractive index between those of the low and high refractive index layers. The refractive index of the middle refractive index layer is preferably in the range of 1.50 to 1.90.

Each of the middle and high refractive index layers has a thickness of preferably 5 nm to 100 µm, more preferably 10 nm to 10 µm, and most preferably 30 nm to 1 µm.

The haze of each layer is in the range of preferably not more than 5%, more preferably not more than 3%, further preferably not more than. 1%.

The middle and high refractive index layers can be formed from a binder polymer having a relatively high refractive index. Examples of that binder polymer include polystyrene, styrene copolymer, polycarbonate, melamine resin, phenol resin, epoxy resin and a polyurethane derived from the reaction between cyclic (alicyclic or aromatic) isocyanate and polyol. Further, other polymers having cyclic (aromatic, heterocyclic or alicyclic) groups and polymers substituted with a halogen atom except fluorine also have high refractive indexes. The polymer may be prepared by polymerization of monomers having double bonds for radical hardening.

For a higher refractive index, inorganic fine particles may be dispersed in the binder polymers. The inorganic fine particles preferably have a refractive index of 1.80 to 2.80.

As the materials for the particles, metal oxides and sulfides are preferred. Examples of them include titanium dioxide (rutile, mixed crystal of rutile/anatase, anatase, amorphous structure), tin oxide, indium oxide, zinc oxide, zirconium oxide, and zinc sulfide. Preferred materials are titanium oxide, tin oxide and zirconium oxide. The inorganic fine particles may contain other elements, as well as those oxides or sulfides of main component. The "main component" means the component contained in the largest content (wt. %). Examples of the other elements include Ti, Zr, Sn, Sb, Cu, Fe, Mn, Pb, Cd, As, Cr, Hg, Zn, Al, Mg, Si, P and S.

The middle and high refractive index layers can be formed from liquid or soluble film-formable inorganic materials. Examples of the materials include alkoxides of various elements, salts of organic acids, coordination compounds (e.g., chelate compounds) and active inorganic polymers.

The surface of the anti-reflection layer (i.e., the low refractive index layer) can be made to show anti-glare performance (which prevents the surface from reflecting the surrounding scene by scattering the incident light) For example, the anti-reflection layer may be formed on a finely roughened surface of a transparent film. Otherwise, the surface of the anti-reflection layer may be roughened by means of an embossing roll. The haze of the anti-reflection layer having such surface is generally in the range of 3 to 30%.

(Electromagnetic Wave-shielding Layer)

A layer shielding the filter from electromagnetic waves has a surface resistance of preferably 0.1 to 500 Ω per square, and more preferably 0.1 to 10 Ω per square.

Since it is provided on the optical filter or on the anti-reflection layer, the electromagnetic wave-shielding layer is preferably transparent. A layer generally known as a transparent electroconductive layer can be used as an electromagnetic wave-shielding layer.

As the transparent electroconductive layer, a thin film of metal or metal oxide is preferably used. The metal is preferably a noble metal, more preferably gold, silver, palladium or an alloy thereof, and most preferably an alloy of gold and silver. The content of silver in the alloy is preferably 60 wt. % or more. The metal oxide is preferably $SnO_2$, ZnO, ITO or $In_2O_3$.

The metal film and the metal oxide film may be laminated. In the laminated composition, the metal oxide film protects the metal film (from oxidation) and improves transmittance in the visible wavelength region. Preferred examples of the metal oxide overlaid on the metal film clude di- to tetravalent metal oxides (e.g., zirconium oxide, titanium oxide, magnesium oxide, silicone oxide, aluminum oxide). A thin film of metal alkoxide can be also laminated on the metal film. The film of metal oxide or metal alkoxide can be laminated on both faces of the metal film. In that case, different films may be used.

The metal film has a thickness of preferably 4 to 40 nm, more preferably 5 to 35 nm, most preferably 6 to 30 nm.

The film of metal oxide or metal alkoxide has a thickness of preferably 20 to 300 nm, more preferably 40 to 100 nm.

The electromagnetic wave-shielding layer can be formed by spattering method, vacuum deposition method, ion plating method, plasma CVD method, plasma PVD method, or coating very fine particles of metal or metal oxide.

(Infrared Rays-shielding Layer)

An infrared rays-shielding layer shields the filter from infrared rays in the wavelength range of 800 to 1,200 nm. The infrared rays-shielding layer can be made of a resin mixture. In the resin mixture, an infrared rays-shielding component is incorporated. Examples of the infrared rays-shielding component include copper (described in Japanese Patent Provisional Publication No. 6(1997)-118228), copper compounds or phosphor compounds (described in Japanese Patent Provisional Publication No. 62(1987)-5190), copper compounds or thiourea compounds (described in Japanese Patent Provisional Publication No. 6(1997)-73197), or tungsten compounds (described in U.S. Pat. No. 3,647,772). In place of the infrared rays-shielding layer, the infrared rays-shielding component may be incorporated in the transparent support.

The above-described electromagnetic wave-shielding layer of silver thin film also functions as an infrared rays-shielding layer.

(Other Layers)

The optical filter can further comprise a hard coating layer, a slippery layer, an anti-stain layer, an antistatic layer, a UV absorbing layer or an intermediate layer.

The hard coating layer preferably contains a cross-linked polymer, and can be formed from acrylic, urethane or epoxy polymer or oligomer (e.g., UV curable resin) or silica material.

On the top surface of the optical filter, a slippery layer may be provided. The slippery layer gives slipperiness to the surface of the anti-reflection layer, and improves the scratch resistance of the filter. The slippery layer can be formed from polyorganosiloxane (e.g., silicone oil), a natural wax, a petroleum wax, a metal salt of higher fatty acid, a fluorine lubricant or its derivative. The thickness of the slippery layer is preferably in the range of 2 to 20 nm.

The anti-stain layer can be formed from a fluorine-containing polymer, and has a thickness of preferably 2 to 100 nm, more preferably 5 to 30 nm.

The layers such as the anti-reflection layers (middle, high, and low refractive index layers), the filter layer, the undercoating layer, the hard coating layer, the slippery layer and other layers can be formed by known coating methods. Examples of the coating method include dip coating, air knife coating, curtain coating, roller coating, wired bar coating, gravure coating and extrusion coating with a hopper (described in U.S. Pat. No. 2,681,294). Two or more layers may be simultaneously formed by coating. The method for simultaneous coating is described in U.S. Pat. Nos. 2,761,791, 2,941,898, 3,508,947 and 3,526,528; and "Coating Engineering" pp.253, written by Y. Harazaki, published by Asakura Shoten (1973).

(Use of Optical Filter)

The optical filter of the invention can be applied on a display device such as a liquid crystal display (LCD), a plasma display panel (PDP), an electroluminescence display (ELD) or a cathode ray tube display (CRT). In the case where the optical filter has an anti-reflection layer, the optical filter is so arranged on the device that the surface opposite to the low refractive index layer is attached to the display surface. The optical filter of the invention is particularly effective in a plasma display panel (PDP).

A plasma display panel (PDP) comprises gas, glass substrates (front and back glass substrates), electrodes, electrode-lead member, thick film printing member, and phosphor. Each of the glass substrates is equipped with the electrode and an insulating layer. On the back glass substrate, a phosphor layer is further provided. The gas is enclosed between the substrates.

A plasma display panel (PDP) is commercially available, and is described in Japanese Patent Provisional Publication Nos. 5(1993)-205643 and 9(1997)-306366.

In the display device such as the plasma display panel, the display surface is covered with the optical filter. The optical filter can be directly attached on the display surface. In the case where a plate is arranged in front of the display surface, the optical filter can be attached to the front (outside) surface of the front plate or the back (display side) surface of the plate.

EXAMPLE 1

Formation of Undercoating Layer

Both surfaces of a transparent polyethylene terephthalate film (thickness: 100 μm) were subjected to a corona discharge treatment. A latex of styrene-butadiene copolymer was applied on one surface to form an undercoating layer of 130 nm thickness.

Formation of Second Undercoating Layer

On the undercoating layer, an aqueous solution of gelatin containing acetic acid and glutaric aldehyde was applied to form a second undercoating layer of 50 nm thickness.

Formation of Low Refractive Index Layer

To 2.50 g of a reactive fluorocarbon polymer (JN-7219, Nippon Gosei Gomu Co., Ltd.), 1.3 g of t-butanol was added. The mixture was stirred at the room temperature for 10 minutes, and then filtered through a polypropylene filter (porosity size: 1 μm) to prepare a coating solution for low refractive index layer. The coating solution was applied on the support surface opposite to the undercoating layers by using a wired bar coater, to form a layer (dry thickness: 110 nm). The layer was dried and hardened at 120° C. for 30 minutes to form a low refractive index layer.

Formation of Filter Layer

In 180 g of 10 wt. % aqueous solution of gelatin, 0.05 g of the dye (a1) and 0.05 g of the dye (b6) were dissolved. The solution was stirred at 40° C. for 30 minutes, land then filtered through a polypropylene filter (porosity size: 2 μm) to prepare a coating solution for filter layer.

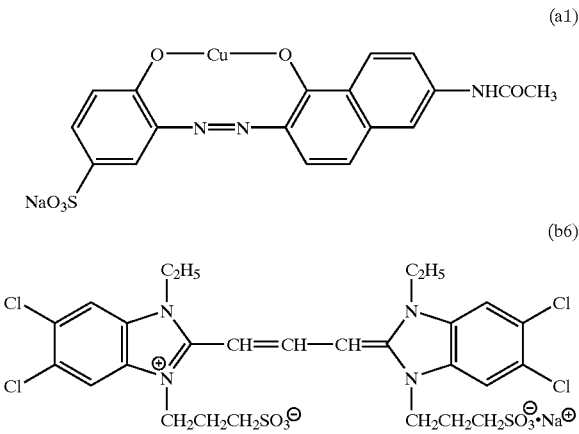

The coating solution was coated on the second undercoating layer, and dried at 120° C. for 10 minutes to form a filter layer (dry thickness: 3.5 μm).

Measurement of Absorbance

The absorption spectrum of the obtained optical filter was measured. The filter layer had two absorption maximums at 530 nm and 593 nm. The transmittance at 530 nm was 70%, and the transmittance at 593 nm was 28%. The half-width of the absorption maximum at 530 nm was 110 nm, and the half-width of the absorption maximum at 593 nm was 37 nm.

EXAMPLE 2

The procedure of Example 1 was repeated except that the dyes (a1) and (b6) were dissolved by stirring the solution at 5° C. for 5 minutes, to produce an optical filter.

The absorption spectrum of the obtained optical filter was measured. The filter layer had two absorption maximums at 530 nm and 593 nm. The half-width of the absorption :maximum at 530 nm was 110 nm, and the half-width of the absorption maximum at 593 nm was 28 nm.

EXAMPLE 3

The procedure of Example 1 was repeated except that the dyes (a1) and (b6) were dissolved by stirring the solution at 25° C. for 360 minutes, to produce an optical filter.

The absorption spectrum of the obtained optical filter was measured. The filter layer had two absorption maximums tat 530 nm and 593 nm. The half-width of the absorption maximum at 530 nm was 110 nm, and the half-width of the absorption maximum at 593 nm was 18 nm.

COMPARISON EXAMPLE 1

In 180 g of 10 wt. % aqueous solution of polyvinyl alcohol (PVA-203, Kuraray, Co., Ltd.), 0.05 g of the dye (a1) and 0.05 g of the dye (b6) were dissolved. The solution was filtered through a polypropylene filter (porosity size: 2 μm) to prepare a coating solution for filter layer.

The procedure of Example 1 was repeated except that the above-obtained coating solution for filter layer was used, to produce an optical filter.

The absorption spectrum of the obtained optical filter was measured. The filter layer had two absorption maximums at 530 nm and 593 nm. The transmittance at 530 nm was 68%, and the transmittance at 593 nm was 58%. The half-width of !the absorption maximum at 530 nm was 115 nm, and the half-width of the absorption maximum at 593 nm was 77 nm.

EXAMPLE 4

The procedure of Comparison Example 1 was repeated except that the dyes (a1) and (b6) were dissolved by stirring the solution at 5° C. for 360 minutes, to produce an optical filter.

The absorption spectrum of the obtained optical filter was measured. The filter layer had two absorption maximums at 530 nm and 593 nm. The half-width of the absorption maximum at 530 nm was 115 nm, and the half-width of the absorption maximum at 593 nm was 50 nm.

Evaluation of Optical Filters

A surface film of a front plate was removed from a commercially available plasma display panel (PDS4202J-H, Fujitsu Limited). In place of the surface film, each of the above-produced optical filters (the surface opposite to the low refractive index layer) was attached to the front plate with an adhesive. The contract and brightness of the displayed image were measured and evaluated in terms of relative values providing that the brightness of Examples 1 was set at 100. Further, white light and red light were observed by eyes to evaluate the improvement. The results are set forth in Table 1.

TABLE 1

| Optical filter | Half-width at 594 nm | Contrast | Brightness | White light | Red light |
|---|---|---|---|---|---|
| Ex. 1 | 37 nm | 15:1 | 100 | Improved | Improved |
| Ex. 2 | 28 nm | 15:1 | 105 | Improved | Improved |
| Ex. 3 | 17 nm | 15:1 | 110 | Improved | Improved |
| Comp. 1 | 77 nm | 14:1 | 78 | Improved | Red** |
| Ex. 4 | 50 nm | 15:1 | 97 | Improved | Improved |
| None | — | 10:1 | 130 | White* | Red*** |

(Remark)
Improved white light: Pure white
Improved red light: Pure red
White*: Greeny white
Red** Red with weak intensity
Red***: Red tinged with orange

EXAMPLE 5

Formation of Filter Layer

In 180 g of water, 18 g of photographic alkali-treated gelatin of high molecular weight was dissolved. To the solution, 36 mg of the dye (I-5) was added. The solution was stirred for 30 minutes, and then filtered through a polypropylene filter (porosity size: 1 μm) to prepare a coating solution for filter layer.

(I-5)

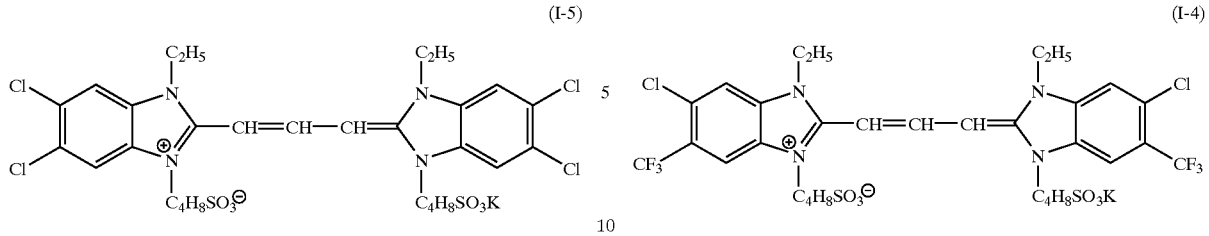
(I-4)

Formation of Undercoating Layer

Both surfaces of a transparent polyethylene terephthalate film (thickness: 125 μm) were subjected to a corona discharge treatment. A latex of styrene-butadiene copolymer was applied on one surface to form an undercoating layer of 140 nm thickness.

Formation of Second Undercoating Layer

On the undercoating layer, an aqueous solution of gelatin containing acetic acid and glutaric aldehyde was applied to form a second undercoating layer of 40 nm thickness.

Formation of Low Refractive Index Layer

To 2.50 g of a reactive fluorocarbon polymer (JN-7219, Nippon Gosei Gomu Co., Ltd.), 1.3 g of t-butanol was added. The mixture was stirred at the room temperature for 10 minutes, and then filtered through a polypropylene filter (porosity size: 1 μm) to prepare a coating solution for low refractive index layer. The coating solution was applied on the support surface opposite to the undercoating layers by using a wired bar coater, to form a layer (dry thickness: 110 nm). The layer was dried and hardened at 120° C. for 30 minutes to form a low refractive index layer.

Formation of Filter Layer

The above-prepared coating solution was coated on the second undercoating layer, and dried at 120° C. for 3 minutes to form a filter layer (dry thickness: 4.5 μm), to produce an optical filter.

EXAMPLE 6

The procedure of Example 5 was repeated except that the dye (I-3) was used in place of the dye (I-5) in the same amount, to produce an optical filter.

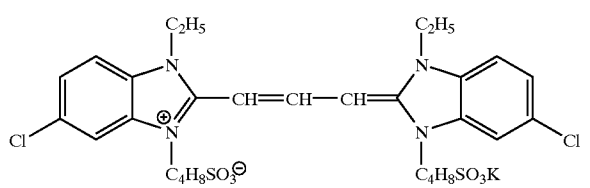
(I-3)

EXAMPLE 7

The procedure of Example 5 was repeated except that the dye (I-4) was used in place of the dye (I-5) in the same amount, to produce an optical filter.

EXAMPLE 8

The procedure of Example 5 was repeated except that the dye (I-11) was used in place of the dye (I-5) in the same amount, to produce an optical filter.

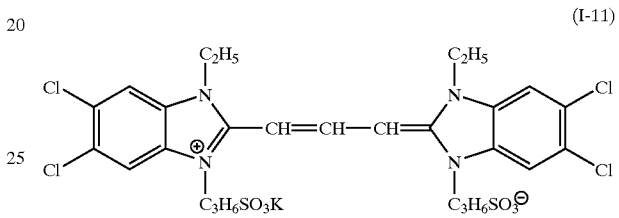
(I-11)

EXAMPLE 9

The procedure of Example 5 was repeated except that the dye (I-27) was used in place of the dye (I-5) in the same amount, to produce an optical filter.

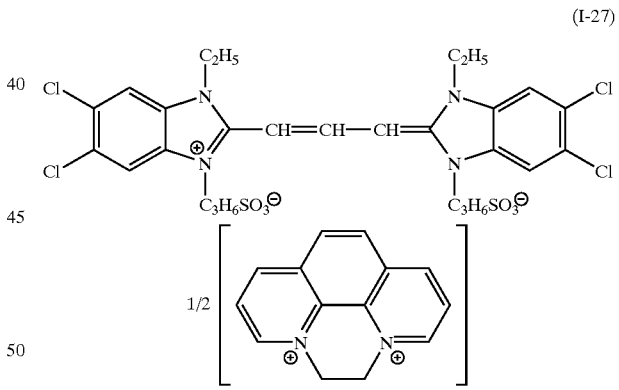
(I-27)

COMPARISON EXAMPLE 2

In 80 g of chloroform, 3.0 g of polyvinyl butyral (PVB-3000K, Tokyo Denkikagaku Kogyo Co., Ltd.) was dissolved. To the solution, 0.12 g of the following comparison dye (a) was added. The solution was stirred for 30 minutes, and then filtered through a polypropylene filter (porosity size: 1 μm) to prepare a coating solution for filter layer.

The procedure of Example 5 was repeated except that the above-prepared coating solution was used, to produce an optical filter.

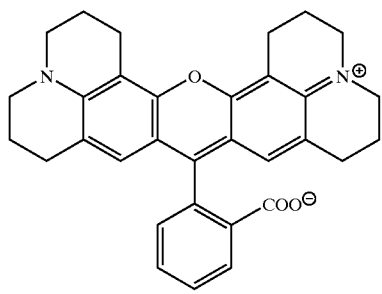

Comparison dye (a)

COMPARISON EXAMPLE 3

In 80 g of isopropyl alcohol, 3.0 g of partially hydrolyzed polyvinyl acetate was dissolved. To the solution, 0.3 g of a commercially available dye (Foster palm pink E) was added. The solution was stirred for 30 minutes, and then filtered through a polypropylene filter (porosity size: 1 μm) to prepare a coating solution for filter layer.

The procedure of Example 5 was repeated except that the above-prepared coating solution was used, to produce an optical filter.

Measurement of Absorbance

The absorption spectrum of each obtained optical filter was measured by means of a spectrophotometer (U-3210, Hitachi, Ltd.). In the measurement, the reference was air. From the obtained spectrum, λmax and the half-width were measured. The results are set forth in Table 2. The transmittance of each filter at the absorption maximum was in the range of 25% to 35%.

Test for Resistance to Light

The optical filter was irradiated with light (from the side opposite to the filter layer) by means of a xenon lump at 150,000 lx for 200 hours. The remaining ratio of the dye (resistance to light) was defined by the following formula:

Remaining ratio=100×(100−transmittance at the absorption maximum after light irradiation)/(100−transmittance at the absorption maximum before light irradiation)

The results are set forth in Table 2.

TABLE 2

| Optical filter | Dye | λmax | Half-width | Resistance to light |
|---|---|---|---|---|
| Example 5 | (I-5) | 595 nm | 24 nm | 83% |
| Example 6 | (I-3) | 580 nm | 32 nm | 87% |
| Example 7 | (I-4) | 579 nm | 29 nm | 82% |
| Example 8 | (I-11) | 595 nm | 20 nm | 83% |
| Example 9 | (I-27) | 595 nm | 30 nm | 83% |
| Comp. 2 | (a) | 572 nm | 70 nm | 0% |
| Comp. 3 | Palm pink E | 570 nm | 150 nm | 100% |

(Remark)
Palm pink E: Foster palm pink E

EXAMPLE 10

Formation of Undercoating Layer

An undercoating layer (a) and a second undercoating layer (a) were formed on one surface of a transparent support in the same manner as in Example 1.

On the support surface opposite to the undercoating layers, a latex of vinylidene chloride-acrylic acid-methyl acrylate copolymer was applied to form an undercoating layer (b) of 120 nm thickness.

Formation of Second Undercoating Layer

On the undercoating layer (b), an acrylic latex (HA16, Nippon acryl Co., Ltd.) was applied to form a second undercoating layer (b) of 50 nm thickness.

Formation of Filter Layer

A filter layer was formed on the second undercoating layer (b) in the same manner as in Example 5.

Formation of Low Refractive Index Layer

A low refractive index layer was formed on the filter layer in the same manner as in Example 5.

The thus-formed anti-reflection film was evaluated in the manner described in Example 5, and as a result it gave as good performance as that of Example 5.

Each optical filter of Examples 5 to 10 was attached on the surface of a plasma display panel. The display panel equipped with each filter gave an image having good contrast and improved in white and red light.

EXAMPLE 11

Formation of Undercoating Layer

Both surfaces of a transparent polyethylene terephthalate film (thickness: 100 μm) were subjected to a corona discharge treatment. A latex of styrene-butadiene copolymer was applied on one surface to form an undercoating layer of 130 nm thickness.

Formation of Second Undercoating Layer

On the undercoating layer, an aqueous solution of gelatin containing acetic acid and glutaric aldehyde was applied to form a second undercoating layer of 50 nm thickness.

Formation of Low Refractive Index Layer

To 2.50 g of a reactive fluorocarbon polymer (JN-7219, Nippon Gosei Gomu Co., Ltd.), 1.3 g of t-butanol was added. The mixture was stirred at the room temperature for 10 minutes, and then filtered through a polypropylene filter (porosity size: 1 μm) to prepare a coating solution for low refractive index layer. The coating solution was applied on the support surface opposite to the undercoating layers by using a wired bar coater, to form a layer (dry thickness: 110 nm). The layer was dried and hardened at 120° C. for 30 minutes to form a low refractive index layer.

Formation of Filter Layer

In 180 g of 10 wt. % aqueous solution of gelatin, 0.10 g of the dye (Ib-2) was dissolved. The solution was stirred at 40° C. for 30 minutes, and then filtered through a polypropylene filter (porosity size: 2 μm) to prepare a coating solution for filter layer. The coating solution was coated on the second undercoating layer, and dried at 120° C. for 10 minutes to form a filter layer (dry thickness: 3.5 μm). Thus, an optical filter was produced.

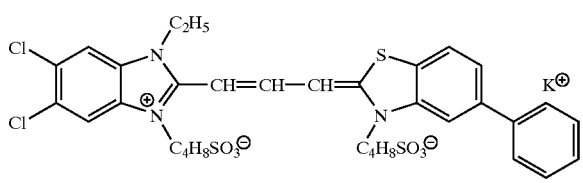

(Ib-2)

EXAMPLE 12

The procedure of Example 11 was repeated except that the dye (Ib-16) was used in place of the dye (Ib-2) in the same amount, to produce an optical filter.

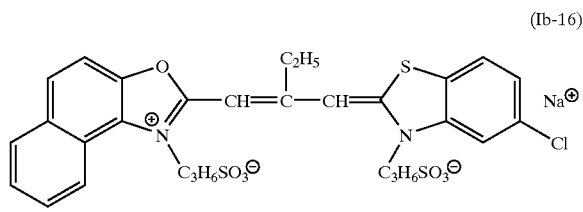

(Ib-16)

EXAMPLE 13

The procedure of Example 11 was repeated except that the dye (Ib-20) was used in place of the dye (Ib-2) in the same amount, to produce an optical filter.

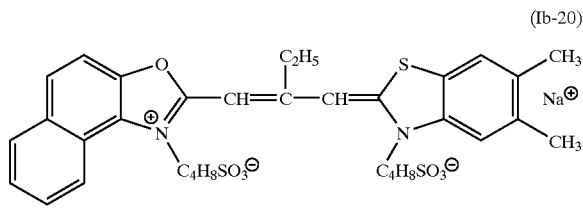

(Ib-20)

COMPARISON EXAMPLE 4

In 80 g of chloroform, 3.0 g of polyvinyl butyral (PVB-3000K, Tokyo Denkikagaku Kogyo Co., Ltd.) was dissolved. To the solution, 0.12 g of the comparison dye (a) used in Comparison Example 2 was added. The solution was stirred for 30 minutes, and then filtered through a polypropylene filter (porosity size: 1 μm) to prepare a coating solution for filter layer.

The procedure of Example 11 was repeated except that the above-prepared coating solution was used, to produce an optical filter.

COMPARISON EXAMPLE 5

In 80 g of isopropyl alcohol, 3.0 g of partially hydrolyzed polyvinyl acetate was dissolved. To the solution, 0.3 g of a commercially available dye (Foster palm pink E) was added. The solution was stirred for 30 minutes, and then filtered through a polypropylene filter (porosity size: 1 μm) to prepare a coating solution for filter layer.

The procedure of Example 11 was repeated except that the above-prepared coating solution was used, to produce an optical filter.

Measurement of Absorbance

The absorption spectrum of each obtained optical filter was measured by means of a spectrophotometer (U-3210, Hitachi, Ltd.). In the measurement, the reference was air. From the obtained spectrum, λmax and the half-width were measured. The results are set forth in Table 3. The transmittance of each filter at the absorption maximum was in the range of 25% to 35%.

Test for Resistance to Light

The optical filter was irradiated with light (from the side opposite to the filter layer) by means of a xenon lump at 150,000 lx for 200 hours. The remaining ratio of the dye (resistance to light) was defined by the following formula:

Remaining ratio=100×(100-transmittance at the absorption maximum after light irradiation)/(100-transmittance at the absorption maximum before light irradiation)

The results are set forth in Table 3.

TABLE 3

| Optical filter | Dye | λmax | Half-width | Resistance to light |
|---|---|---|---|---|
| Example 11 | (Ib-2) | 594 nm | 25 nm | 84% |
| Example 12 | (Ib-16) | 597 nm | 31 nm | 85% |
| Example 13 | (Ib-20) | 588 nm | 41 nm | 89% |
| Comp. 4 | (a) | 572 nm | 70 nm | 0% |
| Comp. 5 | Palm pink E | 570 nm | 150 nm | 100% |

(Remark)
Palm pink E: Foster palm pink E

Each optical filter of Examples 11 to 13 was attached on the surface of a plasma display panel. The display panel equipped with gave an image having good contrast and improved in white and red light.

EXAMPLE 14

Formation of Undercoating Layer

On one surface of a transparent cellulose triacetate film (thickness: 80 μm), a gelatin dispersion in methanol and acetone was coated, and dried to form an undercoating layer (thickness: 200 nm).

Formation of Hard Coating Layer

In 50 weight parts of methyl ethyl ketone, 25 weight parts of dipentaerythrytol hexaacrylate (DPHA, Nippon Kayaku Co., Ltd.), 25 weight parts of urethane acrylate oligomer (UV-6300B, Nippon Synthetic Chemical Industry Co., Ltd.), 2 weight parts of a photopolymerization initiator (Irgacure 907, Ciba-Geigy) and 0.5 weight part of a photosensitizer (Kayacure DETX, Nippon Kayaku Co., Ltd.) were dissolved to prepare a coating solution for hard coating layer. The coating solution was applied on the support surface opposite to the undercoating layer by using a wired bar coater. The formed layer was dried, and irradiated with ultraviolet rays to form a hard coating layer (thickness: 6 μm).

Formation of Low Refractive Index Layer

A low refractive index layer was formed on the hard coating layer in the same manner as in Example 11 by using the coating solution for low refractive index layer.

Formation of Filter Layer

In 180 g of 10 wt. % aqueous solution of gelatin, 0.05 g of the dye (Ib-2) was dissolved. The solution was stirred at 40° C. for 30 minutes, and then filtered through a polypropylene filter (porosity size: 2 μm) to prepare a coating solution for filter layer.

The coating solution was coated on the undercoating layer, and dried at 120° C. for 10 minutes to form a filter layer (dry thickness: 3.5 μm).

Thus, an optical filter was produced.

The absorption spectrum of the obtained optical filter was measured. The absorption maximum, the transmittance there and the half-width thereof were the same as those of the optical filter in Example 11.

EXAMPLE 15

Formation of Undercoating Layer

An undercoating layer (a) and a second undercoating layer (a) were formed on one surface of a transparent support in the same manner as in Example 11.

On the other surface of the transparent support, a latex of vinylidene chloride-acrylic acid-methyl acrylate copolymer was coated to form an undercoating layer (b) having the thickness of 120 nm.

Formation of Second Undercoating Layer

On the undercoating layer (b), an acrylic latex (HA16, Japan Acrylic Co., Ltd.) was coated to form a second undercoating layer (b) having the thickness of 50 nm.

Formation of Filter Layer

In 180 g of 10 wt. % aqueous solution of gelatin, 0.10 g of the dye (Ib-2) was dissolved. The solution was stirred at 40° C. for 30 minutes, and then filtered through a polypropylene filter (porosity size: 2 μm) to prepare a coating solution for filter layer.

The coating solution was coated on the second undercoating layer (b), and dried at 120° C. for 10 minutes to form a filter layer (dry thickness: 3.5 μm).

Formation of Hard Coating Layer

A hardcoating layer was formed on the filter layer in the same manner as in Example 14.

Formation of Low Refractive Index Layer

A low refractive index layer was formed on the hard coating layer in the same manner as in Example 11 by using the coating solution for low refractive index layer. Thus, an optical filter was produced.

The absorption spectrum of the obtained optical filter was measured. The absorption maximum, the transmittance there and the half-width thereof were the same as those of the optical filter in Example 11.

EXAMPLE 16

Formation of Undercoating Layer

Both surfaces of a transparent polyethylene terephthalate film (thickness: 100 μm) were subjected to a corona discharge treatment. A latex of styrene-butadiene copolymer was applied on one surface to form an undercoating layer of 130 nm thickness.

Formation of Second Undercoating Layer

On the undercoating layer, an aqueous solution of gelatin containing acetic acid and glutaric aldehyde was applied to form a second undercoating layer of 50 nm thickness.

Formation of Low Refractive Index Layer

To 2.50 g of a reactive fluorocarbon polymer (JN-7219, Nippon Gosei Gomu Co., Ltd.), 1.3 g of t-butanol was added. The mixture was stirred at the room temperature for 10 minutes, and then filtered through a polypropylene filter (porosity size: 1 μm) to prepare a coating solution for low refractive index layer. The coating solution was applied on the support surface opposite to the undercoating layers by using a wired bar coater, to form a layer (dry thickness: 110 nm). The layer was dried and hardened at 120° C. for 30 minutes to form a low refractive index layer.

Formation of Filter Layer

In 180 g of 10 wt. % aqueous solution of gelatin, 0.05 g of the dye (V-2) was dissolved. The solution was stirred at 40° C. for 30 minutes, and then filtered through a polypropylene filter (porosity size: 2 μm) to prepare a coating solution for filter layer. The coating solution was coated on the second undercoating layer, and dried at 120° C. for 10 minutes to form a filter layer (dry thickness: 3.5 μm). Thus, an optical filter was produced.

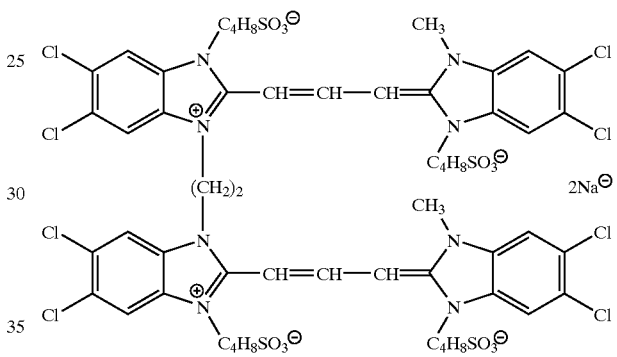

(V-2)

EXAMPLE 17

The procedure of Example 16 was repeated except that the dye (V-5) was used in place of the dye (V-2) in the same amount, to produce an optical filter.

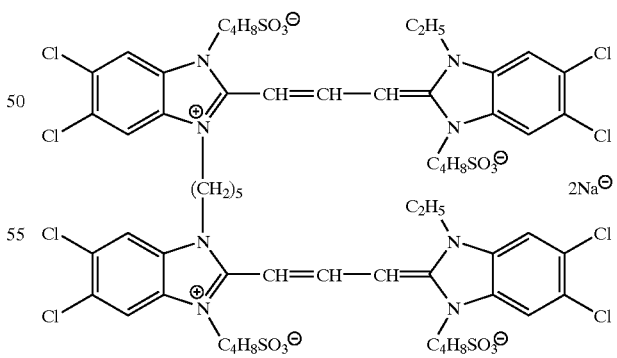

(V-5)

EXAMPLE 18

The procedure of Example 16 was repeated except that the dye (V-26) was used in place of the dye (V-2) in the same amount, to produce an optical filter.

(V-26)

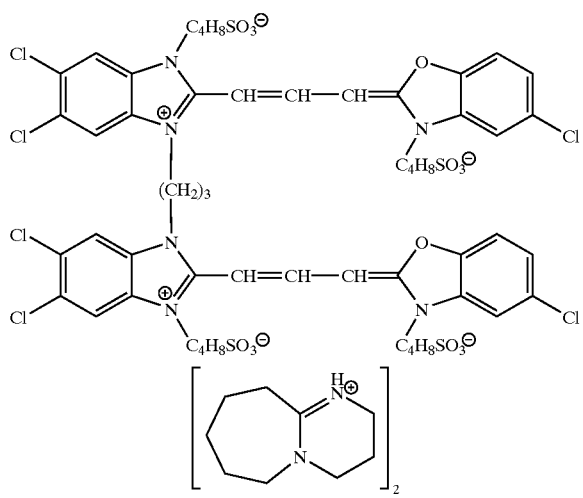

COMPARISON EXAMPLE 6

In 80 g of chloroform, 3.0 g of polyvinyl butyral (PVB-3000K, Tokyo Denkikagaku Kogyo Co., Ltd.) was dissolved. To the solution, 0.12 g of the comparison dye (a) used in Comparison Example 2 was added. The solution was stirred for 30 minutes, and then filtered through a polypropylene filter (porosity size: 1 μm) to prepare a coating solution for filter layer.

The procedure of Example 16 was repeated except that the above-prepared coating solution was used, to produce an optical filter.

COMPARISON EXAMPLE 7

In 80 g of isopropyl alcohol, 3.0 g of partially hydrolyzed polyvinyl acetate was dissolved. To the solution, 0.3 g of a commercially available dye (Foster palm pink E) was added. The solution was stirred for 30 minutes, and then filtered through a polypropylene filter (porosity size: 1 μm) to prepare a coating solution for filter layer.

The procedure of Example 16 was repeated except that the above-prepared coating solution was used, to produce an optical filter.

Measurement of Absorbance

The absorption spectrum of each obtained optical filter was measured by means of a spectrophotometer (U-3210, Hitachi, Ltd.). In the measurement, the reference was air. From the obtained spectrum, λmax and the half-width were measured. The results are set forth in Table 4. The transmittance of each filter at the absorption maximum was in the range of 25% to 35%.

Test for Resistance to Light

The optical filter was irradiated with light (from the side opposite to the filter layer) by means of a xenon lump at 150,000 lx for 200 hours. The remaining ratio of the dye (resistance to light) was defined by the following formula:

Remaining ratio=100×(100-transmittance at the absorption maximum after light irradiation)/(100-transmittance at the absorption maximum before light irradiation)

The results are set forth in Table 4.

TABLE 4

| Optical filter | Dye | λmax | Half-width | Resistance to light |
|---|---|---|---|---|
| Example 16 | (V-2) | 603 nm | 41 nm | 82% |
| Example 17 | (V-5) | 602 nm | 45 nm | 83% |
| Example 18 | (V-26) | 600 nm | 44 nm | 85% |
| Comp. 6 | (a) | 572 nm | 70 nm | 0% |
| Comp. 7 | Palm pink E | 570 nm | 150 nm | 100% |

(Remark)
Palm pink E: Foster palm pink E

Each optical filter of Examples 16 to 18 was attached on the surface of a plasma display panel. The display panel equipped with each filter gave an image having good contrast and improved in white and red light.

EXAMPLE 19

Formation of Undercoating Layer

On one surface of a transparent cellulose triacetate film (thickness: 80 μm), a gelatin dispersion in methanol and acetone was coated, and dried to form an undercoating layer (thickness: 200 nm).

Formation of Hard Coating Layer

In 50 weight parts of methyl ethyl ketone, 25 weight parts of dipentaerythrytol hexaacrylate (DPHA, Nippon Kayaku Co., Ltd.), 25 weight parts of urethane acrylate oligomer (UV-6300B, Nippon Synthetic Chemical Industry Co., Ltd.), 2 weight parts of a photopolymerization initiator (Irgacure 907, Ciba-Geigy) and 0.5 weight part of a photosensitizer (Kayacure DETX, Nippon Kayaku Co., Ltd.) were dissolved to prepare a coating solution for hard coating layer. The coating solution was applied on the support surface opposite to the undercoating layer by using a wired bar coater. The formed layer was dried, and irradiated with ultraviolet rays to form a hard coating layer (thickness: 6 μm).

Formation of Low Refractive Index Layer

A low refractive index layer was formed on the hard coating layer in the same manner as in Example 16 by using the coating solution for low refractive index layer.

Formation of Filter Layer

In 180 g of 10 wt. % aqueous solution of gelatin, 0.05 g of the dye (V-2) was dissolved. The solution was stirred at 40° C. for 30 minutes, and then filtered through a polypropylene filter (porosity size: 2 μm) to prepare a coating solution for filter layer.

The coating solution was coated on the undercoating layer, and dried at 120° C. for 10 minutes to form a filter layer (dry thickness: 3.5 μm)

Thus, an optical filter was produced.

The absorption spectrum of the obtained optical filter was measured. The absorption maximum, the transmittance there and the half-width thereof were the same as those of the optical filter in Example 16.

EXAMPLE 20

Formation of Undercoating Layer

An undercoating layer (a) and a second undercoating layer (a) were formed on one surface of a transparent support in the same manner as in Example 16.

On the other surface of the transparent support, a latex of vinylidene chloride-acrylic acid-methyl acrylate copolymer was coated to form an undercoating layer (b) having the thickness of 120 nm.

Formation of Second Undercoating Layer

On the undercoating layer (b), an acrylic latex (HA16, Japan Acrylic Co., Ltd.) was coated to form a second undercoating layer (b) having the thickness of 50 nm.

Formation of Filter Layer

In 180 g of 10 wt. % aqueous solution of gelatin, 0.05 g of the dye (V-2) was dissolved. The solution was stirred at 40° C. for 30 minutes, and then filtered through a polypropylene filter (porosity size: 2 μm) to prepare a coating solution for filter layer.

The coating solution was coated on the second undercoating layer (b), and dried at 120° C. for 10 minutes to form a filter layer (dry thickness: 3.5 μm).

Formation of Hard Coating Layer

A hardcoating layer was formed on the filter layer in the same manner as in Example 19.

Formation of Low Refractive Index Layer

A low refractive index layer was formed on the hard coating layer in the same manner as in Example 16 by using the coating solution for low refractive index layer. Thus, an optical filter was produced.

The absorption spectrum of the obtained optical filter was measured. The absorption maximum, the transmittance there and the half-width thereof were the same as those of the optical filter in Example 16.

EXAMPLE 21

Formation of Undercoating Layer

Both surfaces of a transparent polyethylene terephthalate film (thickness: 100 μm) were subjected to a corona discharge treatment. A latex of styrene-butadiene copolymer was applied on one surface to form an undercoating layer of 130 nm thickness.

Formation of Second Undercoating Layer

On the undercoating layer, an aqueous solution of gelatin containing acetic acid and glutaric aldehyde was applied to form a second undercoating layer of 50 nm thickness.

Formation of Filter Layer

In 180 g of 10 wt. % aqueous solution of gelatin, 0.025 g of the dye (VI-1) and 0.025 g of the dye (VI-10) were dissolved. The solution was stirred at 40° C. for 30 minutes, and then filtered through a polypropylene filter (porosity size: 2 μm) to prepare a coating solution for filter layer. The coating solution was coated on the second undercoating layer, and dried at 120° C. for 10 minutes to form a filter layer (dry thickness: 3.5 μm).

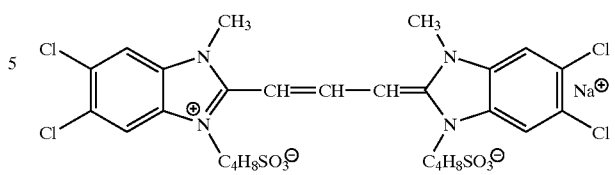

(VI-1)

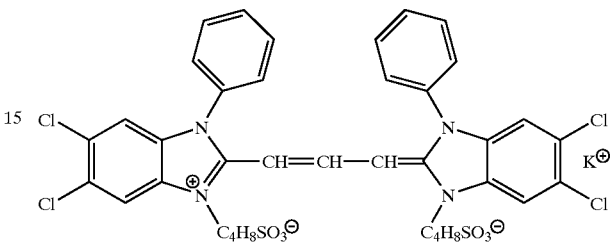

(VI-10)

Formation of Low Refractive Index Layer

To 2.50 g of a reactive fluorocarbon polymer (JN-7219, Nippon Gosei Gomu Co., Ltd.), 1.3 g of t-butanol was added. The mixture was stirred at the room temperature for 10 minutes, and then filtered through a polypropylene filter (porosity size. 1 μm) to prepare a coating solution for low refractive index layer. The coating solution was applied on the support surface opposite to the undercoating layers by using a wired bar coater, to form a layer (dry thickness: 110 nm). The layer was dried and hardened at 120° C. for 30 minutes to form a low refractive index layer.

Thus, an optical filter was produced.

EXAMPLE 22

The procedure of Example 21 was repeated except that the dye (VI-29) was used in place of the dye (VI-10) in the same amount, to produce an optical filter.

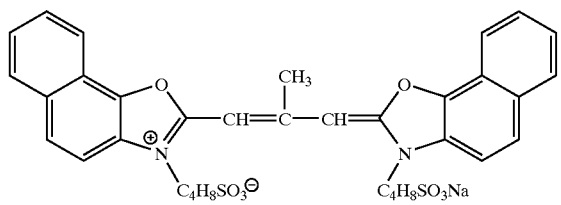

(VI-29)

EXAMPLE 23

The procedure of Example 21 was repeated except that the dye (VI-36) was used in place of the dye (VI-10) in the same amount, to produce an optical filter.

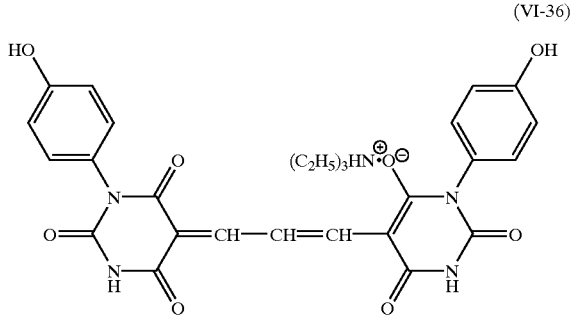

(VI-36)

EXAMPLE 24

The procedure of Example 21 was repeated except that the dyes (VI-41) and (VI-59) were used in place of the dyes (VI-1) and (VI-10) in the same amount, to produce an optical filter.

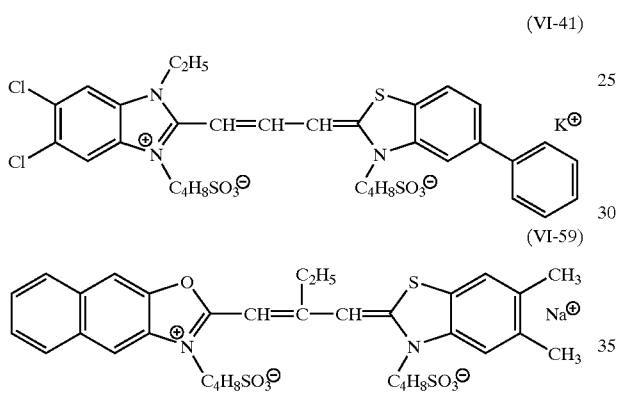

(VI-41)

(VI-59)

COMPARISON EXAMPLE 8

In 80 g of chloroform, 3.0 g of polyvinyl butyral (PVB-3000K, Tokyo Denkikagaku Kogyo Co., Ltd.) was dissolved. To the solution, 0.12 g of the comparison dye (a) used in Comparison Example 2 was added. The solution was stirred for 30 minutes, and then filtered through a polypropylene filter (porosity size: 1 μm) to prepare a coating solution for filter layer.

The procedure of Example 21 was repeated except that the above-prepared coating solution was used, to produce an optical filter.

COMPARISON EXAMPLE 9

In 80 g of isopropyl alcohol, 3.0 g of partially hydrolyzed polyvinyl acetate was dissolved. To the solution, 0.3 g of a commercially available dye (Foster palm pink E) was added. The solution was stirred for 30 minutes, and then filtered through a polypropylene filter (porosity size: 1 μm) to prepare a coating solution for filter layer.

The procedure of Example 21 was repeated except that the above-prepared coating solution was used, to produce an optical filter.

Measurement of Absorbance

The absorption spectrum of each obtained optical filter was measured by means of a spectrophotometer (U-3210, Hitachi, Ltd.). In the measurement, the reference was air.

From the obtained spectrum, λmax and the half-width were measured. The results are set forth in Table 5. The transmittance of each filter at the absorption maximum was in the range of 25% to 35%.

Test for Resistance to Light

The optical filter was irradiated with light (from the side opposite to the filter layer) by means of a xenon lump at 150,000 lx for 200 hours. The remaining ratio of the dye (resistance to light) was defined by the following formula:

Remaining ratio=100×(100-transmittance at the absorption maximum after light irradiation)/(100-transmittance at the absorption maximum before light irradiation)

The results are set forth in Table 5.

TABLE 5

| Optical filter | Dye | λmax | Half-width | Resistance to light |
|---|---|---|---|---|
| Ex. 21 | (VI-1) + (VI-10) | 598 nm | 40 nm | 83% |
| Ex. 22 | (VI-1) + (VI-29) | 580 nm | 47 nm | 83% |
| Ex. 23 | (VI-1) + (VI-36) | 575 nm | 48 nm | 85% |
| Ex. 24 | (VI-41) + (VI-59) | 597 nm | 45 nm | 86% |
| Comp. 8 | (a) | 572 nm | 70 nm | 0% |
| Comp. 9 | Palm pink E | 570 nm | 150 nm | 100% |

(Remark)
Palm pink E: Foster palm pink E

Each optical filter of Examples 21 to 24 was attached on the surface of a plasma display panel. The display panel equipped with each filter gave an image having good contrast and improved in white and red light.

EXAMPLE 25

Formation of Undercoating Layer

On one surface of a transparent cellulose triacetate film (thickness: 80 μm), a gelatin dispersion in methanol and acetone was coated, and dried to form an undercoating layer (thickness: 200 nm).

Formation of Hard Coating Layer

In 50 weight parts of methyl ethyl ketone, 25 weight parts of dipentaerythrytol hexaacrylate (DPHA, Nippon Kayaku Co., Ltd.), 25 weight parts of urethane acrylate oligomer (UV-6300B, Nippon Synthetic Chemical Industry Co., Ltd.), 2 weight parts of a photopolymerization initiator (Irgacure 907, Ciba-Geigy) and 0.5 weight part of a photosensitizer (Kayacure.DETX, Nippon Kayaku Co., Ltd.) were dissolved to prepare a coating solution for hard coating layer. The coating solution was applied on the support surface opposite to the undercoating layer by using a wired bar coater. The formed layer was dried, and irradiated with ultraviolet rays to form a hard coating layer (thickness: 6 μm)

Formation of Low Refractive Index Layer

A low refractive index layer was formed on the hard coating layer in the same manner as in Example 21 by using the coating Solution for low refractive index layer.

Formation of Filter Layer

In 180 g of 10 wt. % aqueous solution of gelatin, 0.025 g of the dye (VI-1) and 0.025 g of the dye (VI-10) were dissolved. The solution was stirred at 40° C. for 30 minutes, and then filtered through a polypropylene filter (porosity size: 2 μm) to prepare a coating solution for filter layer.

The coating solution was coated on the undercoating layer, and dried at 120° C. for 10 minutes to form a filter layer (dry thickness: 3.5 μm).

Thus, an optical filter was produced.

The absorption spectrum of the obtained optical filter was measured. The absorption maximum, the transmittance there and the half-width thereof were the same as those of the optical filter in Example 21.

EXAMPLE 26

Formation of Undercoating Layer

An undercoating layer (a) and a second undercoating layer (a) were formed on one surface of a transparent support in the same manner as in Example 21.

On the other surface of the transparent support, a latex of vinylidene chloride-acrylic acid-methyl acrylate copolymer was coated to form an undercoating layer (b) having the thickness of 120 nm.

Formation of Second Undercoating Layer

On the undercoating layer (b), an acrylic latex (HA16, Japan Acrylic Co., Ltd.) was coated to form a second undercoating layer (b) having the thickness of 50 nm.

Formation of Filter Layer

In 180 g of 10 wt. % aqueous solution of gelatin, 0.025 g of the dye (VI-1) and 0.025 g of the dye (VI-10) were dissolved. The solution was stirred at 40° C. for 30 minutes, and then filtered through a polypropylene filter (porosity size: 2 μm) to prepare a coating solution for filter layer.

The coating solution was coated on the second undercoating layer (b), and dried at 120° C. for 10 minutes to form a filter layer (dry thickness: 3.5 μm).

Formation of Hard Coating Layer

A hardcoating layer was formed on the filter layer in the same manner as in Example 25.

Formation of Low Refractive Index Layer

A low refractive index layer was formed on the hard coating layer in the same manner as in Example 21 by using the coating solution for low refractive index layer. Thus, an optical filter was produced.

The absorption spectrum of the obtained optical filter was measured. The absorption maximum, the transmittance there and the half-width thereof were the same as those of the optical filter in Example 21.

EXAMPLE 27

Formation of Undercoating Layer

Both surfaces of a transparent polyethylene terephthalate film (thickness: 100 μm) were subjected to a corona discharge treatment. A latex of styrene-butadiene copolymer was applied on one surface to form an undercoating layer of 130 nm thickness.

Formation of Second Undercoating Layer

On the undercoating layer, an aqueous solution of gelatin containing acetic acid and glutaric aldehyde was applied to form a second undercoating layer of 50 nm thickness.

Formation of Low Refractive Index Layer

To 2.50 g of a reactive fluorocarbon polymer (JN-7219, Nippon Gosei Gomu Co., Ltd.), 1.3 g of t-butanol was added. The mixture was stirred at the room temperature for 10 minutes, and then filtered through a polypropylene filter (porosity size: 1 μm) to prepare a coating solution for low refractive index layer. The coating solution was applied on the support surface opposite to the undercoating layers by using a wired bar coater, to form a layer (dry thickness: 110 nm). The layer was dried and hardened at 120° C. for 30 minutes to form a low refractive index layer.

Formation of Filter Layer

In 180 g of 10 wt. % aqueous solution of gelatin, 0.05 g of the dye (Ic-1) was dissolved. The solution was stirred at 40° C. for 30 minutes, and then filtered through a polypropylene filter (porosity size: 2 μm) to prepare a coating solution for filter layer.

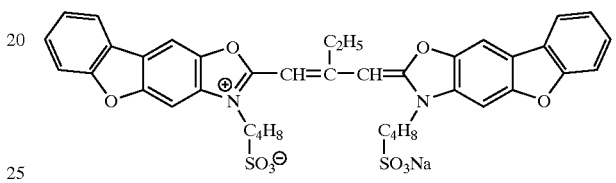

(Ic-2)

The coating solution was coated on the second undercoating layer, and dried at 120° C. for 10 minutes to form a filter layer (dry thickness: 3.5 μm). Thus, an optical filter was produced.

Measurement of Absorbance

The absorption spectrum of the obtained optical filter was measured by means of a spectrophotometer (U-3210, Hitachi, Ltd.). In the measurement, the reference was air. The absorption maximum, the transmittance there and the half-width thereof were 581 nm, 15% and 38 nm, respectively.

The absorption spectrum of a methanol solution of the dye was also measured, and found that the absorption maximum was at 532 nm.

EXAMPLE 28

The procedure of Example 27 was repeated except that the dye (Ic-15) was used in place of the dye (Ic-2) in the same amount, to produce an optical filter.

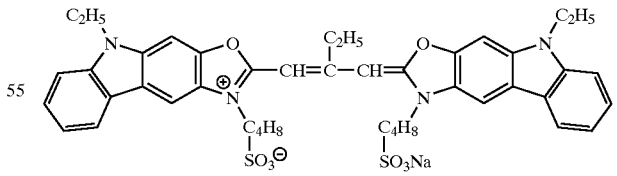

(Ic-15)

The absorption spectrum of the obtained filter was measured. The absorption maximum was 593 nm, the transmittance at the absorption maximum was 14%, and the half-width of the absorption maximum was 40 nm.

The absorption spectrum of a methanol solution of the dye was also measured, and found that the absorption maximum was at 544 nm.

EXAMPLE 29

The procedure of Example 27 was repeated except that the dye (Ic-23) was used in place of the dye (Ic-2) in the same amount, to produce an optical filter.

(Ic-23)

The absorption spectrum of the obtained filter was measured, and thereby it was found that the absorption maximum, the transmittance there and the half-width thereof were 599 nm, 15% and 42 nm, respectively.

The absorption spectrum of a methanol solution of the dye was also measured, and found that the absorption maximum was at 552 nm.

COMPARISON EXAMPLE 10

In 80 g of chloroform, 3.0 g of polyvinyl butyral (PVB-3000K, Tokyo Denkikagaku Kogyo Co., Ltd.) was dissolved. To the solution, 0.12 g of the comparison dye (a) used in Comparison Example 2 was added. The solution was stirred for 30 minutes, and then filtered through a polypropylene filter (porosity size: 1 $\mu$m) to prepare a coating solution for filter layer.

The procedure of Example 27 was repeated except that the above-prepared coating solution was used, to produce an optical filter.

The absorption spectrum of the obtained filter was measured, and thereby it was found that the absorption maximum, the transmittance there and the half-width thereof were 572 nm, 17% and 70 nm, respectively.

The absorption spectrum of a methanol solution of the dye was also measured, and found that the absorption maximum was at 567 nm.

COMPARISON EXAMPLE 11

In 80 g of isopropyl alcohol, 3.0 g of partially hydrolyzed polyvinyl acetate was dissolved. To the solution, 0.3 g of a commercially available dye (Foster palm pink E) was added. The solution was stirred for 30 minutes, and then filtered through a polypropylene filter (porosity size: 1 $\mu$m) to prepare a coating solution for filter layer.

The procedure of Example 27 was repeated except that the above-prepared coating solution was used, to produce an optical filter.

The absorption spectrum of the obtained filter was measured, and thereby it was found that the absorption maximum, the transmittance there and the half-width thereof were 570 nm, 17% and 150 nm, respectively.

The dye was not dissolved in methanol.

Test for Resistance to Light

The optical filter was irradiated with light (from the side opposite to the filter layer) by means of a xenon lump at 150,000 lx for 200 hours. The remaining ratio of the dye (resistance to light) was defined by the following formula:

Remaining ratio=100×(100-transmittance at the absorption maximum after light irradiation)/(100-transmittance at the absorption maximum before light irradiation)

The results are set forth in Table 5.

Test for Resistance to Moist Heat

The optical filter was stored at 60° C., 90% (relative humidity) for 1 day, and then the remaining ratio of the dye (resistance to moist heat) was measured according to the above formula.

The results are set forth in Table 6.

TABLE 6

| Optical filter | Dye | λmax Me solution | λmax Filter layer | Transmittance | Half-width | Resistance to Light | Resistance to Moist heat |
|---|---|---|---|---|---|---|---|
| Ex. 27 | Ic-2 | 532 nm | 581 nm | 15% | 38 nm | 93% | 98% |
| Ex. 28 | Ic-15 | 544 nm | 593 nm | 14% | 40 nm | 91% | 100% |
| Ex. 29 | Ic-23 | 552 nm | 599 nm | 15% | 42 nm | 92% | 100% |
| C. 10 | (a) | 567 nm | 572 nm | 17% | 70 nm | 0% | 20% |
| C. 11 | Pink E | — | 570 nm | 17% | 150 nm | 100% | 100% |

(Remark)
Pink E: Foster palm pink E
λmax: Absorption maximum of the dye
Me solution: λmax measured in the methanol solution
Filter layer: λmax measured in the filter layer Each optical filter of Examples 27 to 29 was attached on the surface of a plasma display panel. The display panel equipped with each filter gave an image having good contrast and improved in white and red light.

EXAMPLE 30

Formation of Undercoating Layer

On one surface of a transparent cellulose triacetate film (thickness: 80 $\mu$m), a gelatin dispersion in methanol and acetone was coated, and dried to form an undercoating layer (thickness: 200 nm).

Formation of Hard Coating Layer

In 50 weight parts of methyl ethyl ketone, 25 weight parts of dipentaerythrytol hexaacrylate (DPHA, Nippon Kayaku Co., Ltd.), 25 weight parts of urethane acrylate oligomer (UV-6300B, Nippon Synthetic Chemical Industry Co., Ltd.), 2 weight parts of a photopolymerization initiator (Irgacure 907, Ciba-Geigy) and 0.5 weight part of a photosensitizer (Kayacure DETX, Nippon Kayaku Co., Ltd.) were dissolved to prepare a coating solution for hard coating layer. The coating solution was applied on the support surface opposite to the undercoating layer by using a wired bar coater. The formed layer was dried, and irradiated a with ultraviolet rays to form a hard coating layer (thickness: 6 µm).

Formation of Low Refractive Index Layer

A low refractive index layer was formed on the hard coating layer in the same manner as in Example 1 by using the coating solution for low refractive index layer.

Formation of Filter Layer

In 180 g of 10 wt. % aqueous solution of gelatin, 0.05 g of the dye (Ic-1) was dissolved. The solution was stirred at 40° C. for 30 minutes, and then filtered through a polypropylene filter (porosity size: 2 µm) to prepare a coating solution for filter layer.

The coating solution was coated on the undercoating layer, and dried at 120° C. for 10 minutes to form a filter layer (dry thickness: 3.5 µm).

Thus, an optical filter was produced.

The absorption spectrum of the obtained optical filter was measured. The absorption maximum, the transmittance there and the half-width thereof were the same as those of the optical filter in Example 27.

EXAMPLE 31

Formation of Undercoating Layer

An undercoating layer (a) and a second undercoating layer (a) were formed on one surface of a transparent support in the same manner as in Example 27.

On the other surface of the transparent support, a latex of vinylidene chloride-acrylic acid-methyl acrylate copolymer was coated to form an undercoating layer (b) having the thickness of 120 nm.

Formation of Second Undercoating Layer

On the undercoating layer (b), an acrylic latex (HA16, Japan Acrylic Co., Ltd.) was coated to form a second undercoating layer (b) having the thickness of 50 nm.

Formation of Filter Layer

In 180 g of 10 wt. % aqueous solution of gelatin, 0.05 g of the dye (Ic-2) was dissolved. The solution was stirred at 40° C. for 30 minutes, and then filtered through a polypropylene filter (porosity size: 2 µm) to prepare a, coating solution for filter layer.

The coating solution was coated on the second undercoating layer (b), and dried at 120° C. for 10 minutes to form a filter layer (dry thickness: 3.5 µm).

Formation of Hard Coating Layer

A hardcoating layer was formed on the filter layer in the same manner as in Example 30.

Formation of Low Refractive Index Layer

A low refractive index layer was formed on the hard coating layer in the same manner as in Example 27 by using the coating solution for low refractive index layer. Thus, an optical filter was produced.

The absorption spectrum of the obtained optical filter was measured. The absorption maximum, the transmittance there-and the half-width thereof were the same as those of the optical filter in Example 27.

What is claimed is:

1. An optical filter which comprises a transparent support and a filter layer, wherein the filter layer has an absorption maximum in a wavelength region of 560 to 620 nm, and the absorption maximum has a half-width in the range of 5 to 50 nm, and wherein the filter layer contains a dye and a binder polymer.

2. The optical filter as defined in claim 1, wherein the optical filter has a transmittance at the absorption maximum in the range of 0.01 to 80%.

3. The optical filter as defined in claim 1, wherein the dye is in an aggregated form.

4. The optical filter as defined in claim 1, wherein the dye is a methine dye.

5. The optical filter as defined in claim 4, wherein the dye is a cyanine dye.

6. The optical filter as defined in claim 5, wherein the dye is a cyanine dye represented by the following formula (I) in an aggregated form:

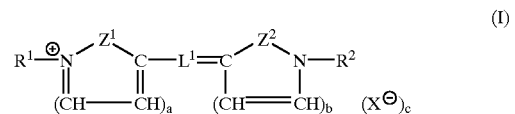

in which each of $Z^1$ and $Z^2$ independently is a group of non-metallic atoms forming a five-membered or six-membered nitrogen-containing heterocyclic ring; each of $R^1$ and $R^2$ independently is an alkyl group, an alkenyl group, an aralkyl group or an aryl group; $L^1$ is a methine chain consisting of an odd number of methines; X is an anion; and each of a, b, and c independently is 0 or 1.

7. The optical filter as defined in claim 5, wherein the dye is a cyanine dye represented by the following formula (Ia) in an aggregated form:

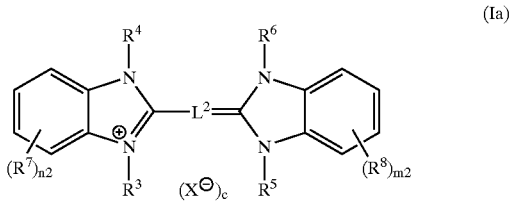

in which each of $R^3$, $R^4$, $R^5$ and $R^6$ independently is an alkyl group, an alkenyl group, an aralkyl group or an aryl group; each of $R^7$ and $R^8$ independently is an alkyl group, an alkoxy group, an aryloxy group, a halogen atom, an alkoxycarbonyl group, a carbon halide group, an alkylthio group, an arylthio group, cyano, nitro, amino, an alkylamino group, an amido group, an acyloxy group, hydroxyl, sulfo or carboxyl; $L^2$ is a methine chain consisting of an odd number of methines; each of m2 and n2 independently is an integer of 0, 1, 2, 3 or 4; X is an anion; and c is 0 or 1.

8. The optical filter as defined in claim 5, wherein the dye is a cyanine dye represented by the following formula (Ib) in an aggregated form:

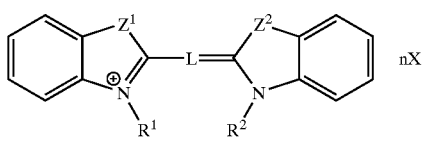

(Ib)

in which L is a methine chain consisting of an odd number of methines; each of $R^1$ and $R^2$ independently is an aliphatic group or an aromatic group; each of $Z^1$ and $Z^2$ independently is a divalent linking group selected from the group consisting of —$CR^3R^4$—, —$NR^5$—, —O—, —S— and —Se— provided that $Z^1$ differs from $Z^2$; each of $R^3$, $R^4$ and $R^5$ independently is hydrogen, an aliphatic group or an aromatic group; n is an integer of 0 or more; X is a counter balance ion; the two benzene rings may be condensed with another benzene ring; and the benzene rings or their condensed ring may have substituent groups.

9. The optical filter as defined in claim 5, wherein the dye is a cyanine dye represented by the following formula (Ic) in an aggregated form:

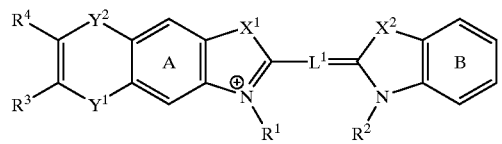

(Ic)

in which each of $X^1$ and $X^2$ independently is —O—, —S—, —Se—, —$NR^5$— or —$CR^6R^7$—; one of $Y^1$ and $Y^2$ is a single bond, —O—, —S— or —$NR^8$—; the other of $Y^1$ and $Y^2$ is —O—, —S— or —$NR^9$—; $L^1$ is a methine chain consisting of an odd number of methines; each of $R^1$ and $R^2$ independently is an aliphatic group or an aromatic group; each of $R^3$ and $R^4$ independently is hydrogen or an aliphatic group, or otherwise $R^3$ and $R^4$ are combined to form an aromatic ring; each of $R^5$, $R^6$, $R^7$, $R^8$ and $R^9$ independently is hydrogen or an aliphatic group, or otherwise $R^6$ and $R^7$ are combined to form an alicyclic ring; the benzene ring B may be condensed with a heterocyclic ring or an aromatic ring; and each of the benzene ring A, the benzene ring B, the ring condensed with the benzene ring B and the aromatic ring formed by $R^3$ and $R^4$ may have substituent groups.

10. The optical filter as defined in claim 5, wherein the dye is a cyanine dye represented by the following formula (Id) in an aggregated form:

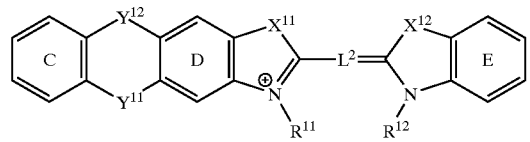

(Id)

in which each of $X^{11}$ and $X^{12}$ independently is —O—, —S—, —Se—, —$NR^{13}$— or —$CR^{14}R^{15}$—; one of $Y^{11}$ and $Y^{12}$ is a single bond, —O—, —S— or —$NR^{16}$—; the other of $Y^{11}$ and $Y^{12}$ is —O—, —S— or —$NR^{17}$—; $L^2$ is a methine chain consisting of an odd number of methines; each of $R^{11}$ and $R^{12}$ independently is an aliphatic group or an aromatic group; each of $R^{13}$, $R^{14}$, $R^{15}$, $R^{16}$ and $R^{17}$ independently is hydrogen or an aliphatic group, or otherwise $R^{14}$ and $R^{15}$ are combined to form an alicyclic ring; the benzene ring E may be condensed with a heterocyclic ring or an aromatic ring; and each of the benzene ring C, the benzene ring D, the benzene ring E and the ring condensed with the benzene ring E may have substituent groups.

11. The optical filter as defined in claim 5, wherein the dye is a cyanine dye represented by the following formula (Ie) in an aggregated form:

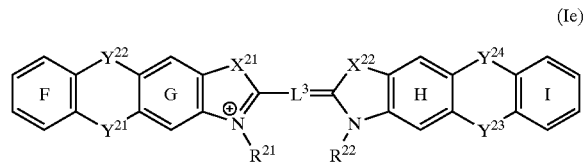

(Ie)

in which each of $X^{21}$ and $X^{22}$ independently is —O—, —S—, —Se—, —$NR^{23}$— or —$CR^{24}R^{25}$—; one of $Y^{21}$ and $Y^{22}$ is a single bond, —O—, —S— or —$NR^{26}$—; the other of $Y^{21}$ and $Y^{22}$ is —O—, —S— or —$NR^{27}$—; one of $Y^{23}$ and $Y^{24}$ is a single bond, —O—, —S— or —$NR^{28}$—; the other of $Y^{23}$ and $Y^{24}$ is —O—, —S— or —$NR^{29}$—; $L^3$ is a methine chain consisting of an odd number of methines; each of $R^{21}$ and $R^{22}$ independently is an aliphatic group or an aromatic group; each of $R^{23}$, $R^{24}$, $R^{25}$, $R^{26}$, $R^{27}$, $R^{28}$ and $R^{29}$ independently is hydrogen or an aliphatic group, or otherwise $R^{24}$ and $R^{25}$ are combined to form an alicyclic ring; and each of the benzene ring F, the benzene ring G, the benzene ring H and the benzene ring I may have substituent groups.

12. The optical filter as defined in claim 4, wherein the dye is an oxonol dye.

13. The optical filter as defined in claim 12, wherein the dye is an oxonol dye represented by the following formula (II) in an aggregated form:

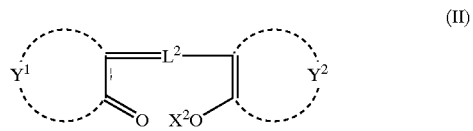

(II)

in which each of $Y^1$ and $Y^2$ independently is a group of nonmetallic atoms forming an alicyclic ring or a heterocyclic ring; $L^2$ is a methine chain consisting of an odd number of methines; and $X^2$ is hydrogen or a cation.

14. The optical filter as defined in claim 4, wherein the dye is aggregation of a compound in which 2 to 100 methine dye molecules are chemically combined.

15. The optical filter as defined in claim 14, wherein the dye is aggregation of a compound in which 2 to 100 cyanine dye molecules are chemically combined.

16. The optical filter as defined in claim 4, wherein the dye is a mixture of at least two methane dyes, and the two methine dyes are both in aggregated forms.

17. The optical filter as defined in claim 16, wherein at least one of the two methine dyes is a cyanine dye.

18. The optical filter as defined in claim 1, wherein the optical filter further comprises a low refractive index layer having a refractive index lower than a refractive index of the support.

19. The optical filter as defined in claim 18, wherein the optical filter comprises the filter layer, the transparent support and the low refractive index layer in this order.

20. The optical filter as defined in claim 18, wherein the optical filter comprises the transparent support, the filter layer and the low refractive index layer in this order.

21. A plasma display panel having a display surface covered with an optical filter which comprises a transparent support and a filter layer, wherein the filter layer has an absorption maximum in the wavelength region of 560 to 620 nm, and the absorption maximum has a half-width in the range of 5 to 50 nm, and wherein the filter layer contains a dye and a binder polymer.

* * * * *